US012691559B2

(12) United States Patent
Garces et al.

(10) Patent No.: US 12,691,559 B2
(45) Date of Patent: Jul. 28, 2026

(54) POWERED FASTENER DRIVER

(71) Applicant: MILWAUKEE ELECTRIC TOOL CORPORATION, Brookfield, WI (US)

(72) Inventors: Casey D. Garces, Milwaukee, WI (US); Mitchell T. Neuhoff, Waukesha, WI (US); Jacob N. Zimmerman, Pewaukee, WI (US); Christopher J. VanAckeren, Waukesha, WI (US); Grace Whitmore, Palatine, IL (US); Marcus Wechselberger, Milwaukee, WI (US); Jason M. Julius, Waukesha, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/403,929

(22) Filed: Jan. 4, 2024

(65) Prior Publication Data

US 2024/0131674 A1 Apr. 25, 2024

Related U.S. Application Data

(63) Continuation of application No. 17/214,002, filed on Mar. 26, 2021, now Pat. No. 11,872,678.
(Continued)

(51) Int. Cl.
*B25C 1/04* (2006.01)
*B25C 1/00* (2006.01)

(52) U.S. Cl.
CPC .............. *B25C 1/047* (2013.01); *B25C 1/008* (2013.01); *B25C 1/043* (2013.01)

(58) Field of Classification Search
CPC ......... B25C 1/047; B25C 1/043; B25C 1/008; B25C 1/188; B25C 7/00; B25C 1/00; B25C 1/005; B25C 1/08; B25C 1/184
See application file for complete search history.

(56) References Cited

U.S. PATENT DOCUMENTS 4,687,126 A 8/1987 Brosius et al.
4,858,811 A 8/1989 Brosius et al.
(Continued)

FOREIGN PATENT DOCUMENTS

DE 2163557 C3 7/1972
EP 1539432 B1 8/2006
(Continued)

OTHER PUBLICATIONS

International Search Report and Written Opinion for Application No. PCT/US2021/024365 dated Sep. 1, 2021 (15 pages).
(Continued)

*Primary Examiner* — Veronica Martin
(74) *Attorney, Agent, or Firm* — Michael Best & Friedrich LLP

(57) ABSTRACT

A fastener driver includes a magazine configured to receive fasteners, a nosepiece including a fastener driving channel from which consecutive fasteners from the magazine are driven, and a workpiece contact element movable relative to the nosepiece between an extended position and a retracted position. A portion of the workpiece contact element is slidably positioned within the fastener driving channel. The portion of the workpiece contact element having an aperture extending therethrough in which the fasteners pass from the magazine through the aperture into the fastener driving channel of the nosepiece to be fired. The portion of the workpiece contact element further includes a guide assembly positioned thereon. The guide assembly configured to guide the fastener along the portion of the workpiece contact element within the fastener driving channel as the fastener is being fired into a workpiece.

18 Claims, 34 Drawing Sheets

Related U.S. Application Data

(60) Provisional application No. 63/129,737, filed on Dec. 23, 2020, provisional application No. 63/042,211, filed on Jun. 22, 2020, provisional application No. 63/000,722, filed on Mar. 27, 2020.

(56) References Cited

U.S. PATENT DOCUMENTS

| | | | |
|---|---|---|---|
| 6,199,739 B1 | 3/2001 | Mukoyama et al. | |
| 6,267,284 B1 | 7/2001 | Clark | |
| 6,592,014 B2 | 7/2003 | Smolinski | |
| 6,966,477 B1 | 11/2005 | Chien-Kuo et al. | |
| 7,134,586 B2 | 11/2006 | McGee et al. | |
| 7,641,089 B2 | 1/2010 | Schell et al. | |
| 8,006,883 B2 | 8/2011 | Schell et al. | |
| 8,567,654 B2 | 10/2013 | Wu et al. | |
| 8,690,036 B2 | 4/2014 | Schell et al. | |
| 8,746,526 B2 | 6/2014 | Hlinka et al. | |
| 10,821,586 B2 | 11/2020 | Wu et al. | |
| 11,034,005 B2 | 6/2021 | Suarez | |
| 2003/0111239 A1 | 6/2003 | Smolinski | |
| 2004/0050899 A1* | 3/2004 | Canlas | B25C 7/00 227/119 |
| 2005/0194419 A1 | 9/2005 | Smolinski et al. | |
| 2006/0011694 A1* | 1/2006 | Ishizawa | B25C 1/188 227/119 |
| 2006/0108390 A1 | 5/2006 | Schnell et al. | |
| 2008/0023517 A1 | 1/2008 | Wojcicki | |
| 2009/0039135 A1* | 2/2009 | Kubo | B25C 7/00 227/120 |
| 2011/0062207 A1 | 3/2011 | Hlinka et al. | |
| 2012/0085806 A1 | 4/2012 | Lee et al. | |
| 2013/0299546 A1 | 11/2013 | Zhao et al. | |
| 2014/0034700 A1 | 2/2014 | Chang | |
| 2014/0252060 A1 | 9/2014 | Segura | |
| 2015/0053736 A1 | 2/2015 | Pomeroy et al. | |
| 2015/0096776 A1* | 4/2015 | Garber | B25C 1/00 173/1 |
| 2016/0229043 A1 | 8/2016 | Wyler et al. | |
| 2018/0001453 A1 | 1/2018 | Jaskot et al. | |
| 2018/0290279 A1 | 10/2018 | Kobori et al. | |
| 2019/0039219 A1 | 2/2019 | Suarez | |
| 2019/0061196 A1 | 2/2019 | Hung et al. | |
| 2019/0077000 A1 | 3/2019 | Hung et al. | |
| 2019/0091845 A1 | 3/2019 | Wyler et al. | |
| 2019/0217457 A1* | 7/2019 | Hung | B25C 1/047 |
| 2019/0299381 A1 | 10/2019 | Hung | |
| 2019/0329390 A1 | 10/2019 | Lin et al. | |
| 2019/0375084 A1 | 12/2019 | Bierdeman et al. | |
| 2020/0030953 A1 | 1/2020 | Tan et al. | |
| 2020/0156226 A1 | 5/2020 | Peng et al. | |
| 2021/0023686 A1 | 1/2021 | Tan et al. | |
| 2021/0316433 A1 | 10/2021 | Ueda et al. | |
| 2022/0072691 A1 | 3/2022 | Schmidt et al. | |

FOREIGN PATENT DOCUMENTS

| | | |
|---|---|---|
| JP | H11320445 A | 11/1999 |
| JP | 5015248 B2 | 8/2012 |

OTHER PUBLICATIONS

Extended European Search Report for Application No. 21774184.2 dated Nov. 7, 2023 (9 pages).

Chinese Patent Office Action for Application No. 202180025167.1 dated May 1, 2025 (18 pages including English translation).

* cited by examiner

POWERED FASTENER DRIVER

CROSS-REFERENCE TO RELATED APPLICATIONS

This application is a continuation of U.S. patent application Ser. No. 17/214,002 filed on Mar. 26, 2021, now U.S. Pat. No. 11,872,678, which claims priority to U.S. Provisional Patent Application No. 63/000,722 filed on Mar. 27, 2020, U.S. Provisional Patent Application No. 63/042,211 filed on Jun. 22, 2020, and U.S. Provisional Patent Application No. 63/129,737 filed on Dec. 23, 2020, the entire contents of all of which are incorporated herein by reference.

FIELD OF THE INVENTION

The present invention relates to powered fastener drivers.

BACKGROUND OF THE INVENTION

There are various fastener drivers known in the art for driving fasteners (e.g., nails, tacks, staples, etc.) into a workpiece. These fastener drivers operate utilizing various means known in the art (e.g. compressed air generated by an air compressor, electrical energy, a flywheel mechanism, etc.), but often these designs are met with power, size, and cost constraints.

SUMMARY OF THE INVENTION

The present invention provides a fastener driver including a magazine configured to receive fasteners, and a nosepiece including a fastener driving channel from which consecutive fasteners from the magazine are driven. A workpiece contact element is movable relative to the nosepiece between an extended position and a retracted position. A portion of the workpiece contact element is slidably positioned within the fastener driving channel. The portion of the workpiece contact element has an aperture extending therethrough in which the fasteners pass from the magazine through the aperture into the fastener driving channel of the nosepiece to be fired. The portion of the workpiece contact element further includes a guide assembly positioned thereon. The guide assembly is configured to guide the fastener along the portion of the workpiece contact element within the fastener driving channel as the fastener is being fired into a workpiece.

The present invention provides in another aspect, a fastener driver including a housing, a cylinder supported by the housing, and a moveable piston positioned within the cylinder. A driver blade is attached to the piston and movable therewith between a top-dead-center (TDC) position and a driven or bottom-dead-center (BDC) position. The driver blade includes a body portion extending along a longitudinal axis. A nosepiece is supported by the housing. The nosepiece defines a firing channel extending along the longitudinal axis. The firing channel is configured to receive the driver blade. A workpiece contact element is movably supported by the nosepiece. The workpiece contact element includes one of a plurality of recesses or a plurality of protrusions. The workpiece contact element is movable along the longitudinal axis between a first position and a second position. An endcap is removably coupled to an end portion of the workpiece contact element. The endcap is configured to contact a workpiece for moving the workpiece contact element from the first position to the second position. The endcap includes a body having the other of the plurality of recesses or the plurality of protrusions positioned on lateral sides of the body. The protrusions are engageable with the recesses for securing the endcap to the workpiece contact element. The body is formed from a plurality of different materials.

In some embodiments, the body of the endcap includes an interior portion and an exterior portion surrounding the interior portion. The interior portion is formed from a first material. The exterior portion is formed from a second material. The first material has a hardness that is greater than a hardness of the second material. In further other embodiments, at least a portion of the workpiece contact element also defines the firing channel.

The present invention provides, in another aspect, a fastener driver including a housing, a cylinder supported by the housing, and a moveable piston positioned within the cylinder. A driver blade is attached to the piston and movable therewith between a top-dead-center (TDC) position and a bottom-dead-center (BDC) position. The driver blade include a body portion extending along a longitudinal axis. A nosepiece is supported by the housing. The nosepiece defines a firing channel extending along the longitudinal axis. The firing channel is configured to receive the driver blade. A workpiece contact element is movably supported by the nosepiece. The workpiece contact element includes an end portion having first and second recesses or first and second protrusions. The workpiece contact element is movable along the longitudinal axis between a first position and a second position. An endcap is removably coupled to the end portion of the workpiece contact element. The endcap is configured to contact a workpiece for moving the workpiece contact element from the first position to the second position. The end cap includes a body having the other of the first and second recesses or the first and second protrusions positioned on lateral sides of the body. The first and second protrusions are engageable with the respective first and second recesses for securing the endcap to the workpiece contact element. The body includes an interior portion and an exterior portion surrounding the interior portion. The interior portion is formed from a first material and the exterior portion is formed from a second material. The first material has a hardness that is greater than a hardness of the second material.

The present invention provides, in another aspect, a fastener driver including a cylinder, a moveable piston positioned within the cylinder, and a driver blade attached to the piston and movable therewith between a top-dead-center (TDC) position and a bottom-dead-center (BDC) position. The driver blade defines a driving axis. The driver blade includes a body having a first side and an opposite, second side with the driving axis passing therebetween. A plurality of teeth extend from the first side of the body. A plurality of projections extend from the second side of the body. The body and the projections are bisected by a common plane. A lifter is operable to move the driver blade from the BDC position toward the TDC position. The lifter is configured to engage with the teeth of the driver blade when moving the driver blade from the BDC position to the TDC position. The teeth extend at an oblique angle from the first side of the body relative to the common plane.

The present invention provides, in another aspect, a fastener driver including a housing, a cylinder supported by the housing, and a moveable piston positioned within the cylinder. A driver blade is attached to the piston and movable therewith between a top-dead-center (TDC) position and a bottom-dead-center (BDC) position. The driver blade includes a body portion extending along a longitudinal axis.

The body portion has a first side and an opposite, second side with the longitudinal axis extending therebetween. The driver blade also includes a plurality of teeth extending from the first side of the body portion, and a tip portion configured to contact a fastener. A lifter is operable to move the driver blade from the BDC position toward the TDC position. The lifter is configured to engage with the teeth of the driver blade when moving the driver blade from the BDC position to the TDC position. A transmission is provided for providing torque to the lifter. The body portion is bisected by a common plane containing the longitudinal axis. The teeth extend at an oblique angle from the first side of the body portion relative to the common plane. The tip portion is bisected by a central axis that is parallel with the longitudinal axis such that the tip portion is laterally offset relative to the body portion.

The present invention provides, in yet another aspect, a fastener driver including a housing, a cylinder supported by the housing, and a moveable piston positioned within the cylinder. A driver blade is attached to the piston and movable therewith between a top-dead-center (TDC) position and a driven or bottom-dead-center (BDC) position. The driver blade defines a driving axis. The driver blade includes a body having a first side and an opposite, second side with the driving axis passing therebetween. A plurality of teeth extends from the first side of the body. A plurality of projections extends from the second side of the body. A lifter is operable to move the driver blade from the BDC position toward the TDC position. The lifter is configured to engage with the teeth of the driver blade when moving the driver blade from the BDC position to the TDC position. A motor and a transmission operatively coupled to the motor is provided for providing torque to the lifter. A latch assembly is movable between a latched state in which the driver blade is held in an intermediate position against a biasing force of compressed gas, and a released state in which the driver blade is permitted to be driven by the biasing force toward the BDC position. The latch assembly includes a latch configured to engage with the projections, and a solenoid for moving the latch out of engagement with the driver blade when transitioning from the latched state to the released state. A magazine is configured to receive fasteners. A nosepiece includes a fastener driving channel from which consecutive fasteners from the magazine are driven. The nosepiece includes a first surface and a second surface opposite the first surface. The first surface at least partially defines the fastener driving channel. The second surface is coupled to the magazine. The fastener driver is divided by the driving axis into a first side and a second side. The lifter, the motor, and the transmission are located on the first side. The magazine is located on the second side. The solenoid is located on the second side. The solenoid defines a solenoid axis extending in a direction along the driving axis and behind the second surface of the nosepiece.

In some embodiments, the fastener driver further includes a frame positioned within the housing and coupled to the cylinder. The nosepiece is supported by the frame. The frame includes a solenoid support portion located on the second side of the fastener driver. The solenoid support portion is configured to support the solenoid.

The present invention provides, in another aspect, a fastener driver including a cylinder, a moveable piston positioned within the cylinder, and a driver blade attached to the piston and movable therewith between a top-dead-center (TDC) position and a driven or bottom-dead-center (BDC) position. The driver blade defines a driving axis. The driver blade includes a body having a first side and an opposite, second side with the driving axis passing therebetween. A plurality of teeth extends from the first side of the body. A plurality of projections extends from the second side of the body. A lifter is operable to move the driver blade from the BDC position toward the TDC position. The lifter is configured to engage with the teeth of the driver blade when moving the driver blade from the BDC position to the TDC position. A latch assembly is movable between a latched state in which the driver blade is held in an intermediate position against a biasing force of compressed gas, and a released state in which the driver blade is permitted to be driven by the biasing force toward the BDC position. The latch assembly includes a latch pivotable about a pivot axis toward and away from the projections. The pivot axis extends perpendicular to the driving axis. The latch assembly further includes a solenoid for pivoting the latch about the pivot axis. In the released state, the latch is divided by a latch axis, which extends parallel with the driving axis and perpendicular to the pivot axis, into a first side and a second side. The first side is located laterally closer to the driving axis than the second side. The latch includes a projection located on the second side such that the latch is weighted to pivot the latch away from the projections and toward the released state of the latch assembly.

The present invention provides, in yet another aspect, a fastener driver including a cylinder, a moveable piston positioned within the cylinder, and a driver blade attached to the piston and movable therewith between a top-dead-center (TDC) position and a driven or bottom-dead-center (BDC) position. The driver blade defines a driving axis. A lifter is operable to move the driver blade from the BDC position toward the TDC position. A motor and a transmission operatively coupled to the motor is provided for providing torque to the lifter. A magazine is configured to receive fasteners. The magazine includes a first end and a second end opposite the first end, and a first side and a second side spaced from the first side. The first and second sides extend between the first and second ends. A pusher is slidably coupled to the magazine. A nosepiece is coupled to the first end of the magazine. The nosepiece is configured to slidably support the driver blade. A workpiece contact element is movable with respect to the nosepiece. A blocking member is pivotally coupled to the nosepiece. The blocking member is biased toward a first position. The pusher moves the blocking member to a second position where the blocking member blocks movement of the workpiece contact element when a predetermined number of fasteners remain in the magazine. The first side of the magazine is in facing relationship with the motor and the transmission. The blocking member extends from the nosepiece on the first side of the magazine.

The present invention provides, in yet another aspect, a fastener driver including a magazine configured to receive fasteners, and a nosepiece including a fastener driving channel from which consecutive fasteners from the magazine are driven. The magazine extends between a first end and a second end opposite the first end. The nosepiece is coupled to the first end. The magazine includes a guide member positioned within the magazine. The guide member has an end positioned proximate the second end of the magazine. The guide member is movable between a first position in which the end of the guide member is spaced away from an internal surface of the magazine, and a second position in which the end of the guide member is moved toward the internal surface. The magazine further includes a biasing member biasing the guide member toward the first position. The guide member is selectively movable from the first position toward the second position based on a length the fasteners.

Other features and aspects of the invention will become apparent by consideration of the following detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

Figure 1A:
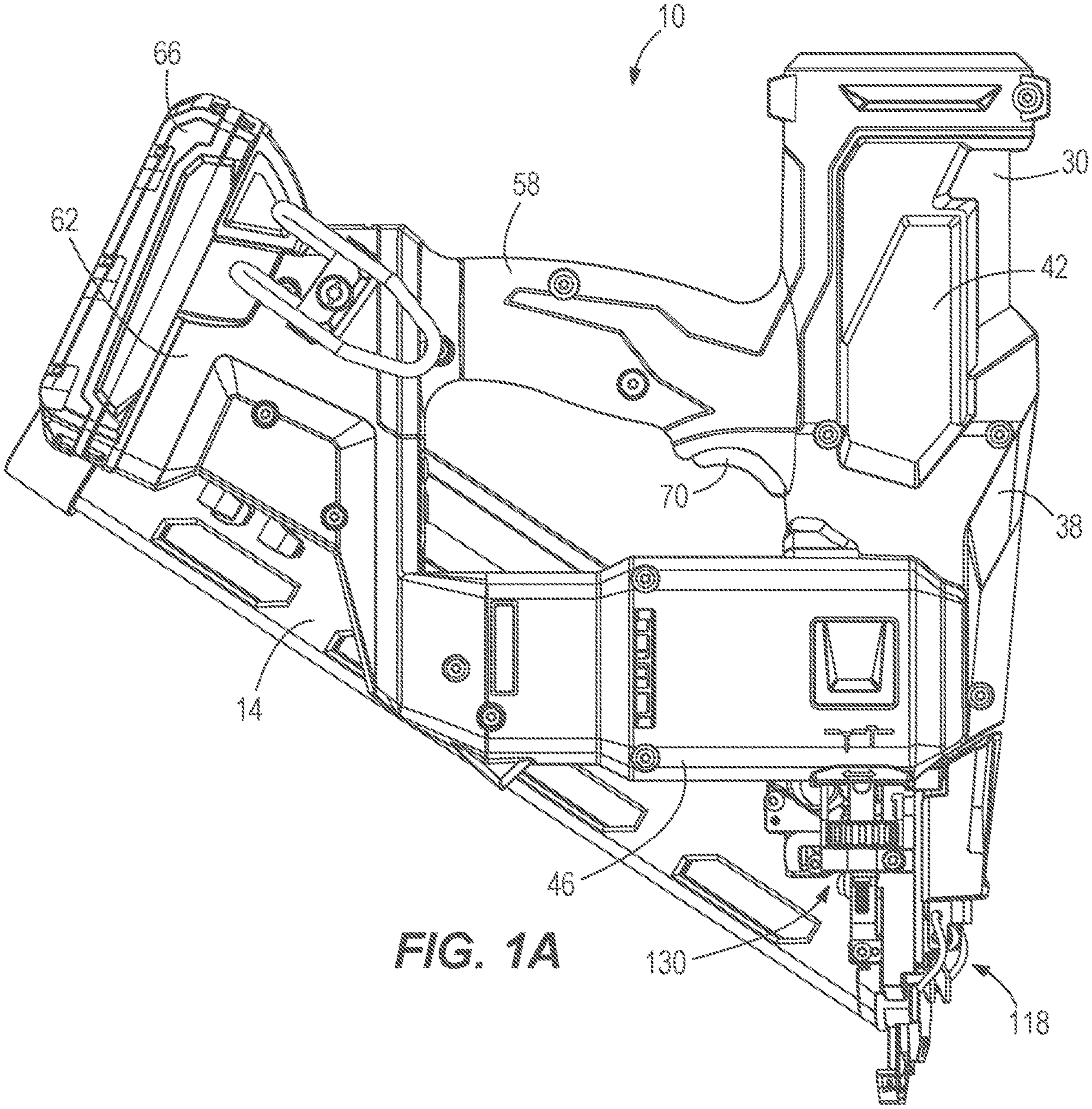
FIG. 1A is a side view of a powered fastener driver in accordance with an embodiment of the invention.
Figure 1B:
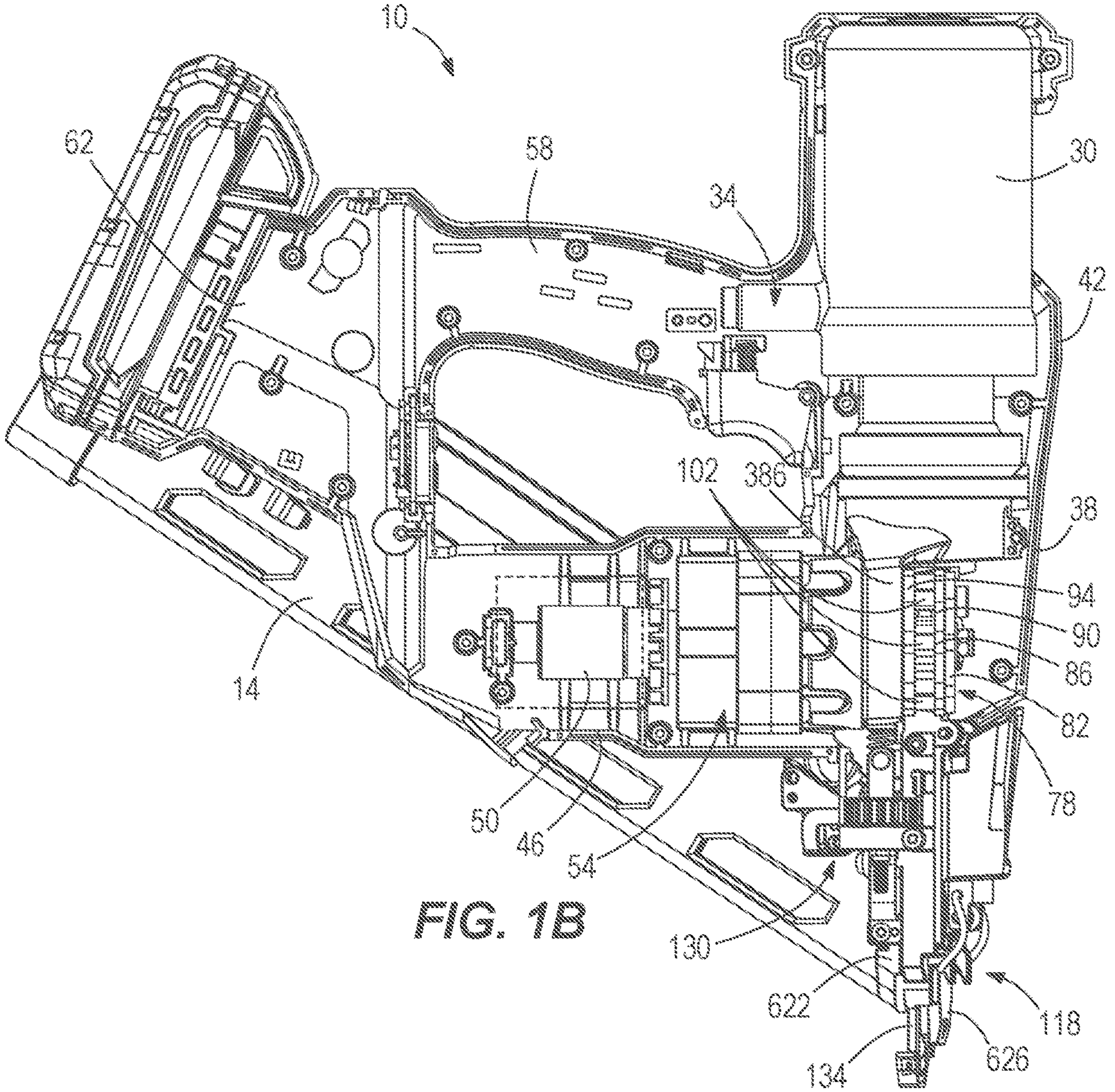
FIG. 1B is another side view of the powered fastener driver of FIG. 1A, with portions of a housing of the powered fastener driver of FIG. 1A removed.
Figure 2:
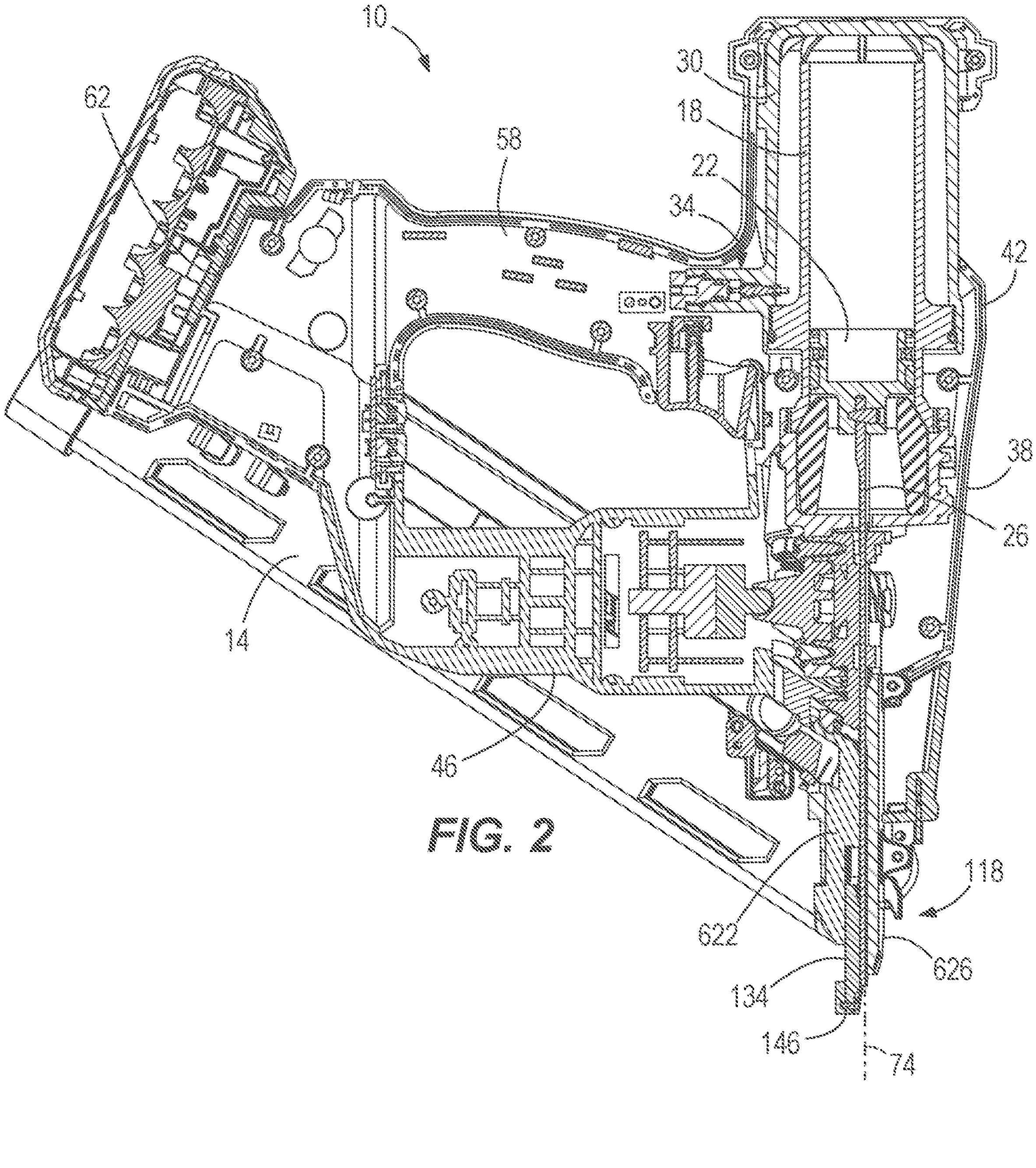
FIG. 2 is a cross-sectional view of the powered fastener driver of FIG. 1A.

With reference to FIGS. 1A-3, powered fastener driver 10 is operable to drive fasteners (e.g., nails, tacks, staples, etc.) held within a magazine 14 into a workpiece. The fastener driver 10 includes an inner cylinder 18 and a moveable piston 22 positioned within the cylinder 18 (FIG. 2). The fastener driver 10 further includes a driver blade 26 that is attached to the piston 22 and moveable therewith. The fastener driver 10 does not require an external source of air pressure, but rather includes an outer storage chamber cylinder 30 of pressurized gas in fluid communication with the inner cylinder 18. In the illustrated embodiment, the inner cylinder 18 and moveable piston 22 are positioned within the storage chamber cylinder 30. With reference to FIG. 1B, the driver 10 further includes a fill valve 34 coupled to the storage chamber cylinder 30. When connected with a source of compressed gas, the fill valve 34 permits the storage chamber cylinder 30 to be refilled with compressed gas if any prior leakage has occurred. The fill valve 34 may be configured as a Schrader valve, for example.

With reference to FIGS. 1A-1B, the fastener driver 10 includes a housing 38 having a cylinder housing portion 42 and a motor housing portion 46 extending therefrom. The cylinder housing portion 42 is configured to support the cylinders 18, 30, whereas the motor housing portion 46 is configured to support a motor 50 and a transmission 54 operatively coupled to the motor 50. The illustrated transmission 54 is configured as a planetary transmission having three planetary stages. In alternative embodiments, the transmission 54 may be a single-stage planetary transmission, or a multi-stage planetary transmission including any number of planetary stages.

The housing 38 further includes a handle portion 58 extending from the cylinder housing portion 42, and a battery attachment portion 62 coupled to an opposite end of the handle portion 58. A battery 66 (FIG. 1A) is electrically connectable to the motor 50 for supplying electrical power to the motor 50. The handle portion 58 supports a trigger 70, which is depressed by a user to initiate a firing cycle of the fastener driver 10.

With reference to FIG. 2, the inner cylinder 18 and the driver blade 26 define a longitudinal (or "driving") axis 74. During a firing cycle, the driver blade 26 and piston 22 are moveable between a top-dead-center (TDC) position and a driven or bottom-dead-center (BDC) position. The fastener driver 10 further includes a lifting assembly 78 (FIG. 3), which is powered by the motor 50, and which is operable to move the driver blade 26 from the BDC position toward the TDC position.

In operation, the lifting assembly 78 drives the piston 22 and the driver blade 26 toward the TDC position by energizing the motor 50. As the piston 22 and the driver blade 26 are driven toward the TDC position, the gas above the piston 22 is compressed. Prior to reaching the TDC position, the motor 50 is deactivated and the piston 22 and the driver blade 26 are held in a ready position, which is located between the TDC and the BDC positions. Upon user depression of the trigger 70 (FIG. 1A), the lifter assembly 78 continues lifting of the driver blade 26 from the ready position to the TDC position where the driver blade 26 is released from the lifter assembly 78. When released, the compressed gas above the piston 22 and within the storage chamber cylinder 30 drives the piston 22 and the driver blade 26 to the BDC position, thereby driving a fastener into the workpiece. The illustrated fastener driver 10 therefore operates on a gas spring principle utilizing the lifting assembly 78 and the piston 22 to compress the gas within the inner cylinder 18 and the storage chamber cylinder 30. Further detail regarding the structure and operation of the fastener driver 10 is provided below.

Figure 3:
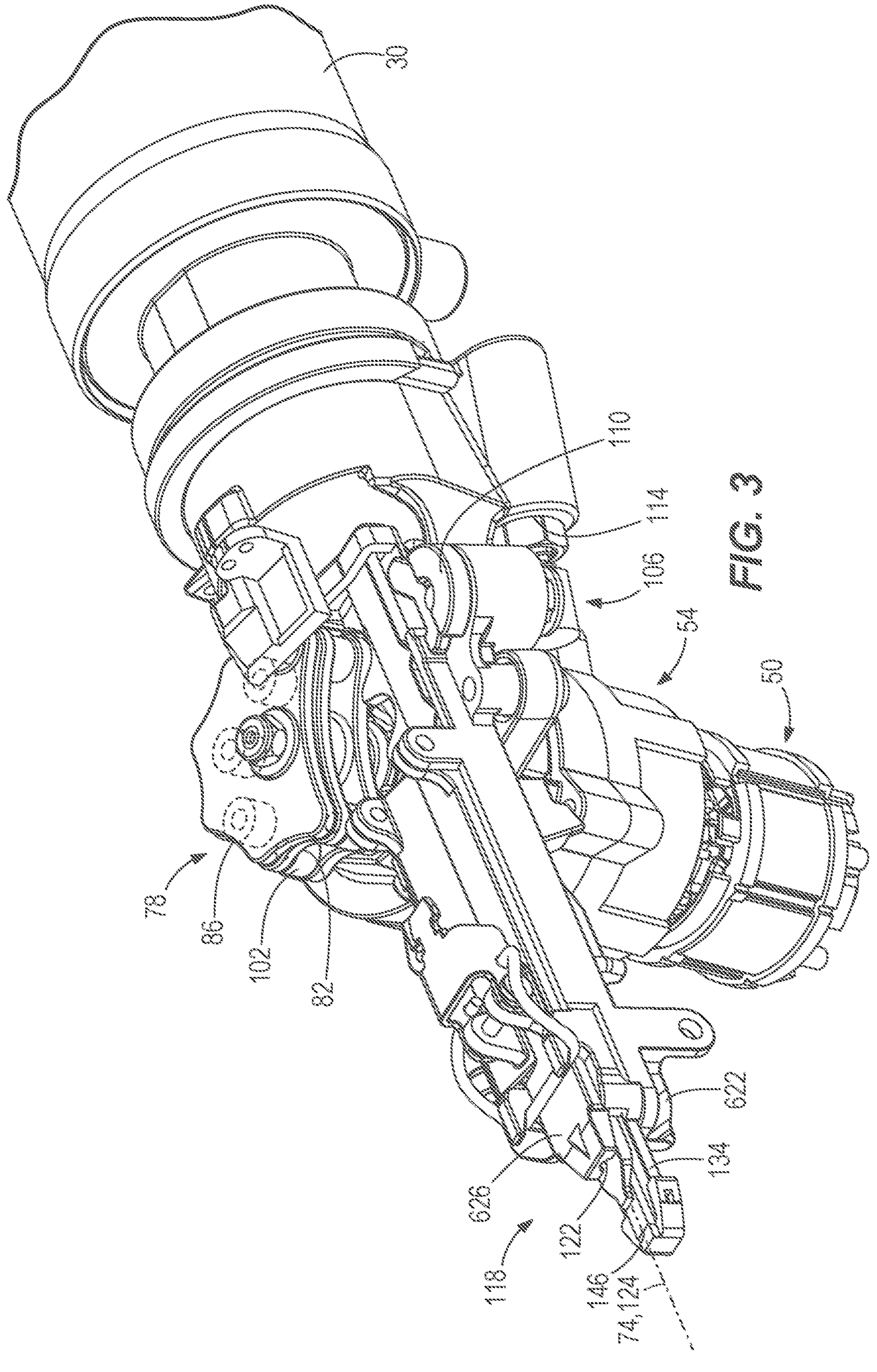
FIG. 3 is a perspective view of the powered fastener driver of FIG. 1A, with portions removed for clarity.

With reference to FIG. 3, the lifter 82, which is a component of the lifting assembly 78, is coupled for co-rotation with an output shaft 422 (FIGS. 18A-18B) of the transmission 54. The lifter 82 includes a hub 86. An end of the transmission output shaft 422 is rotatably secured to the hub 86. The illustrated hub 86 is formed by two plates 90, 94 (FIG. 1B), and includes multiple drive pins 98 (FIG. 9) extending between the plates 90, 94. The lifter 82 further includes roller bushings 102 positioned on each of the drive pins 98. The roller bushings 102 are configured to facilitate rolling motion between the driver pins 98 and the driver blade 26 when raising the driver blade 26 from the BDC position to the ready position. This may reduce wear on the driver blade 26 (i.e., teeth) and/or the lifter 82, which may increase the life of the driver 10. The illustrated lifter 82 includes six drive pins 98; however, in other embodiments, the lifter 82 may include three or more drive pins 98. The drive pins 98 and roller bushings 102 are sequentially engageable with the driver blade 26 to raise the driver blade 26 from the BDC position to the ready position.

With continued reference to FIG. 3, the driver 10 further includes a latch assembly 106 having a pawl or latch 110 for selectively holding the driver blade 26, and a solenoid 114 for releasing the latch 110 from the driver blade 26. The latch assembly 106 is moveable between a latched state in which the driver blade 26 is held in an intermediate position located between the BDC position and the ready position against a biasing force (i.e., the pressurized gas in the storage chamber cylinder 30), and a released state in which the driver blade 26 is permitted to be driven by the pressurized gas in the storage chamber cylinder 30 from the ready position toward the BDC or driven position. The latch 110 is moveable between a latched position (coinciding with the latched state of the latch assembly 106) in which the latch 110 is engaged with one of a plurality of projections 188 on the driver blade 26 for holding the driver blade 26 in the ready position against the biasing force of the compressed gas, and a released position (coinciding with the released state of the latch assembly 106) in which the driver blade 26 is permitted to be driven by the biasing force of the compressed gas from the ready position to the BDC position.

Figure 9:
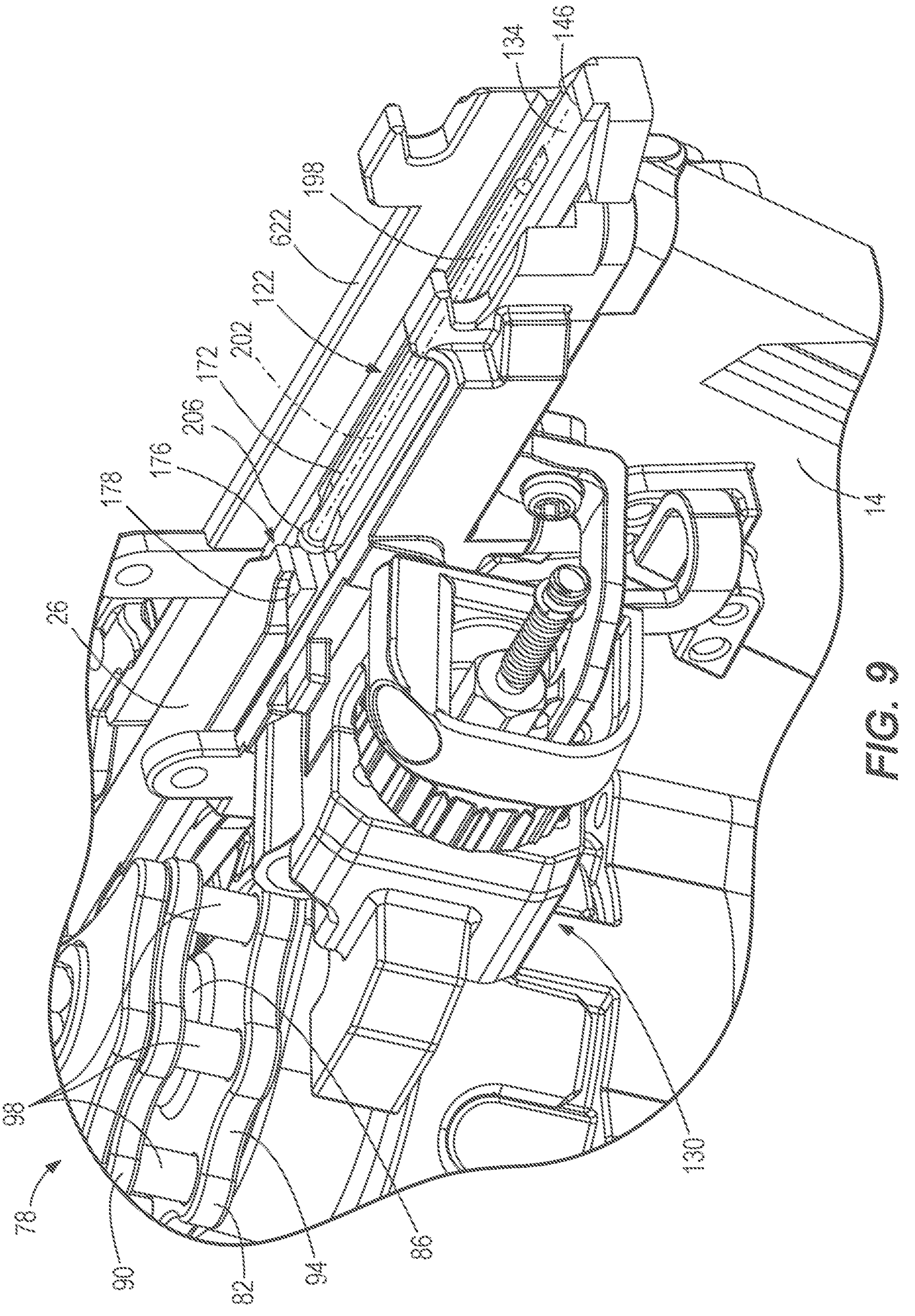
FIG. 9 is an enlarged view of the powered fastener driver of FIG. 1, with portions removed for clarity, illustrating a fastener received in a firing channel and a workpiece contact element within the firing channel.

With continued reference to FIG. 3, the driver 10 further includes a nosepiece 118 positioned at a front end 630 (FIG. 25) of the magazine 14. The nosepiece 118 defines a firing channel 122 (or "fastener driving channel") (only a portion of which is shown in FIG. 9) in communication with a fastener channel 642 (FIG. 26) in the magazine 14. The firing channel 122 is configured to consecutively receive fasteners from a collated fastener strip within the fastener channel of the magazine 14. The firing channel 122 includes a firing axis 124 that is aligned with the longitudinal axis 74.

With reference to FIGS. 1B and 9, the driver 10 further includes a depth of drive adjustment mechanism 130 including a workpiece contact element 134, the protruding length of which relative to the distal end of the nosepiece 118 is adjustable to vary the depth to which a fastener is driven in to a workpiece. The workpiece contact element 134 includes an end 146 configured to engage a workpiece, as described above.

The workpiece contact element 134 is movable relative to the nosepiece 118 between an extended position and a retracted position. A spring (not shown) is configured to bias the workpiece contact element 134 toward the extended position. The workpiece contact element 134 is configured to be moved from the extended position toward the retracted position when the workpiece contact element 134 is pressed against a workpiece.

Figure 4:
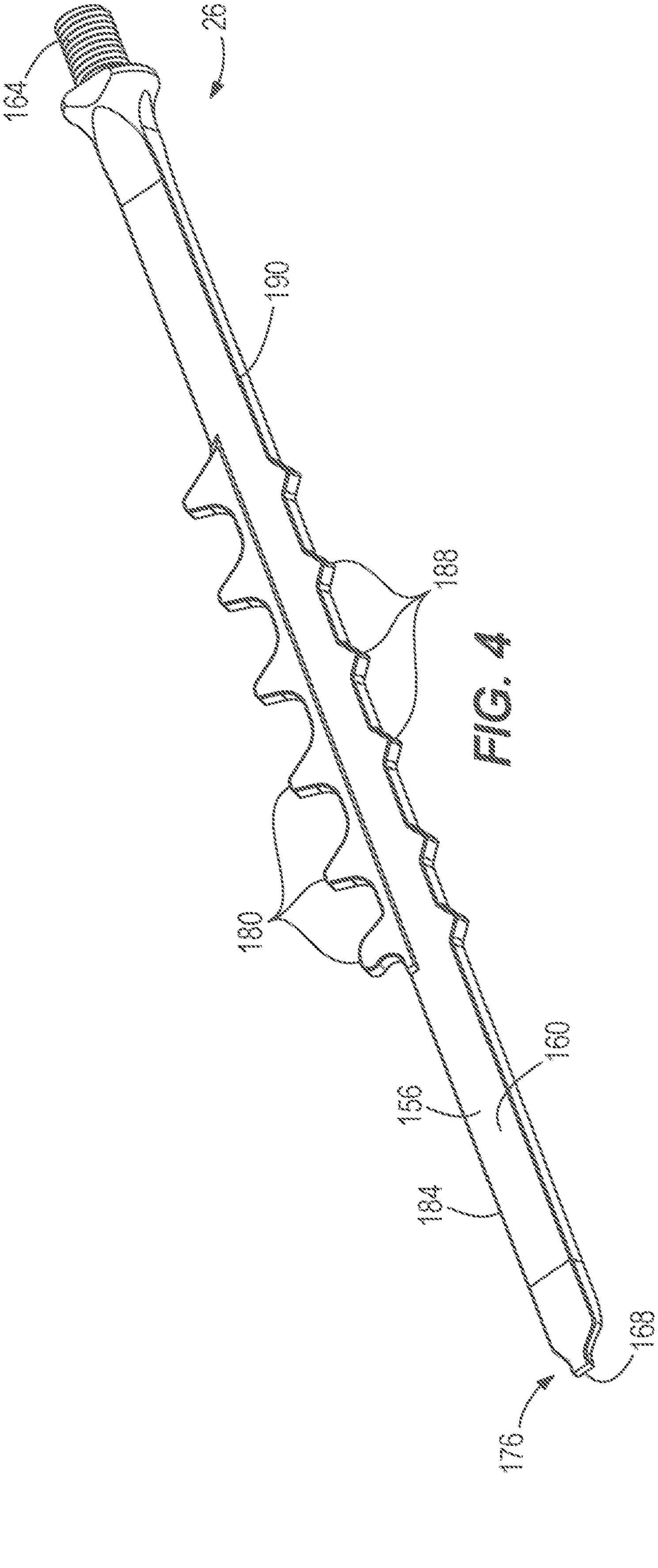
FIG. 4 is a front perspective view of a driver blade of the powered fastener driver of FIG. 1A.
Figure 5:
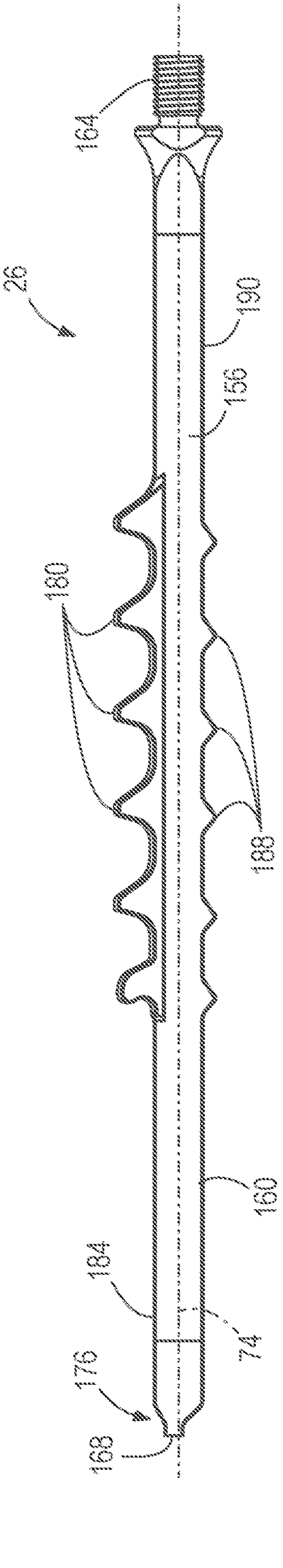
FIG. 5 is a front view of the driver blade of FIG. 4.
Figure 7:
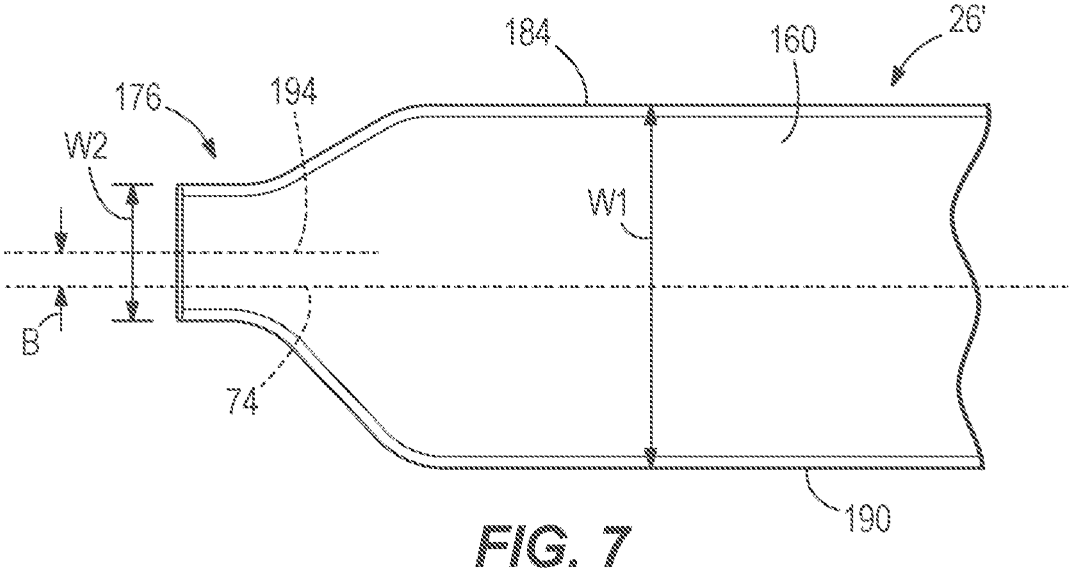
FIG. 7 is an enlarged, front view of a portion of the driver blade of FIG. 5.

With reference to FIGS. 4, 5, and 7, the driver blade 26 extends between a first end 164 and a second end 168 along the longitudinal axis 74. The first end 164 is coupled to the piston 22 (e.g., by a threaded connection, a pinned connection, or the like), and the second end 168 is configured to contact a fastener 172 (FIG. 9) during a firing cycle. In the illustrated embodiment, the driver blade 26 includes an elongated body 156 having a body portion 160 connected to the piston 22 (at the first end 164) and a tip portion 176 adjacent the second end 168. The body portion 160 narrows or tapers toward the tip portion 176 (FIG. 7). Accordingly, the body portion 160 of the driver blade 26 has a first width W1, and the tip portion 176 has a second width W2 that is less than the first width W1.

Figure 10:
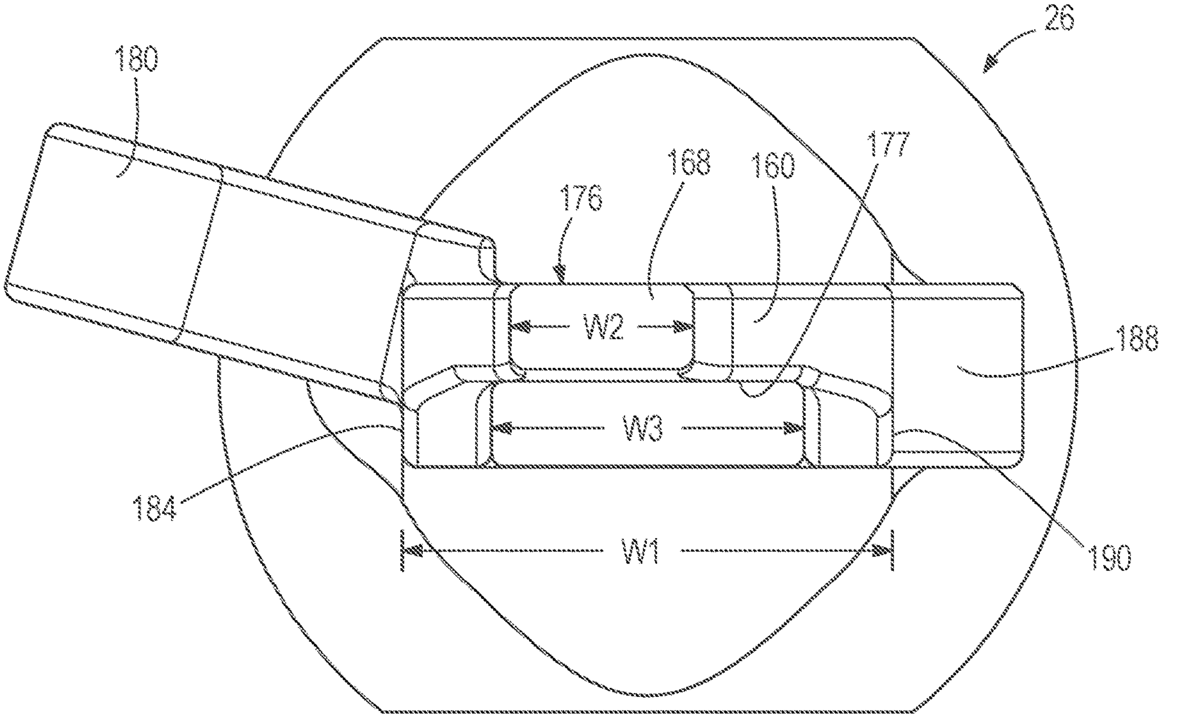
FIG. 10 is a bottom view of the driver blade of FIG. 4.

With reference to FIGS. 9 and 10, the illustrated driver blade 26 includes a slot 177 extending along the longitudinal axis 74. The slot 177 is configured to receive a rib 178 (FIG. 9) extending from the nosepiece 118 (i.e., the base 138). The slot has a third width W3 (FIG. 10) corresponding to a width of the rib 178. In the illustrated embodiment, the third width W3 is less that W1, but greater than W2. A center of the width W3 of the slot 177 is aligned with the longitudinal axis 74. The slot 177 and the rib 178 are configured to facilitate movement of the driver blade 26 along the longitudinal axis 74 and inhibit movement of the driver blade 26 off-axis. (i.e., left or right from the frame of reference in FIG. 10). In some embodiments, the driver blade 26 may include the rib 178 and the nosepiece 118 may include the slot 177.

The driver blade 26 includes teeth 180 along the length of the body portion 160. With particular reference to FIG. 5, the teeth 180 extend from a first side 184 of the driver blade 26 in a non-perpendicular direction relative to the longitudinal axis 74. The respective roller bushings 102 are engageable with the teeth 180 when returning the driver blade 26 from the BDC position to the ready position. The illustrated driver blade 26 includes six teeth 180 such that one revolution of the lifter 82 moves the driver blade 26 from the BDC position to the ready position. Furthermore, because the roller bushings 102 are capable of rotating relative to the respective driver pins 98, sliding movement between the roller bushings 102 and the teeth 180 is inhibited when the lifter 82 is moving the driver blade 26 from the BDC position to the ready position. As a result, friction and attendant wear on the teeth 180 that might otherwise result from sliding movement between the driver pins 98 and the teeth 180 is reduced. The driver blade 26 further includes the axially spaced projections 188 formed on a second side 190 opposite the teeth 180. The latch 110 is engageable with one of the projections 188 when maintaining the driver blade 26 in the ready position, as discussed above.

With particular reference to FIG. 7, the tip portion 176 is offset relative to the longitudinal axis 74, which bisects (i.e., extends along a center of) the body portion 160. The tip portion 176 is bisected by a central axis 194 that is parallel with the longitudinal axis 74. In other words, the tip portion 176 is positioned closer to the first side 184 of the driver blade 26 than the second side 190 of the driver blade 26, such that the tip portion 176 is laterally offset relative to the body portion 160, the purpose of which is described below.

Figure 22:
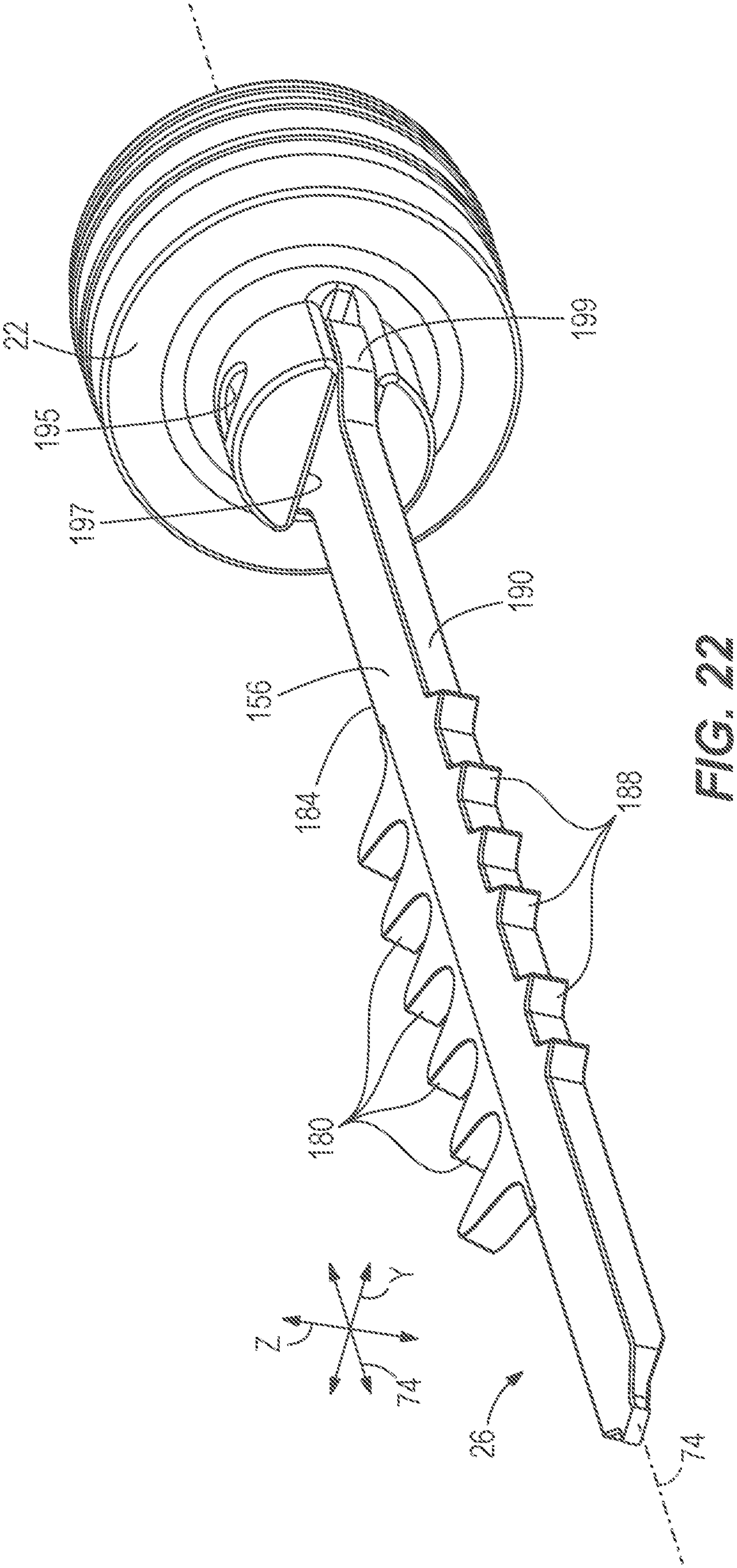
FIG. 22 is a perspective view of the piston of the powered fastener driver of FIG. 2, and a driver blade coupled to the piston.
Figure 23:
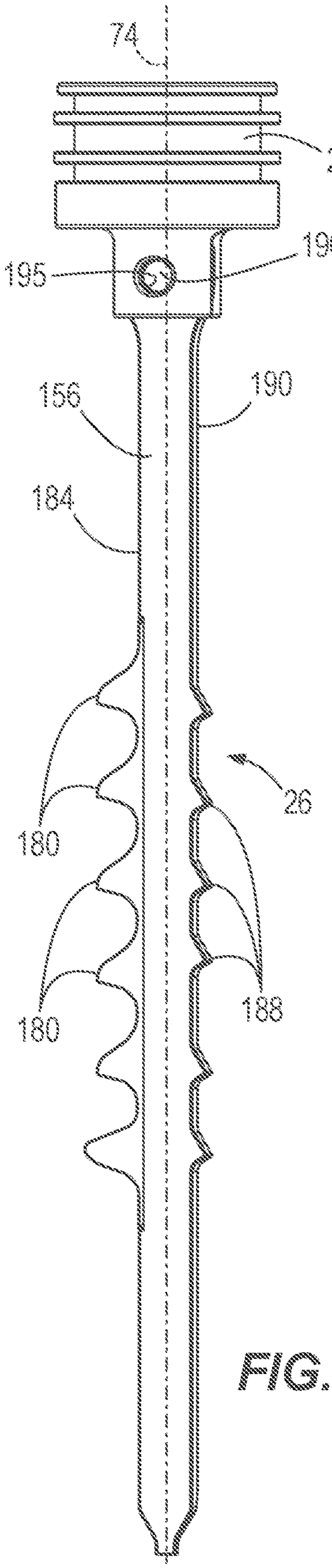
FIG. 23 is a front view of the piston and the driver blade of FIG. 22.
Figure 24:
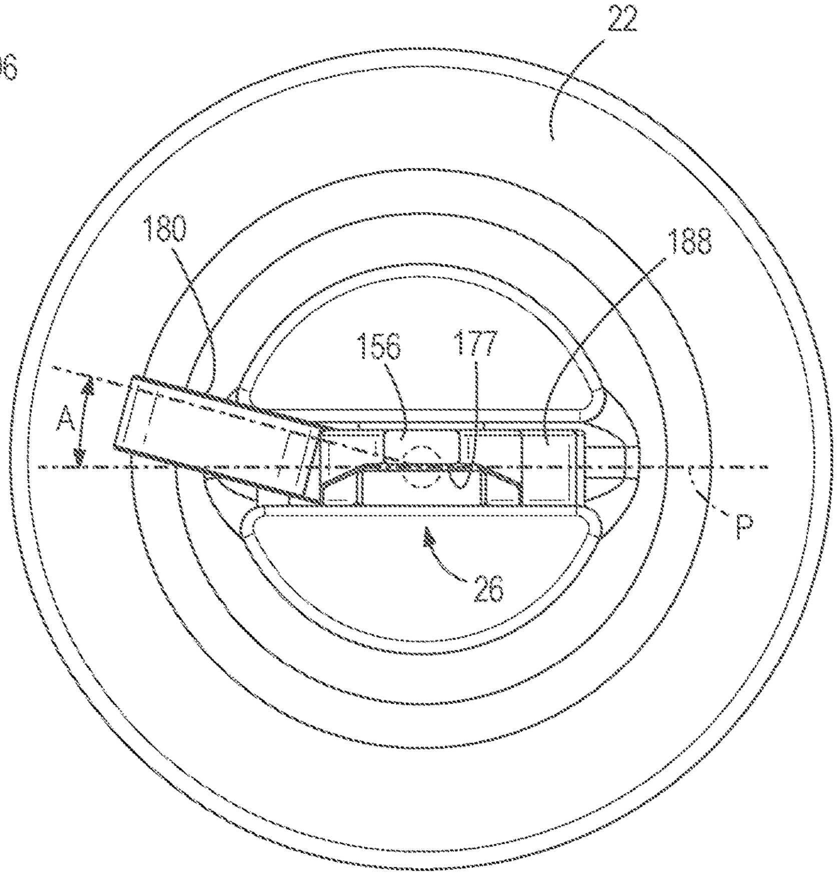
FIG. 24 is a bottom view of the piston and the driver blade of FIG. 22.

With reference to FIGS. 22-24, the illustrated driver blade 26 is manufactured such that the body 156, and each of the projections 188 are bisected by a common plane P (FIG. 24). The longitudinal axis 74 extends perpendicular to the plane P.

With particular reference to FIG. 24, the teeth 180 extend from the first side 184 of the body 156 in an oblique direction relative to the plane P. For example, the illustrated teeth 180 extend in a direction at an angle A of about 20 degrees relative to the plane P. In other embodiments, the angle A may be between about 10 degrees and 40 degrees. Still further, in other embodiments, the angle A may be between about 15 degrees and 30 degrees. Accordingly, the teeth 180 are not in the same plane P as the projections 188. The inclined or oblique direction that the teeth 180 extend may reduce an overall size of the tool 10, thereby decreasing an overall weight of the tool 10.

With reference to FIGS. 22-23, rather than a threaded connection as shown in FIGS. 4 and 5, the illustrated driver blade 26 is coupled to the piston 22 by a pinned connection. In the illustrated embodiment, the piston 22 includes an opening 195 that is aligned with an opening in the driver blade 26. A pin 196 (FIG. 23) extends through the opening 195 of the piston 22 and the opening of the driver blade 26 for coupling the piston 22 and the driver blade 26 together. In addition, the piston 22 defines a slot 197 configured to receive an end portion 199 of the driver blade 26. The illustrated slot 197 extends perpendicular to the longitudinal axis 74. The pin 196 is configured to extend through the end portion 199 of the driver blade 26 when it is received in the slot 197. The pinned connection is configured to limit movement of the driver blade 26 relative to the piston 22 in select directions. For example, in the illustrated embodiment, the pin 196 extends through driver blade 26 along a vertical axis Z transverse to the longitudinal axis 74 (e.g., between a top and a bottom of the driver blade 26 from the frame of reference of FIG. 22), and the end portion 199 extends transverse to the longitudinal axis 74 within the slot 197. Accordingly, the pinned connection inhibits movement of the driver blade 26 relative to the piston 22 along the vertical axis Z (e.g., in a top or bottom direction from the frame of reference of FIG. 22), but allows limited movement of the driver blade 26 relative to the piston 22 along a lateral axis Y (e.g., left or right direction along the plane P from the frame of reference of FIGS. 22 and 24), which is transverse to both the longitudinal axis 74 and the vertical axis Z.

With reference to FIG. 9, a fastener 172 received in the firing channel 122 of the nosepiece 118 has a shank 198 extending along a fastener axis 202. When the fastener 172 is loaded in the firing channel 122, the fastener axis 202 is aligned with the longitudinal axis 74. In addition, in the illustrated embodiment, the fastener 172 is a nail including a nail head 206 positioned on one end of the shank 198. The tip portion 176 of the driver blade 26 is configured to contact the nail head 206 as the driver blade 26 is driven from the TDC position to the BDC position.

Figure 8C:
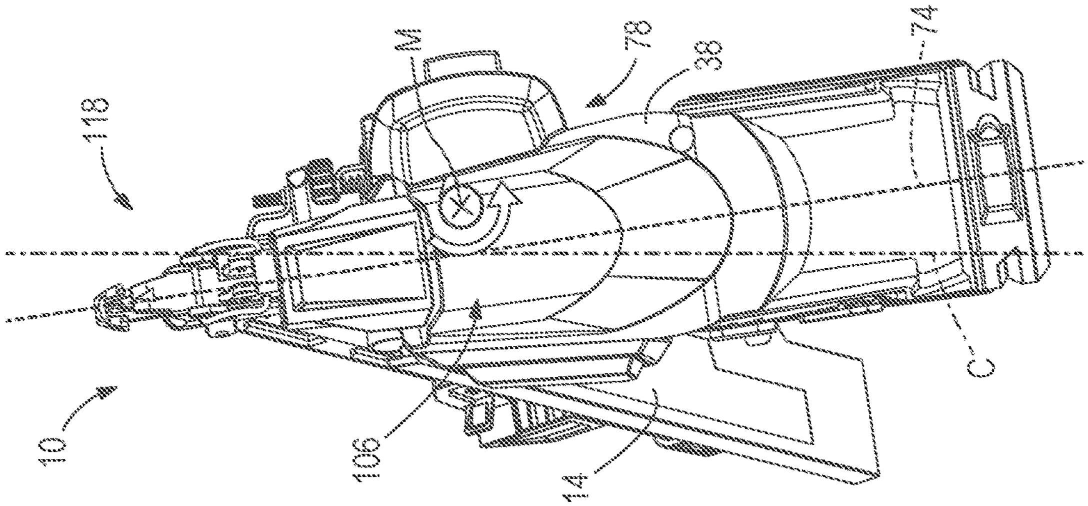
FIGS. 8A, 8B, 8C are front views of the powered fastener driver of FIG. 1, illustrating a reaction force applied to the fastener driver during a fastener driving operation.
Figure 8B:
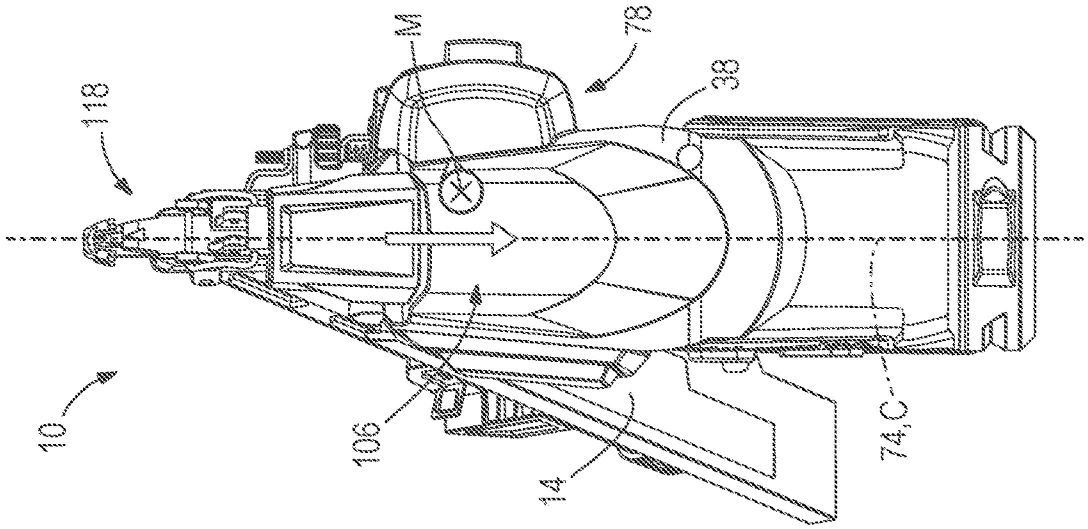
Figure 8A:
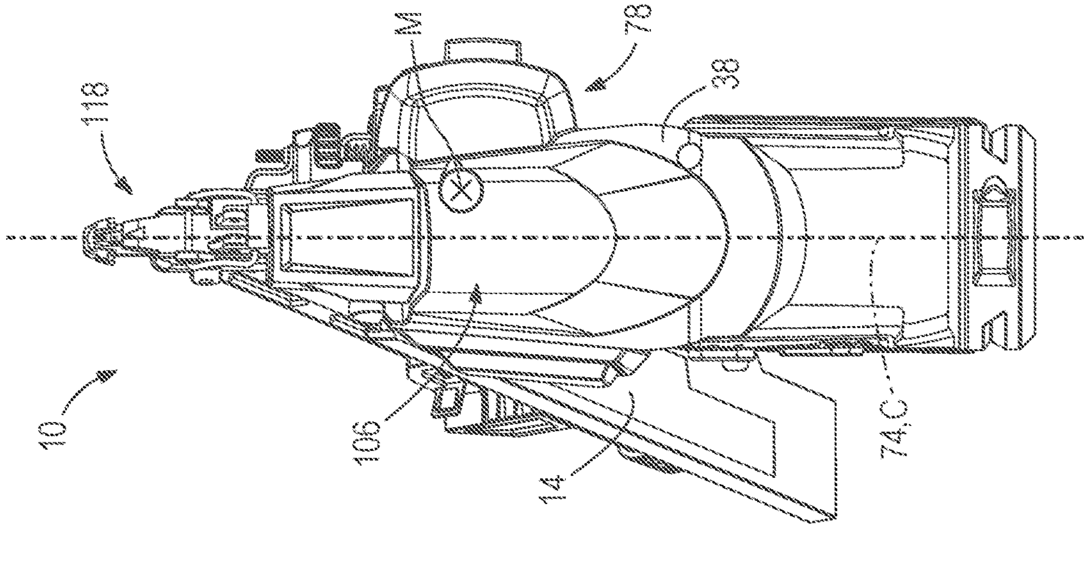

With reference to FIGS. 8A-8C, prior to a fastener driving cycle, the longitudinal axis 74 of the fastener driver 10 is contained within a central plane C, which is perpendicular to an underlying workpiece. The lifting assembly 78 is positioned on one side of the plane C (e.g., to the right from the frame of reference of FIGS. 8A-8C), and the latch assembly 106 is positioned on the opposite side of the plane C (e.g., to the left from the frame of reference of FIGS. 8A-8C). The location of the lifting assembly 78 causes a center of mass M of the fastener driver 10 to shift such that the center of mass M is located offset from the plane C toward the lifter-side of the fastener driver 10 (e.g., to the right from the frame of reference of FIGS. 8A-8C). When the driver blade 26 is driven from the TDC position to the BDC position, the fastener 172 in the firing channel 122 is driven along the longitudinal axis 74, and a reaction or recoil force is applied to the fastener driver 10 in an equal and opposite direction D1, which is coaxial with the longitudinal axis 74 and thus contained within the plane C. The recoil force imparts a moment about the center of mass M of the fastener driver 10, causing it to rotate (i.e., counter-clockwise from the frame of reference of FIG. 8C) as the fastener 172 is driven into a workpiece. This causes the longitudinal axis 74 to tilt to an oblique angle relative to the plane C and the workpiece, thereby misaligning the longitudinal axis 74 with the plane C shortly after the driver blade 26 reaches the BDC position.

Figure 6:
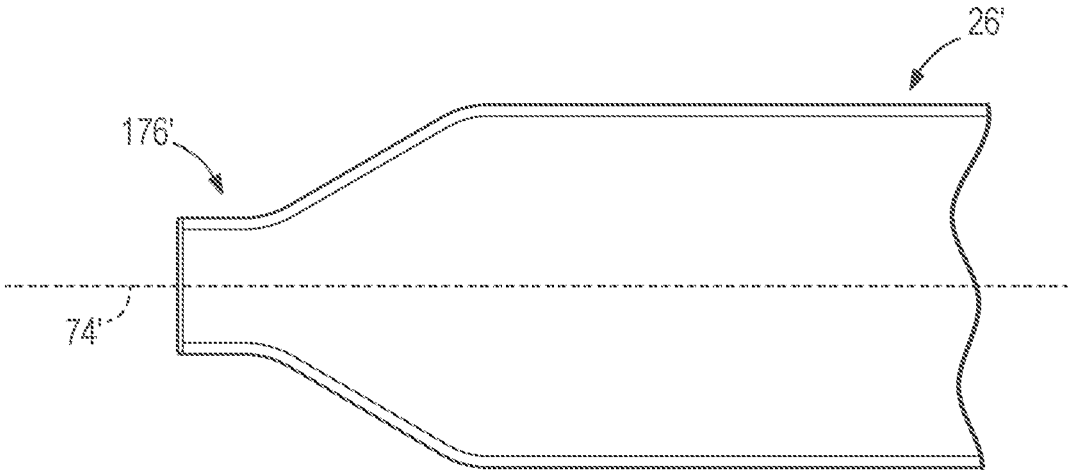
FIG. 6 (PRIOR ART)
FIG. 6 is an enlarged, front view of a portion of a prior art driver blade.

FIG. 6 illustrates a conventional driver blade 26' having a tip portion 176' that is aligned with a longitudinal axis 74'. When the driver blade 26' is used with the fastener driver 10 having a center of mass M that is located offset from the plane C, as described above, at least a portion of the tip portion 176' may contact the workpiece shortly after the driver blade 26' reaches the BDC position due to the rotation of the fastener driver 10 about the center of mass M by the recoil force. More specifically, rotation of the fastener driver 10 causes a position of the driver blade 26' to be shifted (e.g., laterally) relative to the nail head 206 as the fastener 172 is driven into the workpiece. As such, a portion of the tip portion 176' extends past or protrudes over the nail head 206 shortly after the driver blade 26' reaches the BDC position. This portion of the tip portion 176' that has shifted and does not contact the nail head 206 as the driver blade 26' reaches the BDC position will engage or hit the workpiece proximate the nail head 206, thereby possibly causing damage to the workpiece.

As illustrated in FIG. 7, the central axis 194 of the tip portion 176 embodying the invention is offset from the longitudinal axis 74 a predetermined distance B. Therefore, the central axis 194 of the tip portion 176 is laterally offset from the longitudinal, firing, and fastener axes 74, 124, 202, respectively, resulting in the tip portion 176 contacting only a portion of the nail head 206 during a fastener driving cycle. That is, a partial width of the tip portion 176 will extend past (e.g., overhang), or not otherwise contact, the nail head 206 during a fastener driving cycle.

The predetermined distance B is selected such that the tip portion 176 remains in contact with the nail head 206 through the conclusion of the fastener driving cycle, as well as, to account for the rotation of the fastener driver 10 about its center of mass M following the recoil force being applied to the driver 10. In other words, the predetermined distance B is selected such that as the fastener driver 10 rotates due to the recoil force, the tip portion 176 is configured to move laterally relative to the nail head 206 such that the central axis 194 of the tip portion 176 is moved closer toward the fastener axis 202 of the fastener 172 being driven. Accordingly, no portion of the tip portion 176 is configured to contact or otherwise engage the workpiece shortly after the driver blade 26 reaches the BDC position. This may inhibit or prevent damage to the workpiece by the driver blade 26 due to the rotation of the fastener driver 10 by the recoil force.

Furthermore, the predetermined distance B may be based on a size (e.g., length) of the fastener 172. More specifically, the predetermined distance B for fasteners having a longer length (and therefore resulting in a larger recoil force and moment applied to the center of mass M) may be greater than the predetermined distance B for fasteners having a shorter length.

In operation, upon the trigger 70 being pulled to initiate a fastener driving cycle, the motor 50 is activated to rotate the lifter 82 and then the solenoid 114 is energized to pivot the latch 110 from the latched position to the release position, thereby repositioning the latch 110 so that it is no longer engageable with one of the projections 188 (defining the released state of the latch assembly 106). The motor 50 continues to rotate the lifter 82, thereby displacing the driver blade 26 upward past the ready position a slight amount before a lower-most tooth 180 on the driver blade 26 slips off the respective driver pin 98/roller bushing 102 (at the TDC position of the driver blade 26). Thereafter, the piston 22 and the driver blade 26 are thrust downward toward the BDC position by the expanding gas in the storage chamber cylinder 30. As the driver blade 26 is displaced toward the BDC position, the motor 50 remains activated to continue rotation of the lifter 82.

As the driver blade 26 is displaced toward the BDC position, at least a portion of the tip portion 176 of the driver blade 26 contacts the fastener 172 (e.g., nail head 206) within the firing channel 122. After the fastener 172 is driven into the workpiece, the recoil force applied to the fastener driver 10 rotates the fastener driver 10 about the center of mass M as described above, thereby causing the tip portion 176 of the driver blade 26 to laterally shift relative to the nail head 206, and the central axis 194 of the tip portion 176 is moved closer toward the fastener axis 202. For a short duration of time after the fastener 172 is driven into the workpiece and while the driver blade 26 dwells at the BDC position, the tip portion 176 remains in contact with the fastener 172, and no portion of the tip portion 176 extends from or overhangs past the nail head 206 of the fastener 172.

Figure 11:
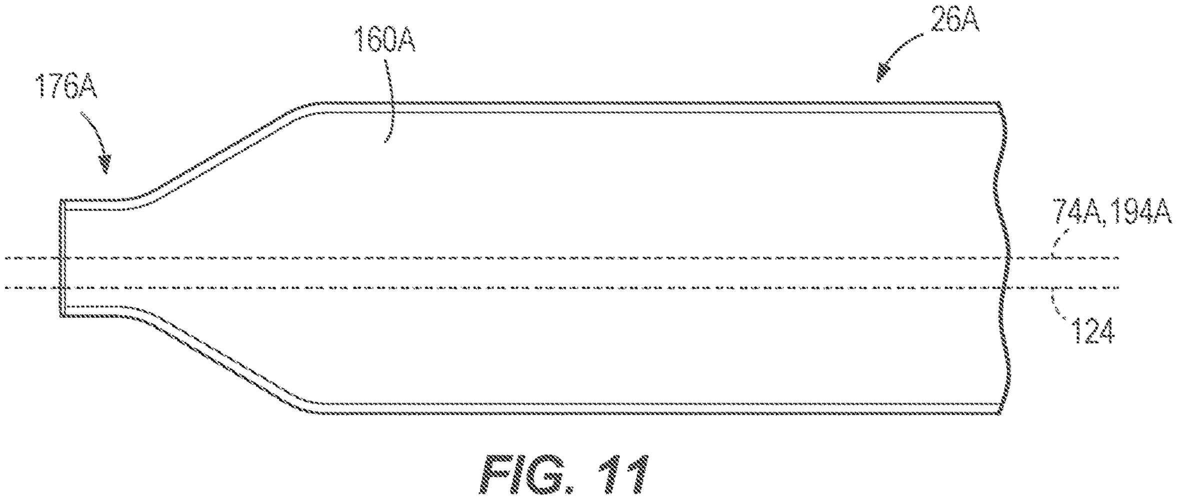
FIG. 11 is an enlarged, front view of an alternative driver blade than the driver blade of FIG. 4.

Shortly after the driver blade 26 reaches the BDC position, a first of the driver pins 98/roller bushing 102 on the lifter 82 engages one of the teeth 180 on the driver blade 26 and continued rotation of the lifter 82 raises the driver blade 26 and the piston 22 toward the ready position. Shortly thereafter and prior to the lifter 82 making one complete rotation, the solenoid 114 is de-energized, permitting the latch 110 to re-engage the driver blade 26 and ratchet around the projections 188 as upward displacement of the driver blade 26 continues (defining the latched state of the latch assembly 106). Continued rotation of the lifter 82 raises the driver blade 26 to the ready position, and the latch 110 engages one of the projections 188 to maintain the driver blade 26 in the ready position With reference to FIG. 11, in alternative embodiments, the entire driver blade 26A within the firing channel 122 is offset (i.e., spaced from) relative to the firing axis 124 of the firing channel 122 instead of just the tip portion 176. In other words, the driver blade 26A (which is similar to the conventional driver blade 26' of FIG. 6) includes a tip portion 176A that is centered relative to a body portion 160A such that a central axis 194A of the tip portion 176A is coaxial with the longitudinal axis 74A, but the central axis 194A and longitudinal axis 74A are offset relative to the firing axis 124 of the firing channel 122. In this alternative embodiment, the fastener axis 202 of the fastener 172 remains coaxial with the firing axis 124 such that a portion of the tip portion 176 will extend past (e.g., overhang) and not be in contact with the nail head 206 while the fastener 172 is driven into the workpiece and prior to the recoil force applying a moment to the center of mass M, causing the driver 10 to rotate. Similar to the disclosed embodiment above, the central axis 194A and longitudinal axis 74A are offset relative to the center plane C such that the longitudinal axis 74A moves toward the fastener axis 202 by the recoil force causing rotation of the fastener driver 10 about the center of mass M after the driver blade 26A reaches the BDC position, thereby inhibiting or preventing any portion of the tip portion 176A to contact or otherwise engage the workpiece when the driver blade 26A reaches the BDC position.

In further alternative embodiments, a position of the fastener channel of the magazine 14 may be offset (i.e., laterally spaced) from the longitudinal axis 74/firing axis 124 instead of the driver blade 26 including the offset tip portion 176 or the entire driver blade 26A being offset. In other words, the longitudinal axis 74 of the driver blade 26A is aligned with the firing axis 124, but the fastener channel of the magazine 14 is offset such that the fastener 172 being received in the firing channel 122 is already offset relative to the firing axis 124 as the fastener 172 enters the firing channel 122. In this alternative embodiment, a portion of the tip portion 176 will still extend past (e.g., overhang) and not be in contact with the nail head 206 while the fastener 172 is driven into the workpiece and prior to the recoil force applying a moment to the center of mass M, causing the driver 10 to rotate. Similar to the disclosed embodiment above, the fastener channel is offset relative to the center plane C and longitudinal axis 74 such that the longitudinal axis 74 moves toward the fastener axis 202 by the recoil force causing rotation of the fastener driver 10 about the center of mass M after the driver blade 26 reaches the BDC position, thereby inhibiting or preventing any portion of the tip portion 176 to contact or otherwise engage the workpiece when the driver blade 26 reaches the BDC position.

In addition, in this alternative embodiment, a user may be able to adjust the offset (i.e., the predetermined distance B) of the fastener channel relative to the center plane C and longitudinal axis 74 based on a size of the fastener 172. Further, the fastener driver 10 may be configured to detect the size of the fastener 172 and automatically adjust the offset (predetermined distance B) based on the size of the fastener 172.

In further alternative embodiments, both the tip portion 176 of the driver blade 26 and the fastener channel may be slightly offset to account for the rotation of the fastener driver 10 about the center of mass M by the recoil force.

Figure 12:
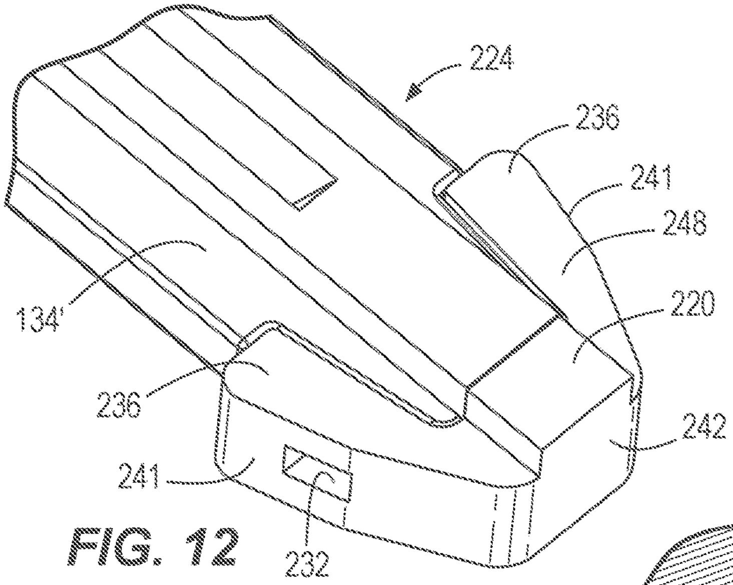
FIG. 12 is a perspective view of an end portion of an alternative workpiece contact element, illustrating an endcap coupled to an end of the workpiece contact element.
Figure 13:
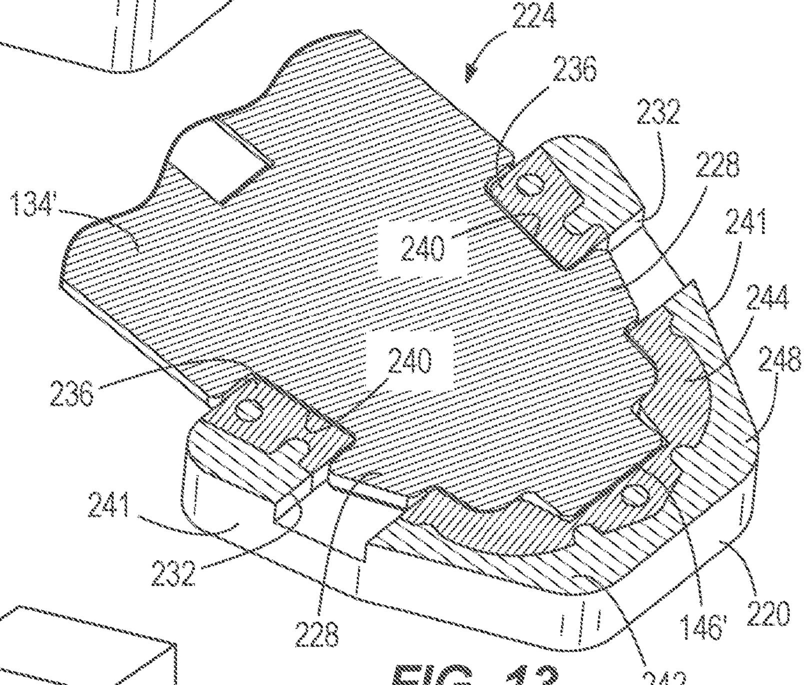
FIG. 13 is a cross-sectional view of the end portion of the workpiece contact element of FIG. 12.
Figure 14:
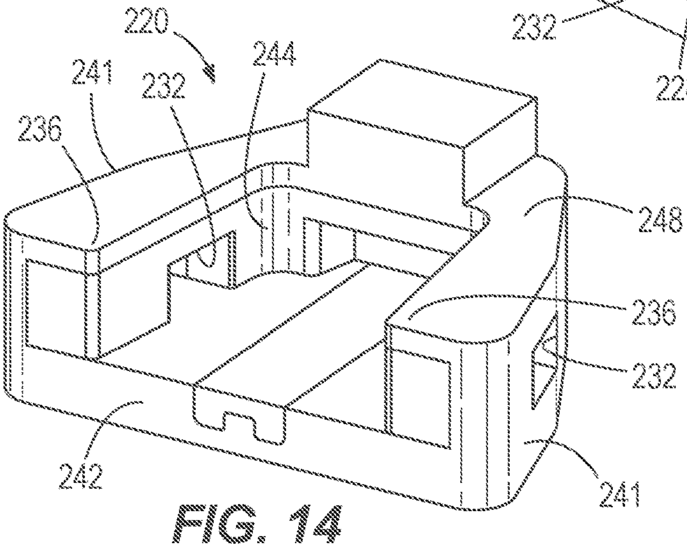
FIG. 14 is a perspective view of the endcap of FIG. 12.

FIGS. 12-14 illustrate another embodiment of a workpiece contact element 134' of the powered fastener driver 10. The workpiece contact element 134' includes a tip or endcap 220 positioned on an end portion 224 of the workpiece contact element 134'. The end portion 224 includes an end 146' (FIG. 13) of the workpiece contact element 134'. The endcap 220 is configured to contact the workpiece when moving the workpiece contact element 134' from the extended position to the retracted position.

The endcap 220 is removably coupled to the end portion 224 of the workpiece contact element 134'. In the illustrated embodiment, as shown in FIG. 13, the end portion 224 of the workpiece contact element 134' includes first and second protrusions 228 extending therefrom. The endcap 220 includes corresponding first and second recesses 232 that receive the respective first and second protrusions 228. Engagement between the protrusions 228 and the recesses 232 secures the endcap 220 to the workpiece contact element 134'. In other embodiments, the workpiece contact element 134' may include the recesses and the endcap 220 may include the protrusions. In further other embodiments, the powered fastener driver 10 may include one or more protrusions 228/recesses 232. For example, as shown in the illustrated embodiment, the workpiece contact element 134' includes third and fourth recesses 240 proximate the first and second protrusions 228, respectively, and the endcap 220 includes corresponding third and fourth protrusions 236 proximate the first and second recesses 232, respectively. The illustrated recesses 232 and the protrusions 236 are formed on lateral sides 241 of the endcap 220.

With particular reference to FIG. 14, the endcap 220 includes a body 242. The body 242 is formed by a core or interior portion 244, and an exterior portion 248 surrounding the interior portion 244. The body 242 is formed from different materials. In the illustrated embodiment, the interior portion 244 of the endcap 220 is formed from a first material and the exterior portion 248 is formed from a second material 248. The first material has a hardness that is different than the second material. The interior portion 244 is in contact with and/or proximate the end portion 224 of the workpiece contact element 134'. Still further, in the illustrated embodiment, the interior portion 244 forms a portion of the first and second recesses 232 and a portion of the third and fourth protrusions 236. The exterior portion 248 of the endcap 220 forms the remaining portion of the body 242 including the remaining portion of the first and second recesses 232 and the remaining portion of the third and fourth protrusions 236.

In the illustrated embodiment, the first material has a hardness that is greater than a hardness of the second material. For example, the first material is hard plastic, and the second material is soft rubber. The first material is selected to prevent or inhibit the endcap 220 from decoupling (e.g., falling off) from the end portion 224 of the workpiece contact element 134' during use and/or transportation of the powered fastener driver 10. The second material is selected to prevent or inhibit damage of the workpiece by the endcap 220 during use of the powered fastener driver 10.

Figure 27:
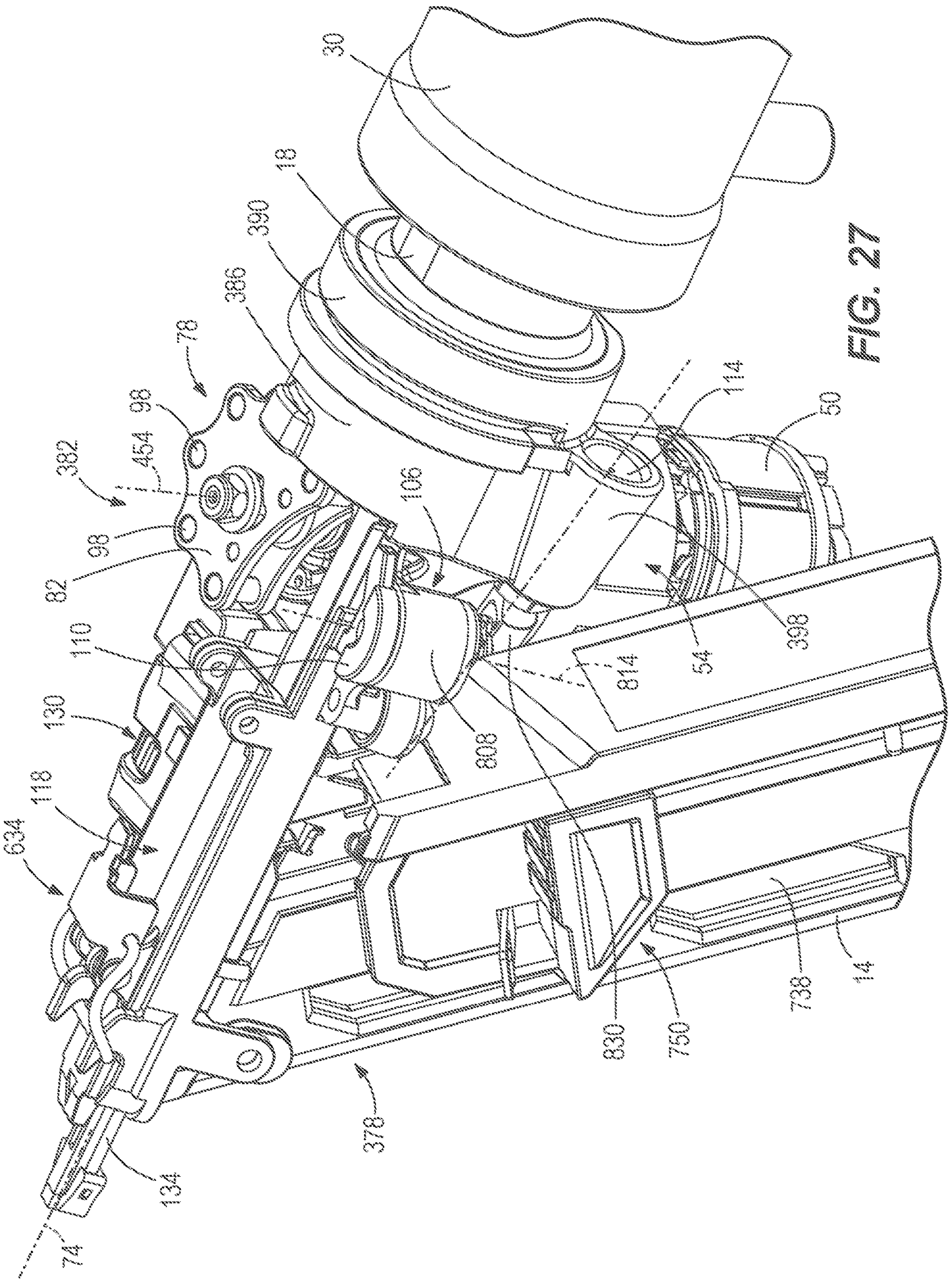
FIG. 27 is a side perspective view of the powered fastener driver of FIG. 15 further including the magazine of FIG. 25 coupled to a portion of the nosepiece, illustrating a latch assembly located on one side of the fastener driver.

With particular reference to FIG. 27, the driver 10 may be generally divided into two sides with respect to the longitudinal axis 74. More specifically, from the frame of reference of FIG. 27, the side of the driver 10 on which the magazine 14 is located and substantially visible to a user is referred to as the 'magazine side 378,' and the opposite side of the driver 10 relative to the longitudinal axis 74 on which the motor 50/lifting assembly 78 is located is referred to as the 'motor side 382.' The location of different features of the driver 10 described herein may be specified as being located on the magazine side 378 or the motor side 382. Further detail regarding the structure and operation of the fastener driver 10 is provided below.

Figure 15:
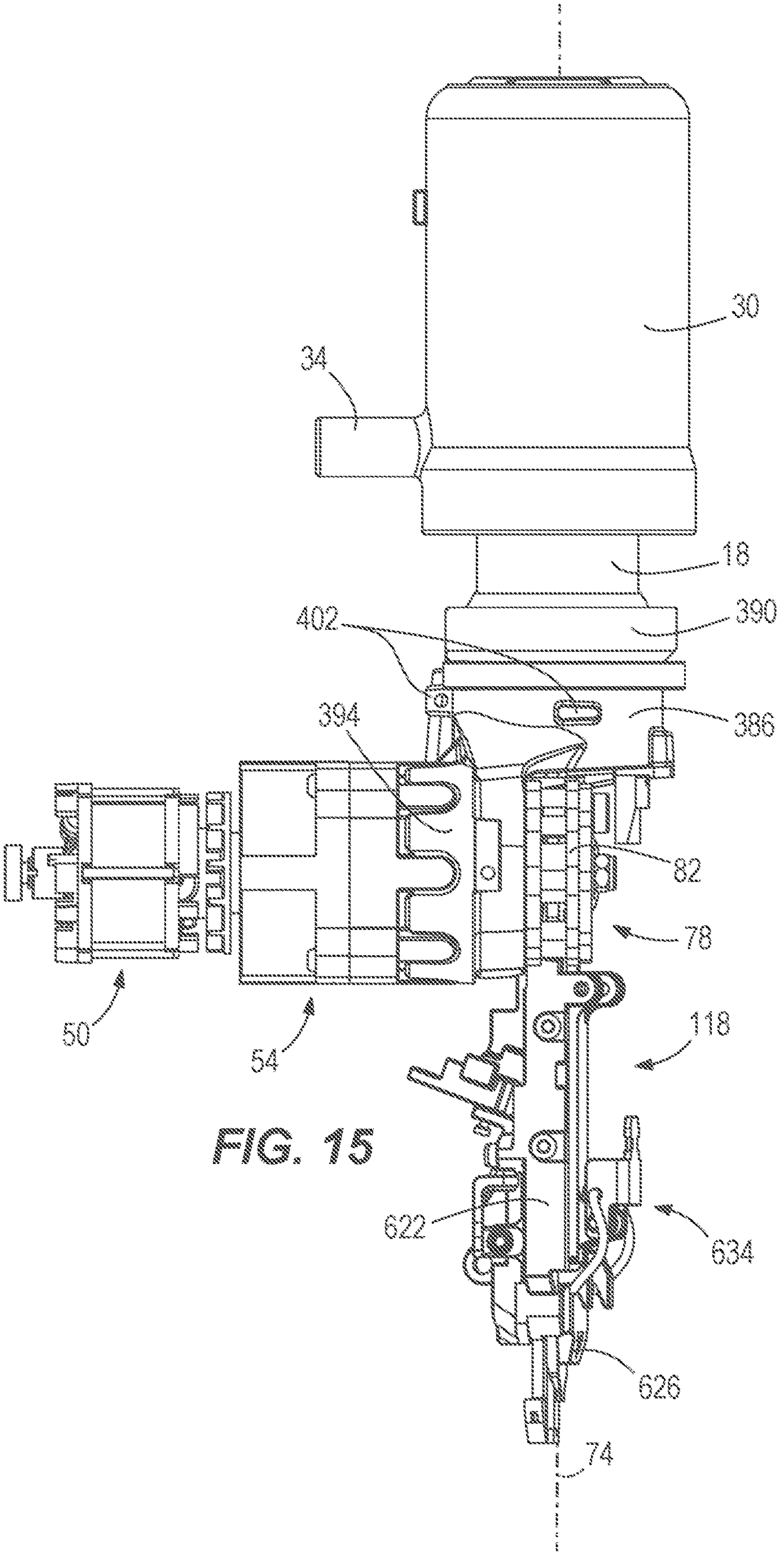
FIG. 15 is a side view of a portion of the powered fastener driver of FIG. 1A illustrating the frame of FIG. 1B coupled between the inner cylinder of FIG. 2 and a nosepiece, and the lifter assembly, the motor, and the transmission of FIG. 1B.
Figure 16:
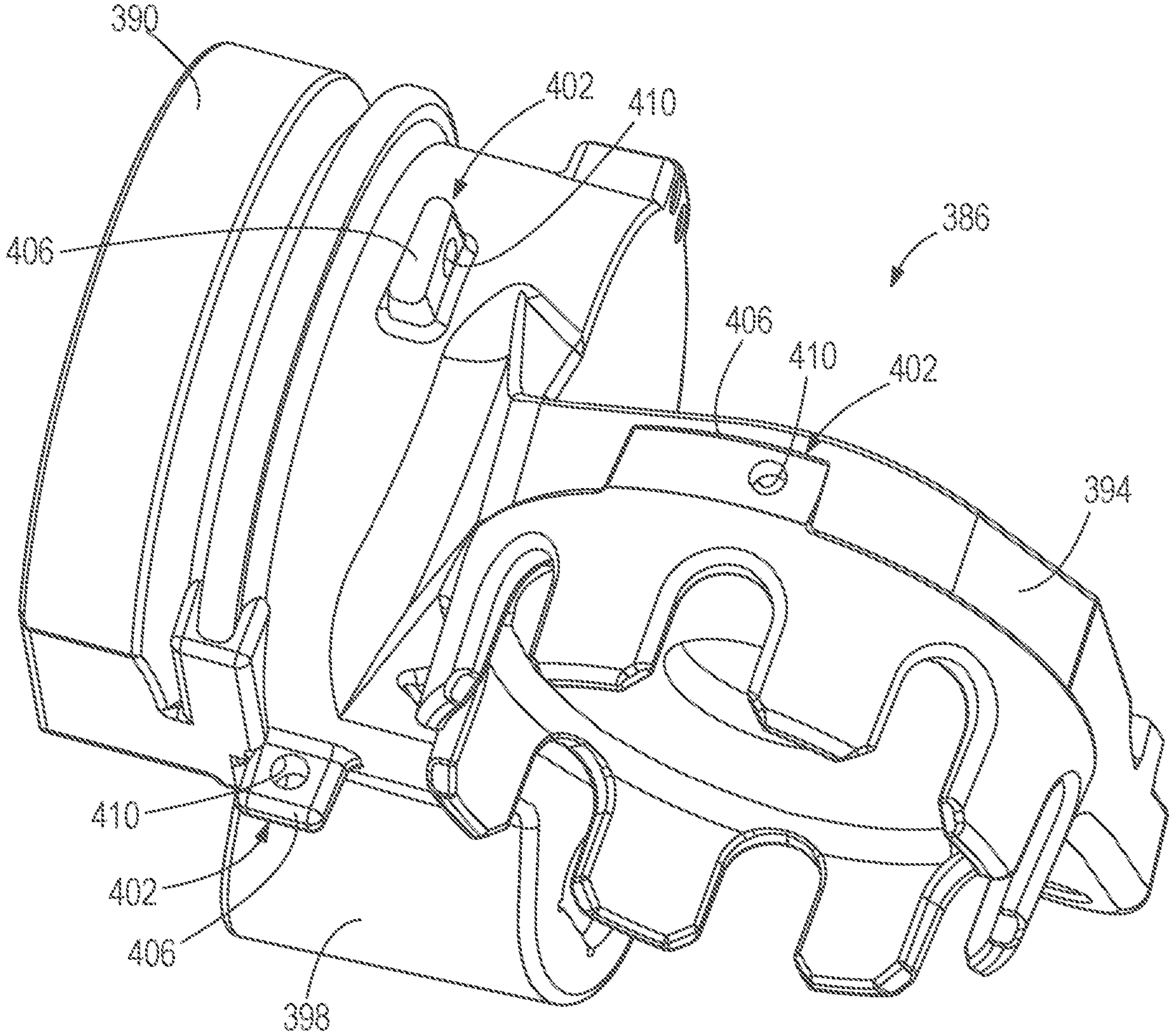
FIG. 16 is a side perspective view of the frame of FIG. 15.
Figure 17:
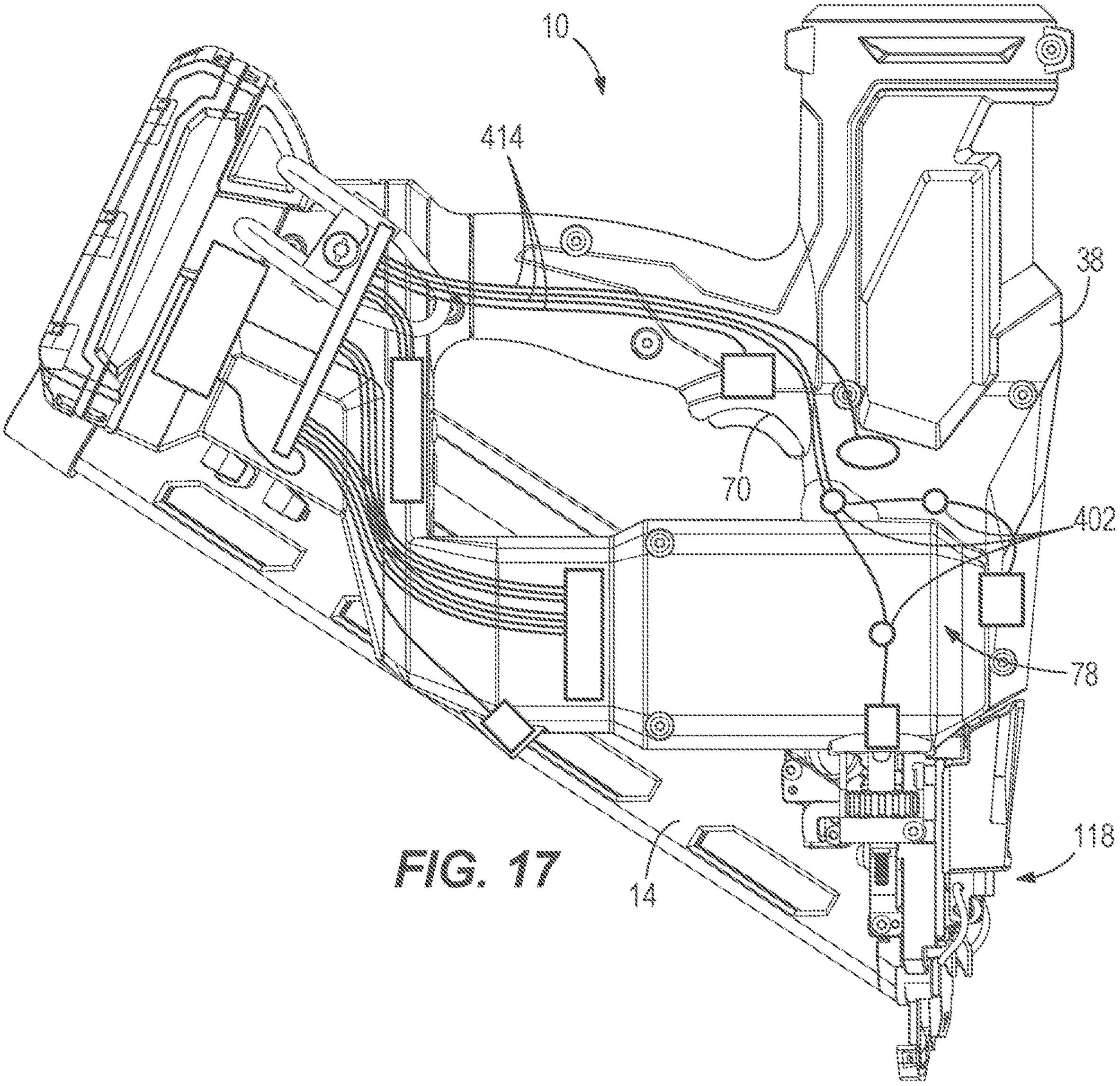
FIG. 17 is another side view of the powered fastener driver of FIG. 1A, schematically illustrating wires extending through a housing of the powered fastener driver of FIG. 1A.

With reference to FIGS. 15-17, the driver 10 further includes a frame 386 positioned within the housing 38. The frame 386 is coupled to one end of the inner cylinder 18. The frame 386 is formed by a plurality of portions 390, 394, 398. The illustrated frame 386 includes a cylinder support portion 390, a lifter housing portion 394, and a solenoid support portion 398 (FIG. 16). When assembled, the lifter housing portion 394 is positioned on the motor side 382 of the driver 10 and the solenoid support portion 398 is positioned on the magazine side 378. The cylinder support portion 390 is coupled to the inner cylinder 18. In the illustrated embodiment, the cylinder support portion 390 is threadably coupled to an outer surface of the inner cylinder 18 (FIG. 2). The lifter housing portion 394 supports the lifting assembly 78.

The solenoid support portion 398 is configured to support the solenoid 114 of the latch assembly 106, as further discussed below.

The frame 386 further includes a plurality of retaining elements 402. Each retaining element 402 includes a projection 406 extending from the frame 386, and a hole 410 extending through the respective projection 406. A fastener (e.g., zip tie; not shown) is configured to extend through the hole 410 to secure at least a portion of wires 414 (shown schematically in FIG. 17) to the respective retaining element 402. In the illustrated embodiment, the frame 386 includes three retaining elements 402. Two of the retaining elements 402 is positioned on the cylinder support portion 390, and the remaining retaining element 402 is positioned on the lifter housing portion 394. In addition, each of the illustrated retaining elements 402 is generally located on the motor side 382 of the driver 10. In other embodiments, the frame 386 may include one or more retaining elements 402 positioned on any portion of the frame 386. The retaining elements 402 are integrally formed with the frame 386. Each retaining element 402 is configured to facilitate retaining of the wires 414 to the frame 386. This may facilitate assembly of the tool 10 while inhibiting pinching of the wires 414 such as when the housing 38 is formed over the frame 386. Furthermore, the retaining elements 402 may inhibit or prevent the wires 414 from getting caught up in the lifting assembly 78 during operation of the tool 10.

Figure 18A:
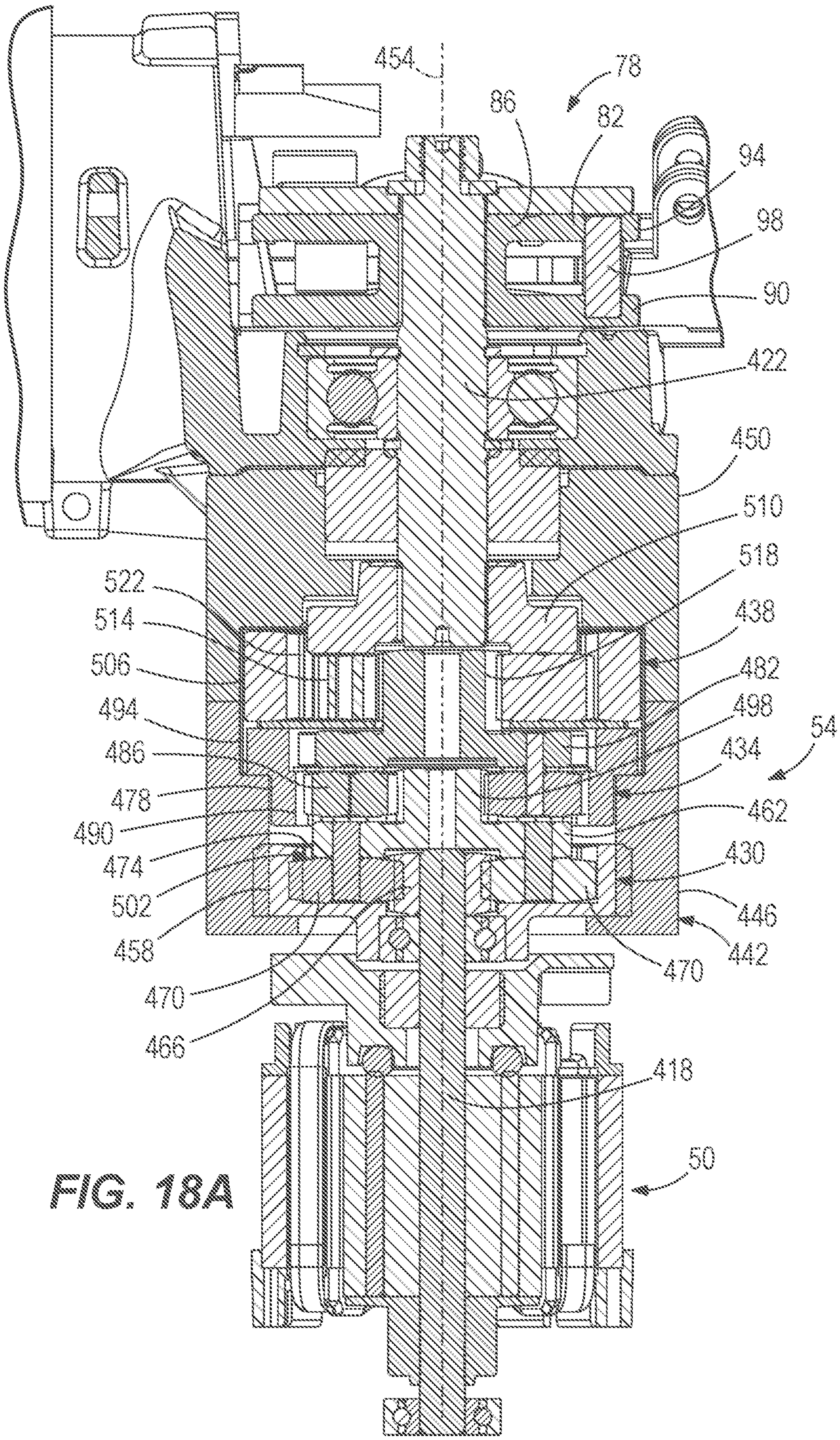
FIG. 18A is a side cross-sectional view of the motor, transmission, and lifter assembly of the powered fastener driver of FIG. 15, illustrating a planetary transmission and a one-way clutch mechanism incorporated with the planetary transmission.
Figure 18B:
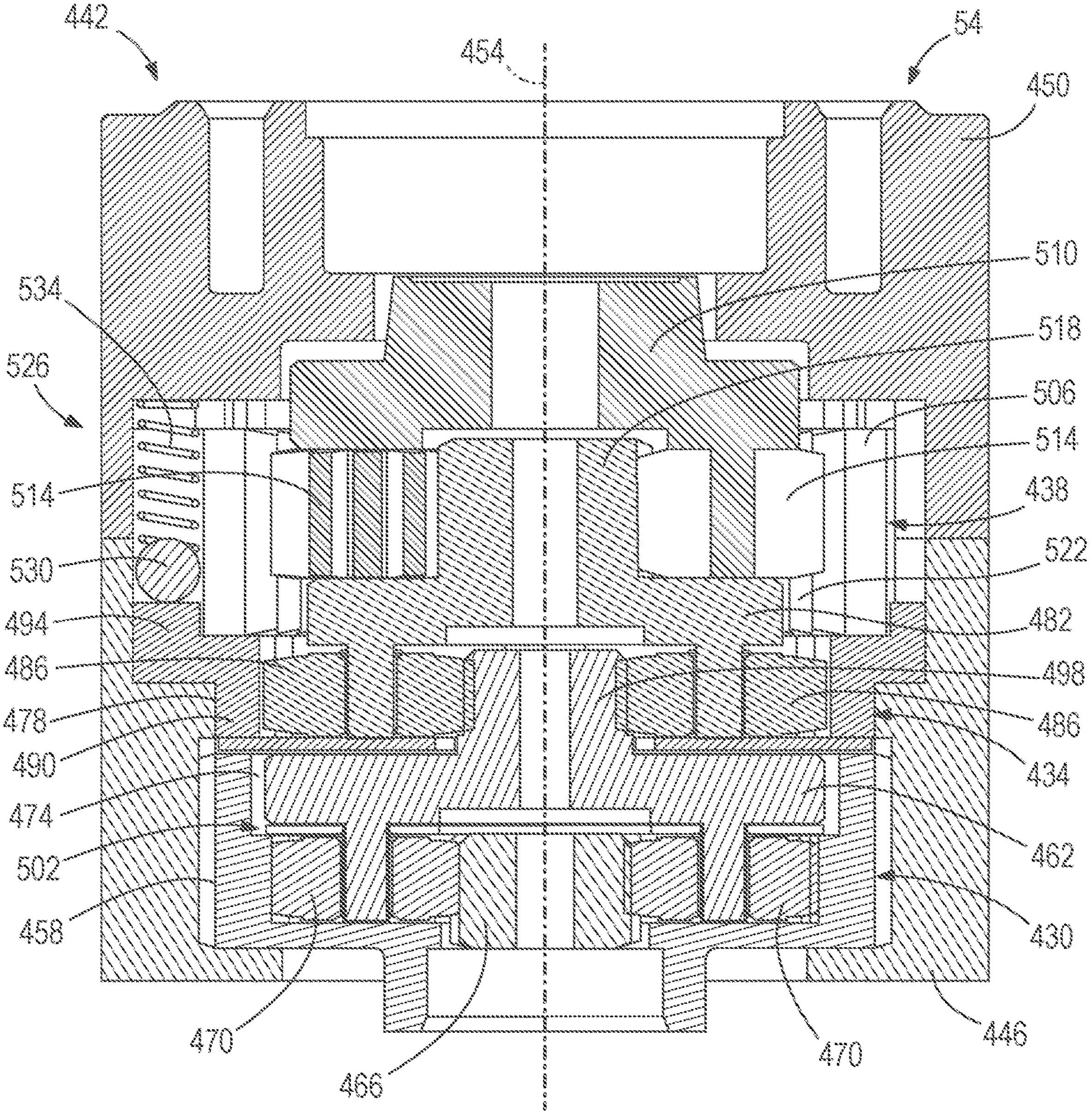
FIG. 18B is an enlarged view of the transmission of FIG. 18A, illustrating a torque-limiting clutch mechanism incorporated with the planetary transmission.

With reference to FIGS. 18A-18B, the transmission 54 includes an input (i.e., a motor output shaft 418) and the output shaft 422 extending to the lifter 82, which is operable to move the driver blade 26 from the driven position to the ready position. In other words, the transmission 54 provides torque to the lifter 82 from the motor 50. The transmission 54 is configured as a planetary transmission having first, second, and third planetary stages 430, 434, 438. In alternative embodiments, the transmission 54 may be a single-stage planetary transmission, or a multi-stage planetary transmission including any number of planetary stages. A transmission housing 442 houses the components of the planetary transmission 54. The illustrated transmission housing 442 includes a first portion 446 and a second portion 450. The transmission 54 further includes a rotational axis 454 extending through the transmission housing 442. The motor output shaft 418 and the output shaft 422 at least partially define the rotational axis 454.

With continued reference to FIGS. 18A-18B, the first planetary stage 430 includes a ring gear 458, a carrier 462, a sun gear 466, and multiple planet gears 470 coupled to the carrier 462 for relative rotation therewith. The sun gear 466 is drivingly coupled to the motor output shaft 418 and is enmeshed with the planet gears 470. The ring gear 458 includes a toothed interior peripheral portion 474. The plurality of planet gears 470 are rotatably supported upon the carrier 462 and are engageable with (i.e., enmeshed with) the toothed interior peripheral portion 474.

The second planetary stage 434 includes a ring gear 478, a carrier 482, and multiple planet gears 486 coupled to the carrier 482 for relative rotation therewith. The ring gear 478 includes a first toothed interior peripheral portion 490, and a second interior peripheral portion 494 adjacent the toothed interior peripheral portion 490. The carrier 462 of the first planetary stage 430 further includes an output pinion 498 that is enmeshed with the planet gears 486 which, in turn, are rotatably supported upon the carrier 482 of the second planetary stage 434 and enmeshed with the toothed interior peripheral portion 490 of the ring gear 478. The ring gear 478 of the second planetary stage 434 may be selectively rotatable relative to the transmission housing 442, as further discussed below.

With continued reference to FIGS. 18A-18B, the driver 10 further includes a one-way clutch mechanism 502 incorporated in the transmission 54. More specifically, the one-way clutch mechanism 502 includes the carrier 462 of the first planetary stage 430, and which is also a component (i.e., output pinion 498) in the second planetary stage 434. The one-way clutch mechanism 502 permits a transfer of torque to the output shaft 422 of the transmission 54 in a single (i.e., first) rotational direction, yet prevents the motor 50 from being driven in a reverse direction in response to an application of torque on the output shaft 422 of the transmission 54 in an opposite, second rotational direction. In the illustrated embodiment, the one-way clutch mechanism 502 is incorporated with the first planetary stage 430 of the transmission 54. In alternative embodiments, the one-way clutch mechanism 502 may be incorporated with the third planetary stage 438, for example.

The third planetary stage 438 includes a ring gear 506, a carrier 510, and multiple planet gears 514 coupled to the carrier 510 for relative rotation therewith. The carrier 482 of the second planetary stage 434 further includes an output pinion 518 that is enmeshed with the planet gears 514 which, in turn, are rotatably supported upon the carrier 510 of the third planetary stage 438 and enmeshed with a toothed interior peripheral portion 522 of the ring gear 506. The ring gear 458 of the first planetary stage 430 and the ring gear 506 of the third planetary stage 438 are fixed relative to the transmission housing 442. The carrier 510 is coupled to the output shaft 422 for relative rotation therewith.

With reference to FIG. 18B, the driver 10 further includes a torque-limiting clutch mechanism 526 incorporated with the transmission 54. More specifically, the torque-limiting clutch mechanism 526 includes the ring gear 478, which is also a component of the second planetary stage 434. The torque-limiting clutch mechanism 526 limits an amount of torque transferred to the transmission output shaft 422 and the lifter 82. In the illustrated embodiment, the torque-limiting clutch mechanism 526 is incorporated with the second planetary stage 434 of the transmission 54, and the one-way and torque-limiting clutch mechanisms 502, 526 are coaxial (i.e., aligned with the rotational axis 454).

With reference to FIG. 18B, the torque-limiting clutch mechanism 526 includes a plurality of detent members 530 (only one of which is shown) movably supported by the ring gear 478 of the second planetary stage 434. The detent members 530 are engageable with respective lugs positioned on an annular front end of the second interior peripheral portion 494 of the ring gear 478 to inhibit rotation of the ring gear 478. The torque-limiting clutch mechanism 526 further includes a plurality of springs 534 for biasing the detent members 530 toward the annular front end of the second interior peripheral portion 494 of the ring gear 478. In the illustrated embodiment, the torque-limiting clutch mechanism 526 includes eight detent members 530 and eight respective springs 534. In other embodiments, the torque-limiting clutch mechanism 526 may include four or more detent members 530 and four or more respective springs 534. In response to a reaction torque applied to the transmission output shaft 422 that is above a predetermined threshold, torque from the motor 50 is diverted from the transmission output shaft 422 to the second planetary stage ring gear 478, causing the ring gear 478 to rotate and the detent members 530 to slide over the lugs.

Figure 19:
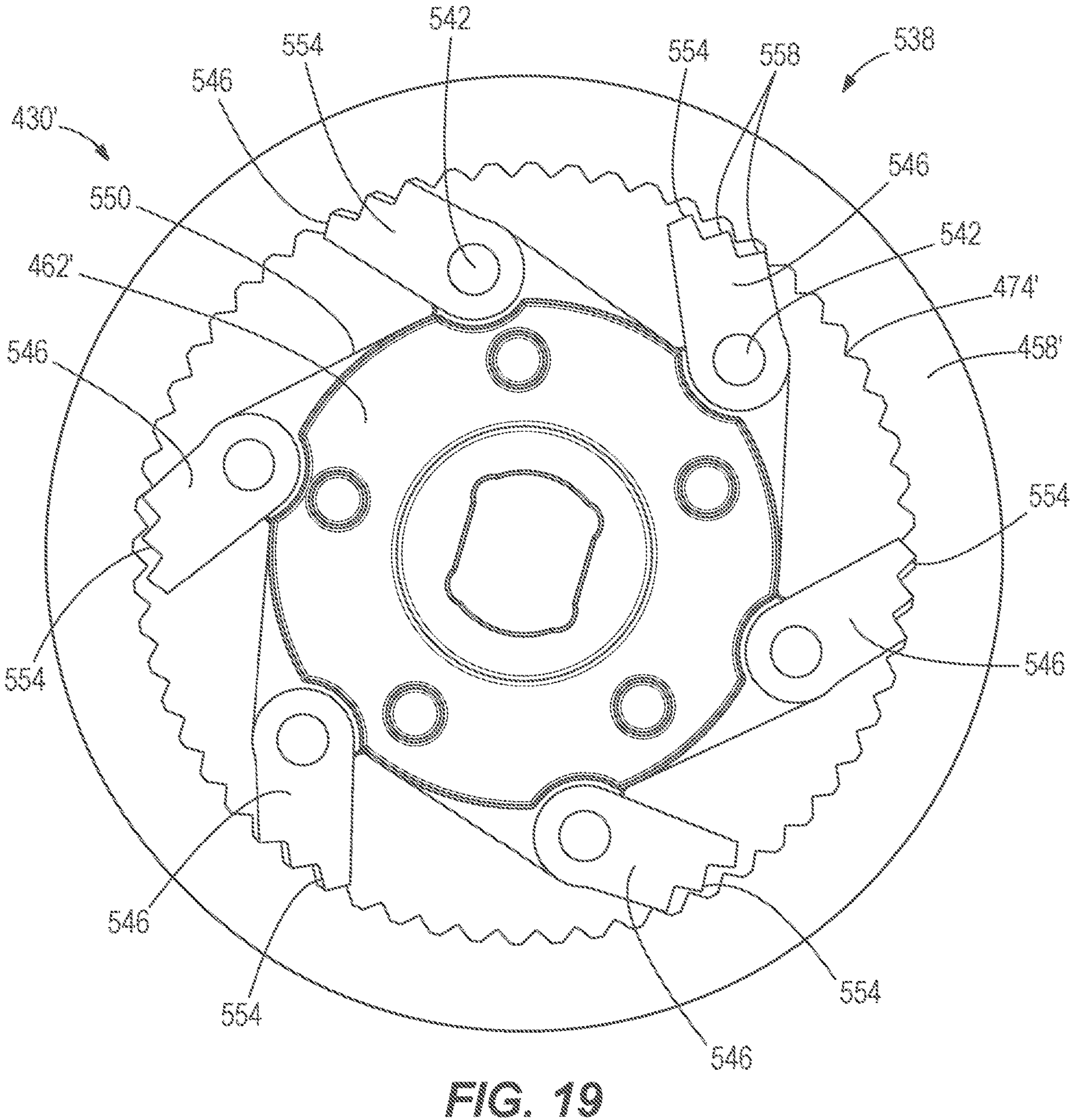
FIG. 19 is a plan view of an alternative one-way clutch mechanism that may be incorporated with the planetary transmission of FIG. 18A.
Figure 20:
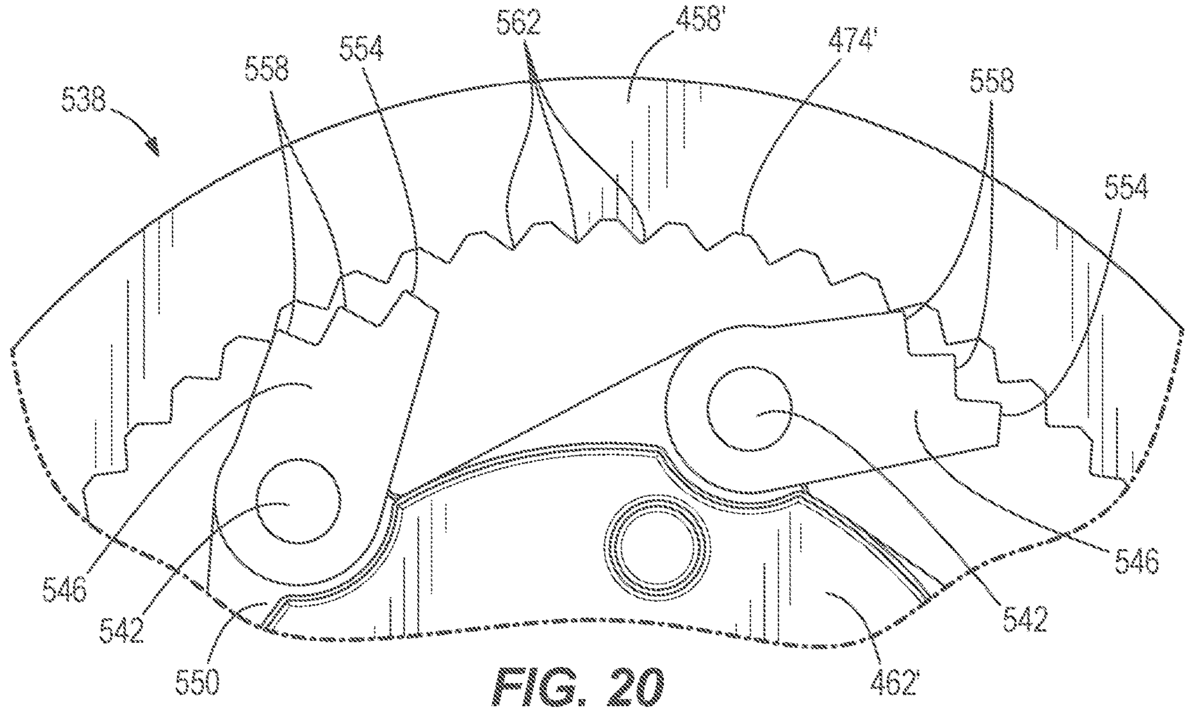
FIG. 20 is an enlarged view of a portion of the one-way clutch mechanism of FIG. 19, illustrating the one-way clutch mechanism.
Figure 21:
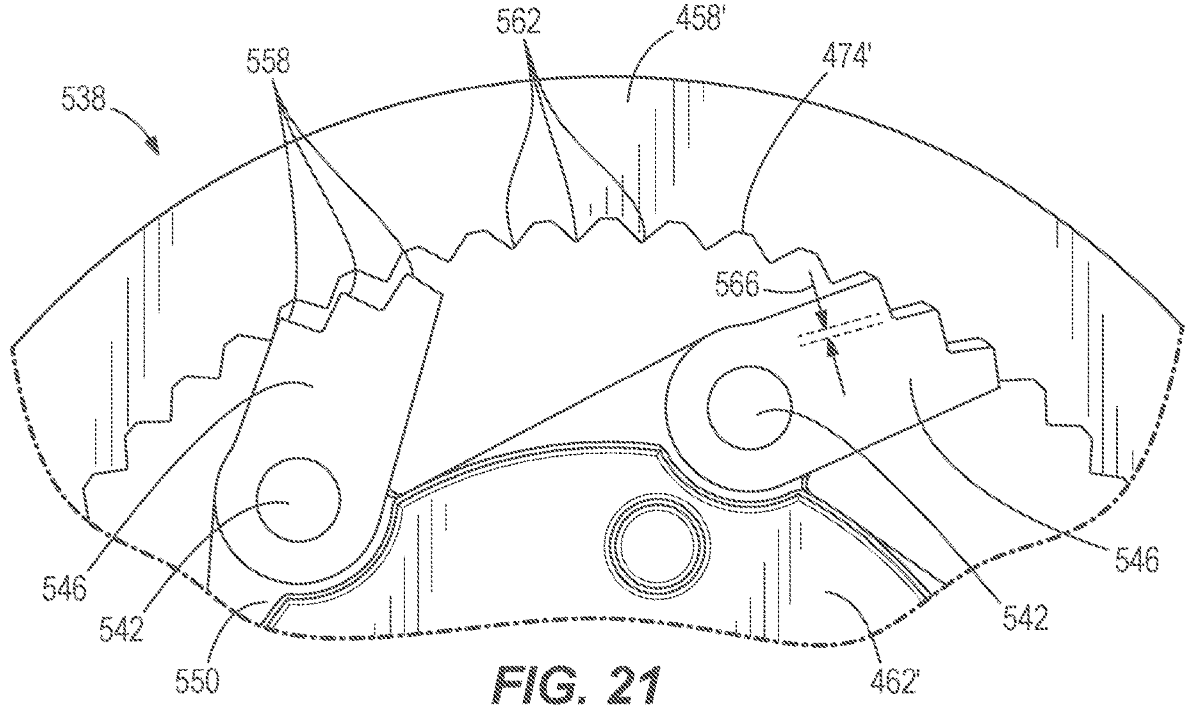
FIG. 21 is another enlarged view of the one-way clutch mechanism of FIG. 20, illustrating the one-way clutch mechanism in a completely engaged state.

FIGS. 19-21 illustrate an alternative one-way clutch mechanism 538 that may be incorporated with the transmission 54 in place of the one-way clutch mechanism 502 and the torque-limiting clutch mechanism 526 described above. The one-way clutch mechanism 538 permits a transfer of torque to the output shaft 422 of the transmission 54 in a single (i.e., first) rotational direction (i.e., clockwise from the frame of reference of FIG. 19), yet prevents the motor 50 from being driven in a reverse direction in response to an application of torque on the output shaft 422 of the transmission 54 in an opposite, second rotational direction (e.g., counter-clockwise from the frame of reference of FIG. 19). In addition, the one-way clutch mechanism 538 allows selective limited rotation of the transmission output shaft 422 to facilitate unjamming of the driver 10. In the illustrated embodiment, the one-way clutch mechanism 538 is incorporated with the first planetary stage 430 of the transmission 54. In alternative embodiments, the one-way clutch mechanism 538 may be incorporated with the second or third planetary stage 434, 438, for example.

The illustrated one-way clutch mechanism 538 includes the carrier 462', which is also a component in the first planetary stage 430'. In addition, the one-way clutch mechanism 538 includes a plurality of ratchet members 546 (FIG. 19) movably coupled to an outer periphery 550 of the carrier 462'. Each ratchet member 546 is pivotably coupled to the carrier 462' by a pin 542. In addition, an end 554 of each ratchet member 546 includes a surface having inclined teeth 558 complimentary of inclined teeth 562 of the toothed interior peripheral portion 474' of the ring gear 458' of the first planetary stage 430'. As such, the end 554 of each ratchet member 546 is configured as a ratcheting surface. Each ratchet member 546 ratchets relative to the toothed interior peripheral portion 474' of the ring gear 458' as the carrier 462' rotates in the first rotational direction (e.g., clockwise from the frame of reference of FIG. 19). Said another way, each ratchet member 546 is slidably engageable with the toothed interior peripheral portion 474' of the ring gear 458' as the carrier 462' rotates in the first rotational direction. In the illustrated embodiment, the one-way clutch mechanism 538 includes six ratchet members 546. In alternative embodiments, the one-way clutch mechanism 538 may include four or more ratchet members 546.

As each end 554 the respective ratchet member 546 engages with the toothed interior peripheral portion 474' of the ring gear 458', a spacing 566 (FIG. 21) is formed between the inclined teeth 558 of the respective ratchet member 546 and the respective teeth 562 of the toothed interior peripheral portion 474'. The spacing 566 is selected such that the carrier 462' is allowed to rotate a limited degree of rotation about the rotational axis 454' in the second, opposite rotational direction (e.g., counter-clockwise from the frame of reference of FIG. 19). In particular, the limited degree of rotation is a small amount (i.e., larger than one degree but less than ten degrees). In the illustrated embodiment, the spacing 566 is selected such that the carrier 462' may rotate in the second rotational direction by up to four degrees relative to the rotational axis 454'. In other embodiments, the carrier 462' may rotate in the second rotational direction by up to six degrees. Still further, in other embodiments, the carrier 462 may rotate in the second rotational direction by up to eight degrees. As such, the spacing 566 may allow selected movement or what may be referred to as 'backlash' of the carrier 462' relative to the ring gear 458'.

In operation of the one-way clutch mechanism 538, the ratchet members 546 ratchet about the toothed interior peripheral portion 474' of the ring gear 458' as the carrier 462' rotates in the first rotational direction (i.e., clockwise from the frame of reference of FIG. 19). However, when the piston 22/driver blade 26 has reached the ready position, or if rotation of the lifter 82 of the lifting assembly 78 has become jammed or otherwise the movement inhibited when the driver blade 26 is being lifted from the BDC position toward the ready position, an application of torque on the transmission output shaft 422 is applied to the carrier 462' in the second rotational direction (i.e., counter-clockwise from the frame of reference of FIG. 19). The spacing 566 between the inclined teeth 558 and the toothed interior peripheral portion 474' of the ring gear 458' allows the carrier 462' to rotate a small amount (e.g., 4 degrees) in the second rotational direction until the spacing 566 is closed and the inclined teeth 558 engage with the toothed interior peripheral portion 474' of the ring gear 458' to thereby prevent further rotation of the carrier 462' (and the transmission output shaft 422) in the second rotational direction. Consequently, the one-way clutch mechanism 538 prevents the transmission 54 from applying torque to the motor 50, which might otherwise back-drive or cause the motor 50 to rotate in a reverse direction, in response to an application of torque on the transmission output shaft 422 in the opposite, second rotational direction (i.e., when the piston 22 and the driver blade 26 has reached the ready position).

In addition, the limited degree of rotation of the carrier 462' in the second rotational direction facilitates re-alignment of the lifter 82 relative to the driver blade 26. Accordingly, the one-way clutch mechanism 538 may be provided with backlash to facilitate unjamming of the lifting assembly 78 and the driver blade 26.

With reference to FIGS. 1B and 25-27, the nosepiece 118 is supported by the frame 386. The nosepiece 228 includes a nosepiece base 622 and a nosepiece cover 626 coupled to the nosepiece base 622. The nosepiece base 622 is coupled to the frame 386. In addition, the nosepiece base 622 is positioned at the front end 630 (FIG. 25) of the magazine 14. The nosepiece cover 626 substantially covers the nosepiece base 622 (FIG. 27). In the illustrated embodiment, the nosepiece cover 626 is pivotally coupled to the nosepiece base 622 by a latch mechanism 634.

Figure 26:
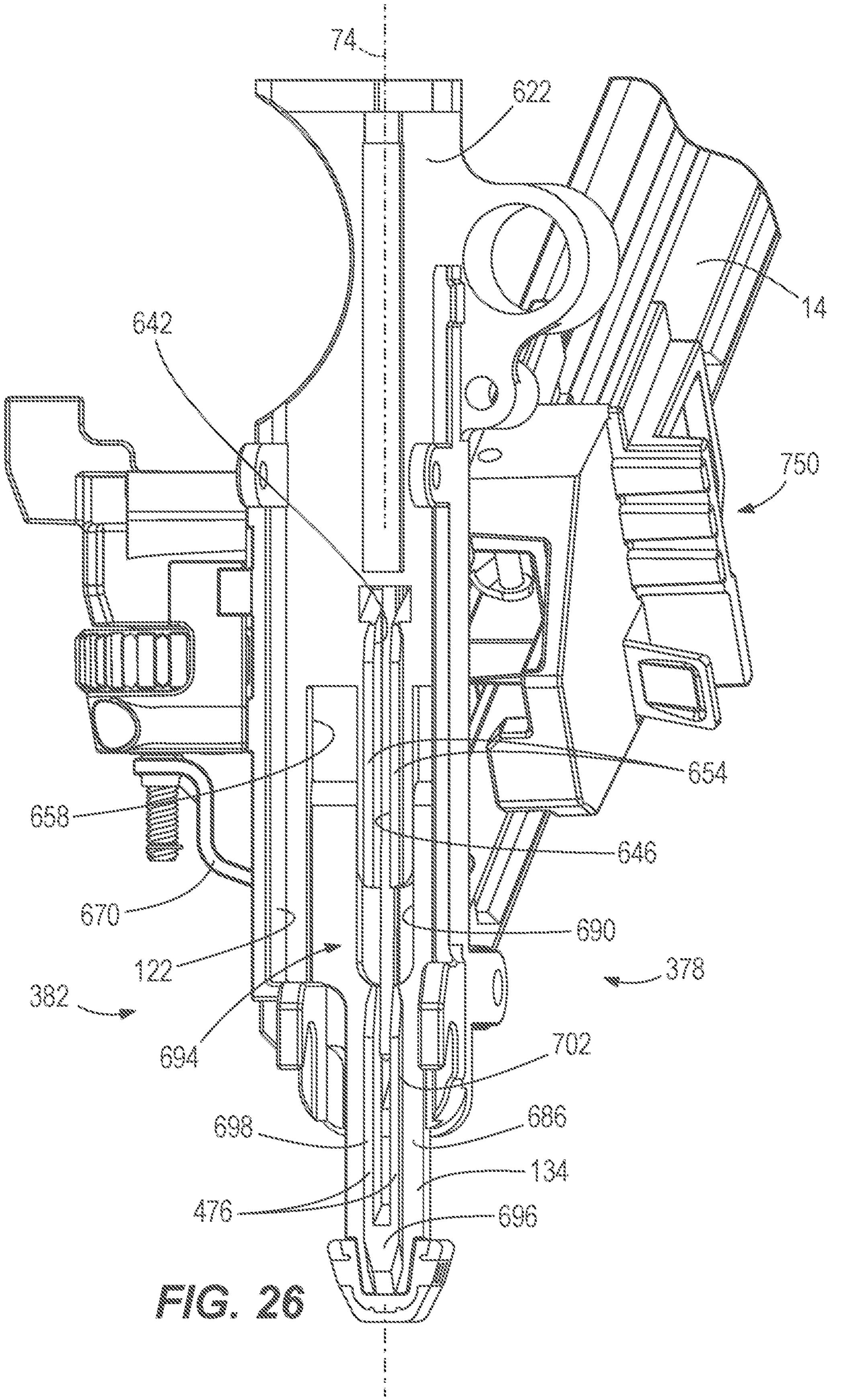
FIG. 26 is a front view of the nosepiece of FIG. 25.
Figure 29A:
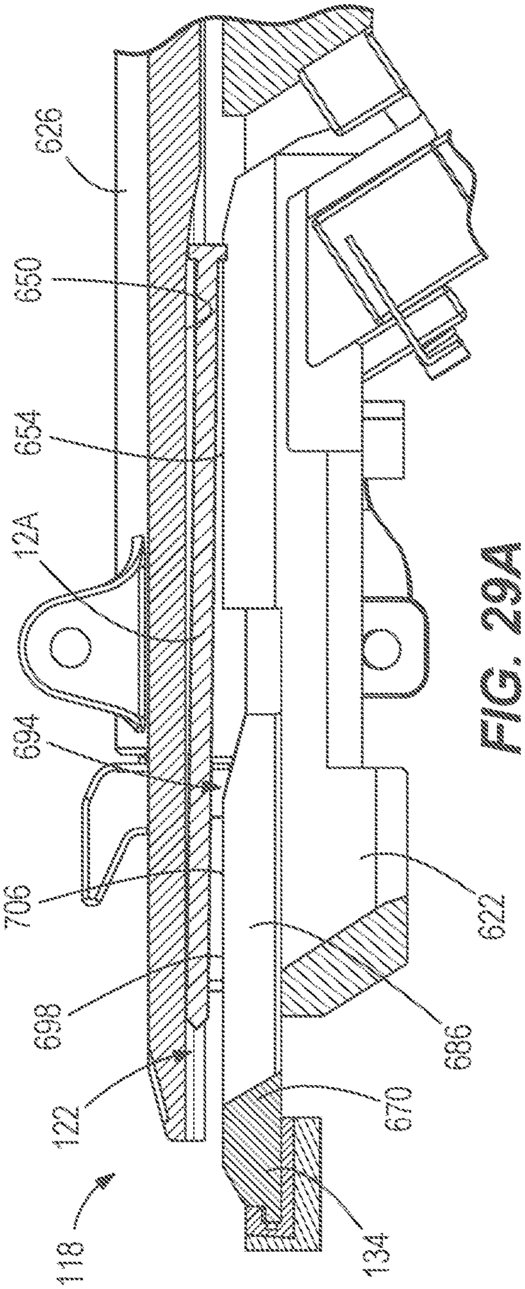
FIG. 29A is a side cross-sectional view of the nosepiece of FIG. 15, illustrating a guide assembly and a fastener at a first location within the nosepiece.
Figure 29B:
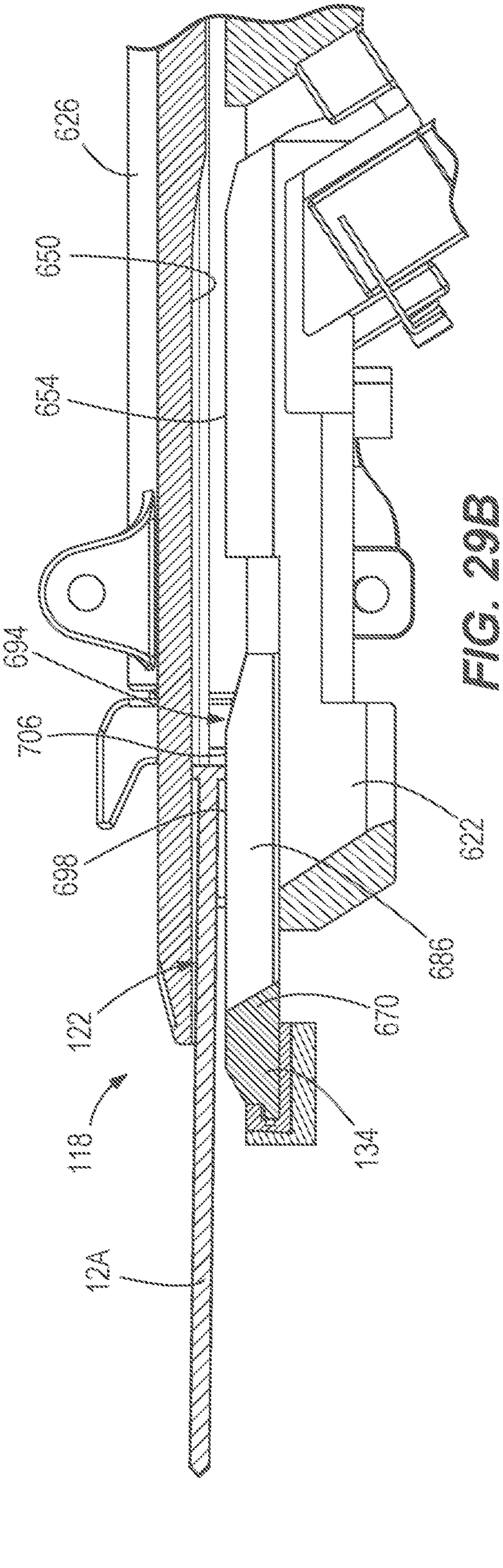
FIG. 29B is another side cross-sectional view of the nosepiece of FIG. 29A, illustrating the fastener at a second location within the nosepiece.

With reference to FIGS. 26 and 29A-29B, the nosepiece base 622 and the nosepiece cover 626 form the firing channel 122 therebetween (only a portion of which is shown in FIG. 26). The magazine 14 includes the fastener channel 642 (FIG. 26) along a length thereof. The firing channel 122 is in communication with the fastener channel 642. The firing channel 122 is configured to consecutively receive fasteners from a collated fastener strip 12 (FIG. 33A) stored in the fastener channel 642 of the magazine 14. The firing channel 122 is aligned with the longitudinal axis 74 of the driver blade 26.

In particular, the nosepiece base 622 includes a nail receiving aperture 646 (FIG. 26), and the nosepiece cover 626 includes an elongated groove 650 (FIG. 29A) in facing relationship with the nail receiving aperture 646. Each of the aperture 646 and the elongated groove 650 extends along the longitudinal axis 74. The nail receiving aperture 646 is partially defined by a guiding surface 654 of the nosepiece base 622. The illustrated guiding surface 654 extends from the nosepiece base 622 toward the nosepiece cover 626 and is divided into two portions. The extended guiding surface 654 is received within the slot 177 (FIG. 24) defined by a rear surface of the driver blade 26. The nosepiece base 622 also includes an elongated slot 658 (FIG. 26) located proximate the nail receiving aperture 646, and extending on either side of the nail receiving aperture 646. The nail receiving aperture 646 connects the fastener channel 642 of the magazine 14 to the firing channel 122 of the nosepiece 118.

Figure 25:
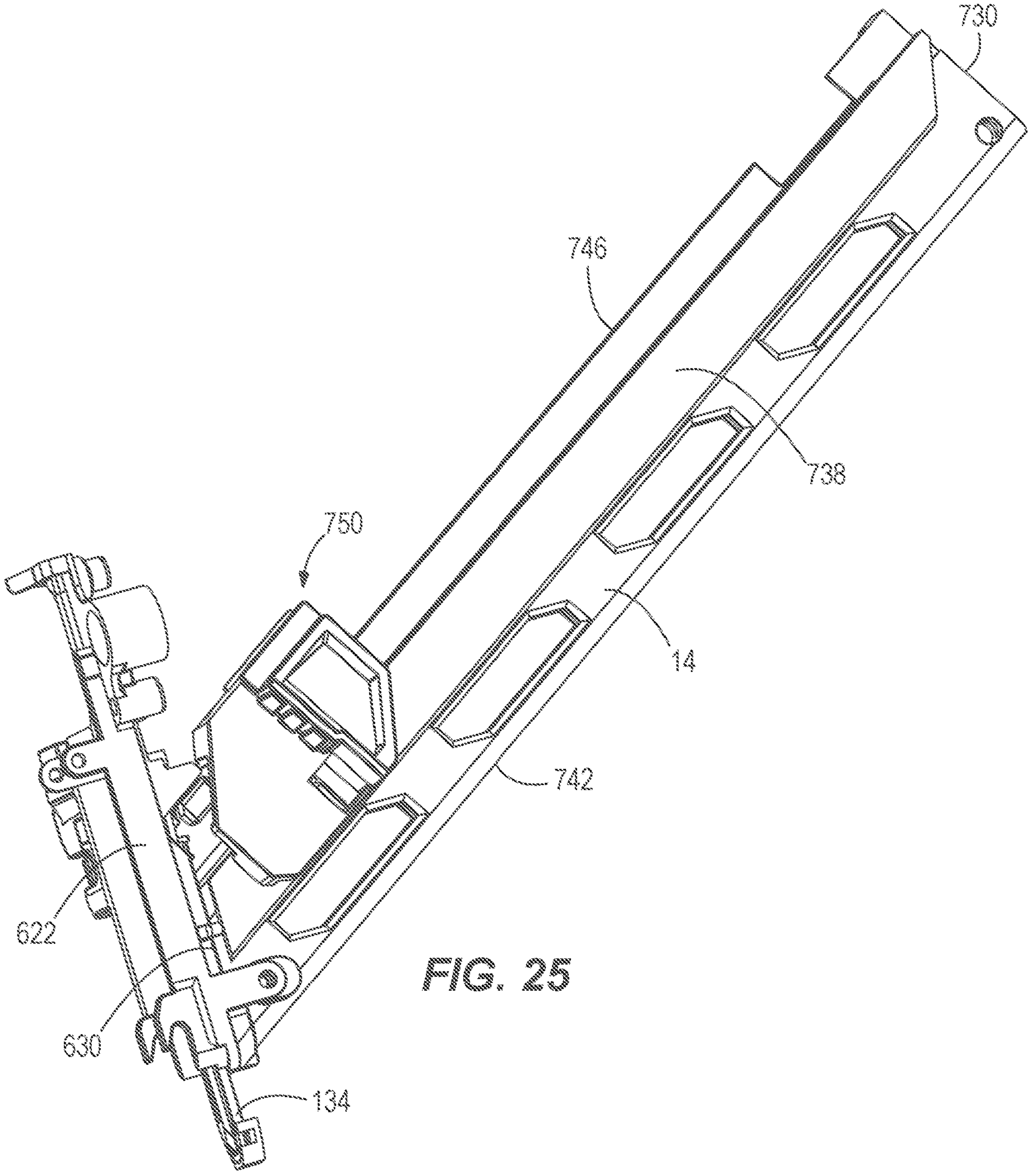
FIG. 25 is a side view of a portion of the nosepiece of FIG. 15 coupled to a front end of a magazine, the magazine including a pusher assembly slidably coupled to the magazine.
Figure 30:
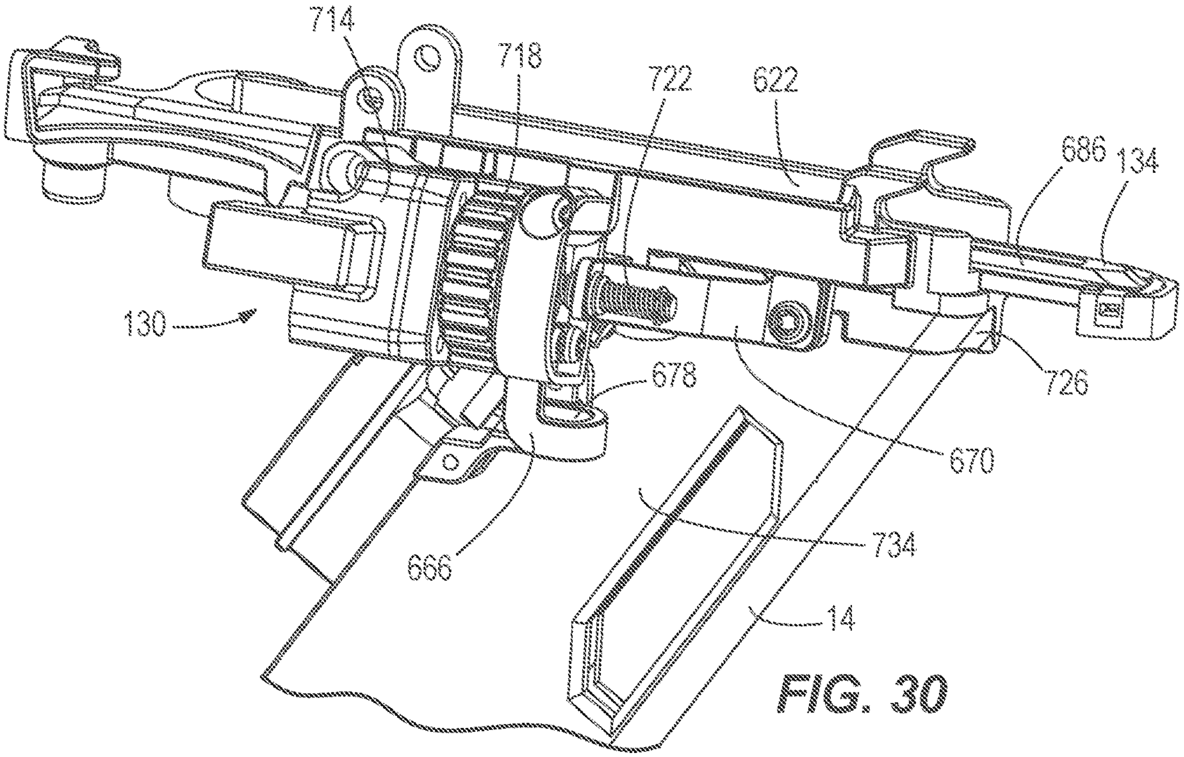
FIG. 30 is a cutaway perspective side view of the nosepiece and the magazine of FIG. 25, illustrating a depth of drive adjustment mechanism of the powered fastener driver of FIG. 1A.
Figure 31:
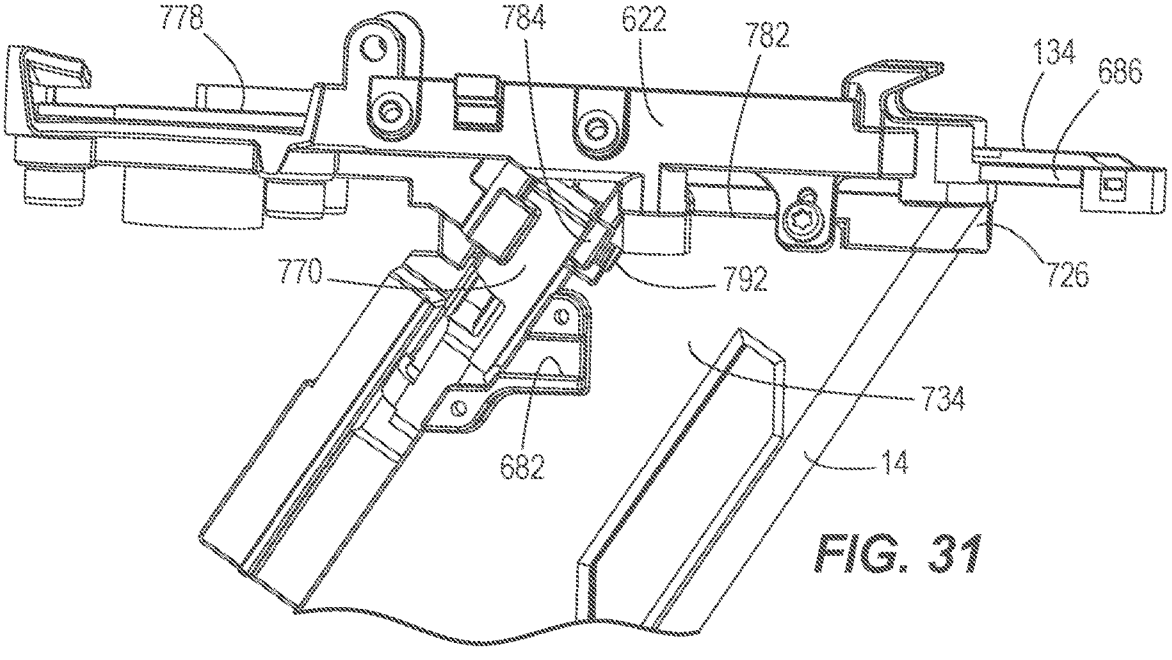
FIG. 31 is another cutaway perspective side view of the nosepiece and the magazine of FIG. 25, with the depth of drive adjustment mechanism of FIG. 30 removed.

With reference to FIGS. 25-26 and 30-31, the driver 10 further includes the workpiece contact element 134 supported by the nosepiece 118 (i.e., the nosepiece base 622; FIG. 25). The illustrated workpiece contact element 134 includes generally two portions 666, 670 (FIG. 30), each portion 666, 670 formed by multiple segments, and in which adjacent segments are coupled by a bend. The first and second portions 666, 670 are coupled together by the depth of drive adjustment mechanism 130, which adjusts the effective length of the workpiece contact element 134. The first portion 666 of the workpiece contact element 134 includes an end section 678 that is slidably received in a groove 682 positioned on the magazine 14 (i.e., on a first side 734; FIGS. 30 and 31). The end section 678 (and the groove 682) is positioned on the motor side 382 of the driver 10, and below the depth of drive adjustment mechanism 130 and the nosepiece 118, from the frame of reference of FIG. 30. In addition, the end section 678 forms one end of the workpiece contact element 134.

Referring back to FIGS. 26 and 29A-29B, the second portion 670 of the workpiece contact element 134 includes an elongated section 686 that is slidably received within the elongated slot 658 (FIG. 26) defined by the nosepiece base 622. As such, a portion of the workpiece contact element 134 (i.e., the elongated section 686) at least partially defines the firing channel 122 of the nosepiece 118.

The workpiece contact element 134 moves from the extended position to the retracted position when the workpiece contact element 134 contacts a workpiece and a force directed toward the workpiece is applied to the fastener driver 10. More specifically, the end section 678 of the first portion 666 of the workpiece contact element 134 slides within the groove 682 defined by the magazine 14 (FIG. 31), and the elongated section 686 of the second portion 670 slides within the slot 658 of the nosepiece base 622 (FIG. 26) when the workpiece contact element 134 moves from the extended position toward the retracted position.

With specific reference to FIG. 26, the workpiece contact element 134 includes an aperture 690 extending through the elongated section 686 of the second portion 670. The aperture 690 is aligned at least partially along its length with the nail receiving aperture 646 of the nosepiece base 622 such that the fastener channel 642 of the magazine 14 is in communication with the firing channel 122 of the nosepiece 118 through the workpiece contact element 134. As such, each fastener passes from the magazine 14 through the nail receiving aperture 646 of the nosepiece base 622 and the aperture 690 of the workpiece contact element 134 into the firing channel 122 of the nosepiece 118. In particular, the entire length of the aperture 690 is aligned with the nail receiving aperture 646 (and the fastener channel 642 of the magazine 14) when the workpiece contact element 134 is in the retracted position.

As shown in FIGS. 26 and 29A-29B, the nosepiece 118 further includes a first fastener guide assembly 694. The first fastener guide assembly 694 is positioned between the nosepiece cover 626 and the nosepiece base 622, and also between the nosepiece cover 626 and the workpiece contact element 134. In the illustrated embodiment, the elongated section 686 of the workpiece contact element 134 includes a protrusion 696 extending therefrom. The protrusion 696 is aligned with the guiding surface 654 along the longitudinal axis 74, and is also received in the slot 177 of the driver blade 26. The illustrated protrusion 696 is divided into a first side portion 698 and a second side portion 702. An end surface 706 of each of the first and second side portions 698, 702 is in facing relationship with the nosepiece cover 626. The first and second side portions 698, 702 also at least partially define the aperture 690. The fastener is configured to contact the end surfaces 706 of the workpiece contact element 134 as the fastener is being fired into the workpiece during a fastener-driving operation. As shown in FIGS. 29A-29B, the fastener 12A to be fired is first guided between the guiding surface 654 of the nosepiece base 622 and the elongated groove 650 of the nosepiece cover 626, and then is subsequently guided between the end surfaces 706 of the protrusion 696 of the workpiece contact element 134 and the elongated groove 650 of the nosepiece cover 626. As such, the illustrated first fastener guide assembly 694 includes the elongated groove 650 of the nosepiece cover 626, the guiding surface 654 of the nosepiece base 622, and the end surfaces 706 of the workpiece contact element 134.

Figure 34:
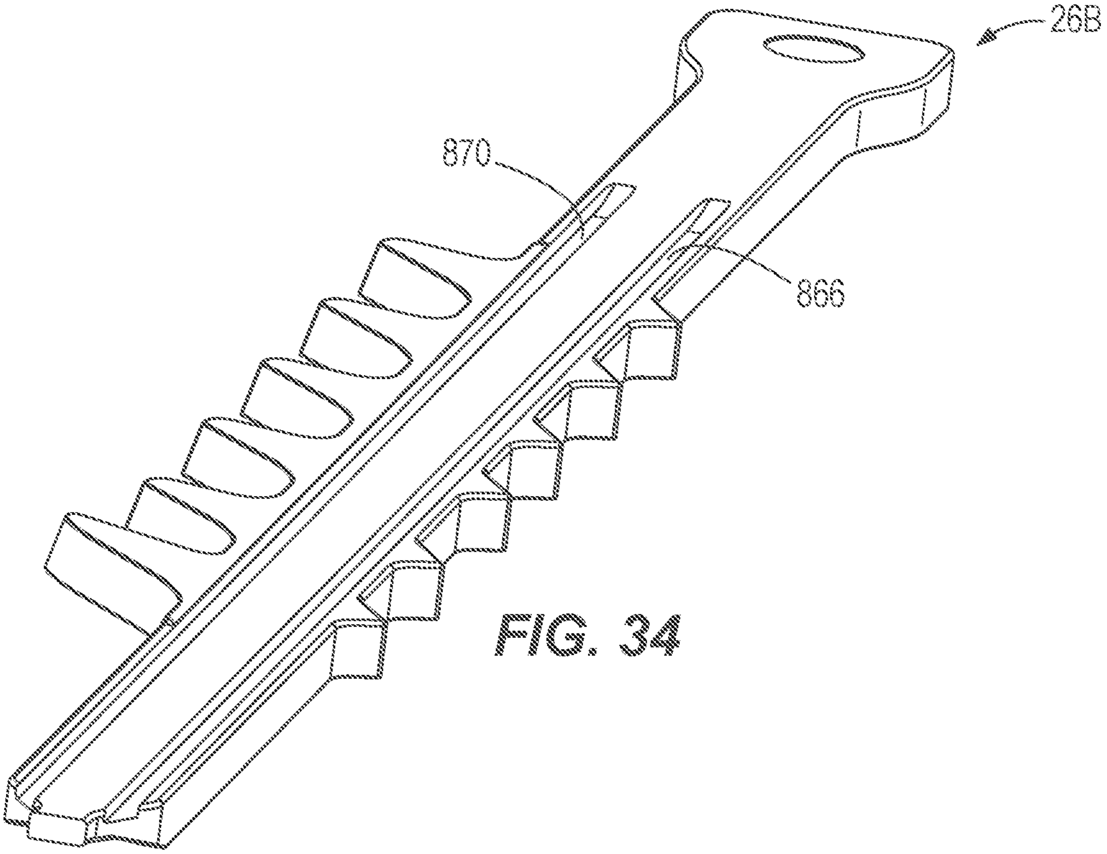
FIG. 34 is a perspective view of another driver blade of the powered fastener driver of FIG. 22 embodying the invention.
Figure 35:
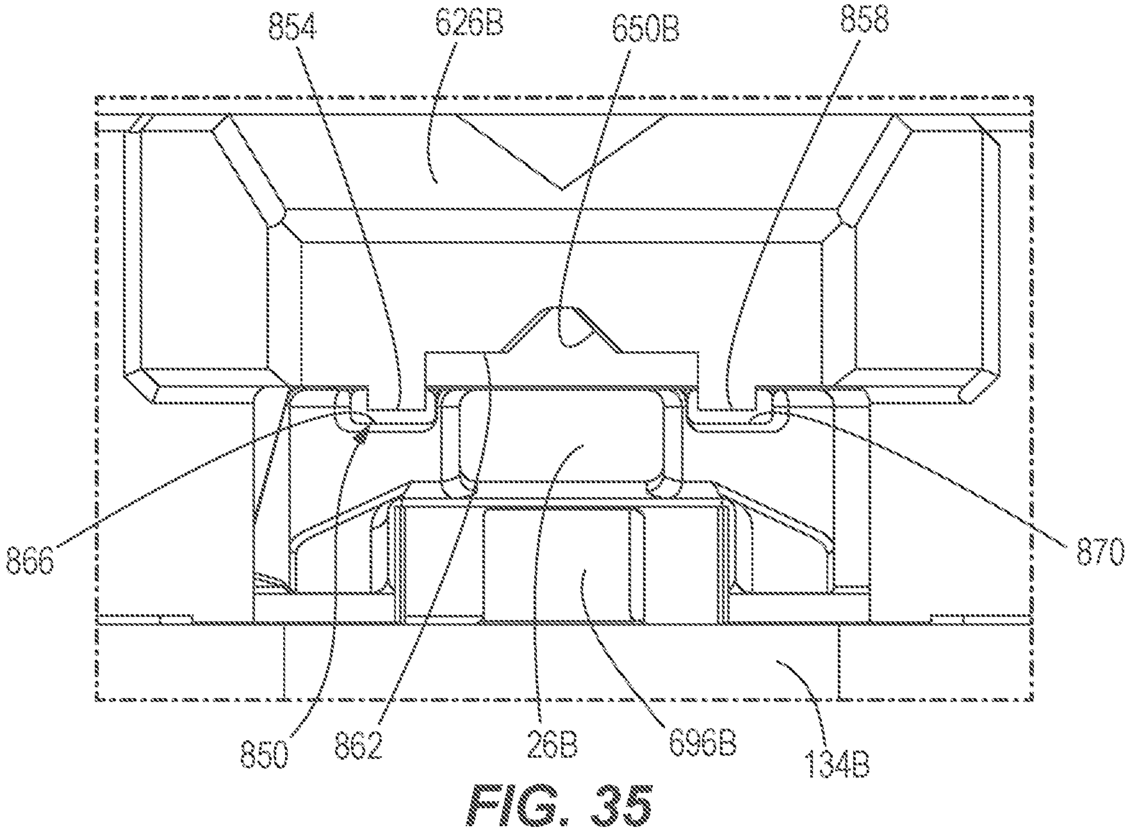
FIG. 35 is a bottom view of another nosepiece embodying the invention, and the driver blade of FIG. 34 slidably received within the nosepiece.
Figure 36:
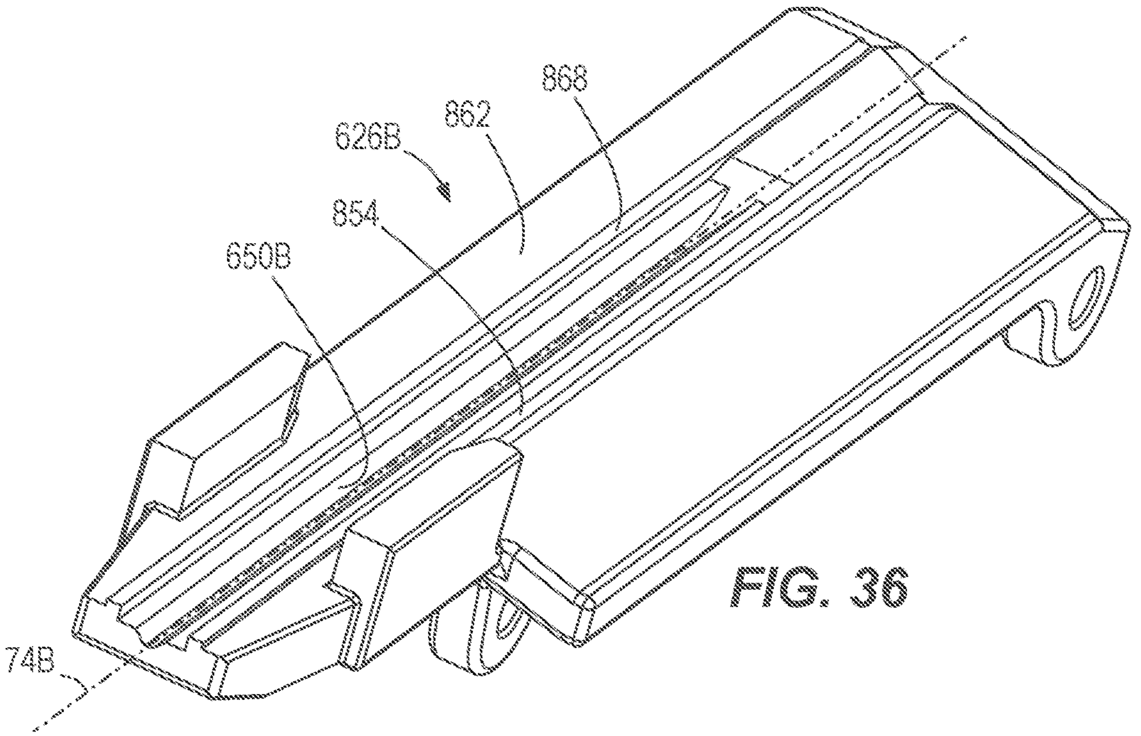
FIG. 36 is a rear perspective view of a cover portion of the nosepiece of FIG. 35.
Figure 37:
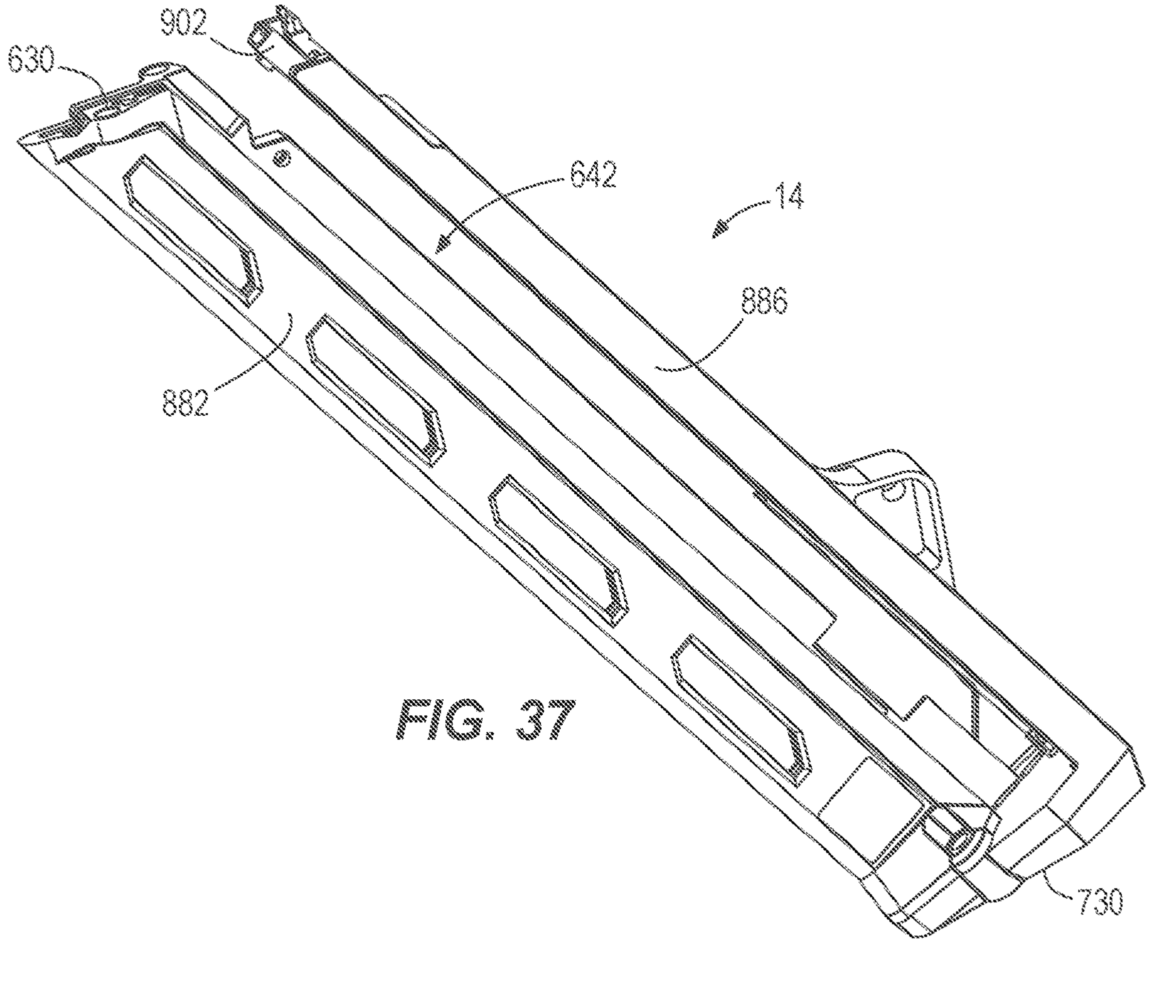
FIG. 37 is a perspective view of the magazine of FIG. 25, illustrating a first body portion coupled to a second body portion.

FIGS. 34-36 illustrate an alternative driver blade 26B and nosepiece 118B. The nosepiece 118B further includes a second fastener guide assembly 850 (FIG. 35). The second fastener guide assembly 850 includes a plurality of guide ribs 854, 858 positioned within the firing channel 122B for guiding movement of the fastener received within the firing channel 122B along the longitudinal axis 74B during a fastener driving operation. In the illustrated embodiment, the nosepiece cover 626B includes a first guide rib 854 and a second guide rib 858. Each rib 854, 858 extends from an inner surface 862 of the nosepiece cover 626B toward the nosepiece base 622B, and extends a length of the nosepiece cover 626B relative to the longitudinal axis 74B (FIG. 36). Also, the first and second guide ribs 854, 858 are spaced laterally apart relative to the longitudinal axis 74B, and the groove 650B of the nosepiece cover 626B is positioned between the first and the second guide ribs 854, 858. As such, the fastener is positioned between the first and second guide ribs 854, 858 when the respective fastener is received within the firing channel 122B. The driver blade 26B includes a first elongated slot 866 (FIG. 34) and a second elongated slot 870 configured to receive the first guide rib 854 and the second guide rib 858, respectively. In other embodiments, the plurality of guide ribs 854, 858 may extend from the nosepiece base 622B within the firing channel 122B, and/or the second fastener guide assembly 850 may include one or more guide ribs/slots. The second fastener guide assembly 850 is configured to inhibit or prevent the fastener from moving laterally relative to the longitudinal axis 74B (i.e., side-to-side) within the firing channel 122B, thereby inhibiting or preventing a jam of the fastener within the nosepiece 118B.

With reference to FIG. 30, the depth of drive adjustment assembly 130 is located on the motor side 382 of the driver 10. The depth of drive adjustment assembly 130 includes a support member 714, an adjustment knob 718, and a screw portion 722. The adjustment knob 718 is rotatably supported upon the support member 714. The screw portion 722 extends between the first portion 666 and the second portion 670 of the workpiece contact element 134. One end of the second portion 670 is threadably coupled to the screw portion 722. Furthermore, the screw portion 722 is coupled for co-rotation with the adjustment knob 718. Accordingly, the screw portion 722 and the knob 718 are rotatably supported by the support member 714. Rotation of the adjustment knob 718 axially threads the second portion 670 along the screw portion 722 for adjusting a protruding length of the workpiece contact element 134 relative to a distal end 726 of the nosepiece 118. More specifically, rotation of the adjustment knob 718 moves the second portion 670 relative to the first portion 670 for adjusting an effective length of the workpiece contact element 134. As such, the adjustment knob 718 may be termed as an actuator.

The depth of drive adjustment assembly 130 adjusts the depth to which a fastener is driven into the workpiece. In particular, the depth of drive adjustment assembly 130 adjusts the length that the workpiece contact element 134 protrudes relative to the distal end 726 of the nosepiece 118, thereby changing the distance between the distal end 726 of the nosepiece 118 and the workpiece contact element 134 in the extended position. In other words, the depth of drive adjustment assembly 130 adjusts how far the workpiece contact element 134 extends past the nosepiece 118 for abutting with a workpiece. The larger the gap between the distal end 726 of the nosepiece 118 and the workpiece, the shallower the depth a fastener will be driven into the workpiece. As such, the position of the workpiece contact element 134 with respect to the nosepiece 118 is adjustable to adjust the depth to which a fastener is driven.

With reference to FIG. 25, the magazine 14 is configured to receive the fasteners to be driven into the workpiece by the powered fastener driver 10. The magazine 14 has the front end 630 and a rear end 730 opposite the front end 630. The magazine 14 further includes the first side 734 and a second side 738 (only one of which is shown in FIG. 25; see FIG. 30) opposite the first side 734, and a bottom side 742 and a top side 746 extending between the first and second sides 734, 738, respectively. In particular, in the illustrated embodiment, the first side 734 is in facing relationship with the motor 50, the transmission 54, and the lifting assembly 78. In addition, the second side 738 is the side of the magazine 14 that is substantially visible to a user.

Figure 33A:
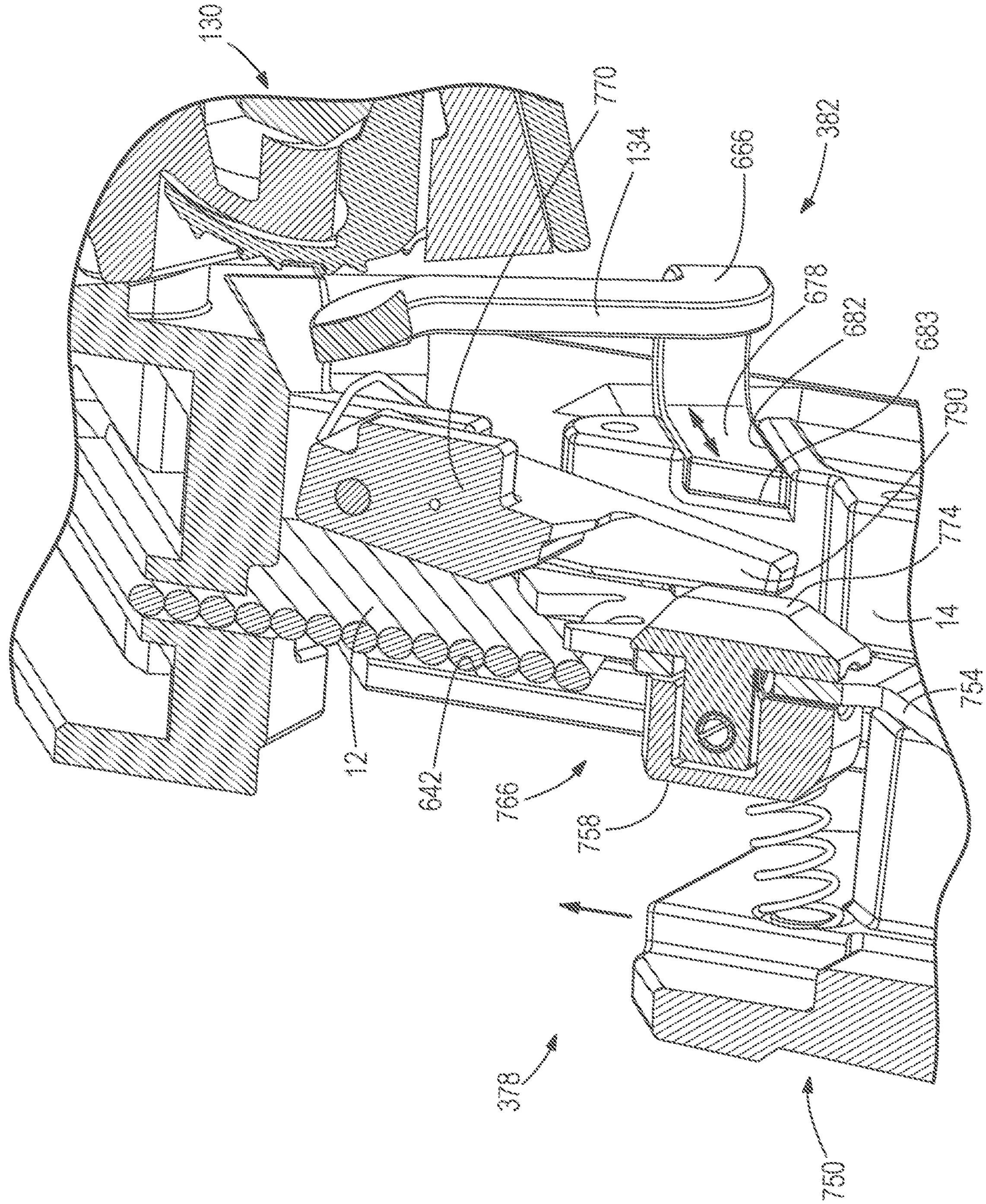
FIG. 33A is a cutaway perspective top view of the nosepiece and the magazine of FIG. 25, illustrating the dry-fire lockout mechanism of FIG. 32 in a first position.
Figure 33B:
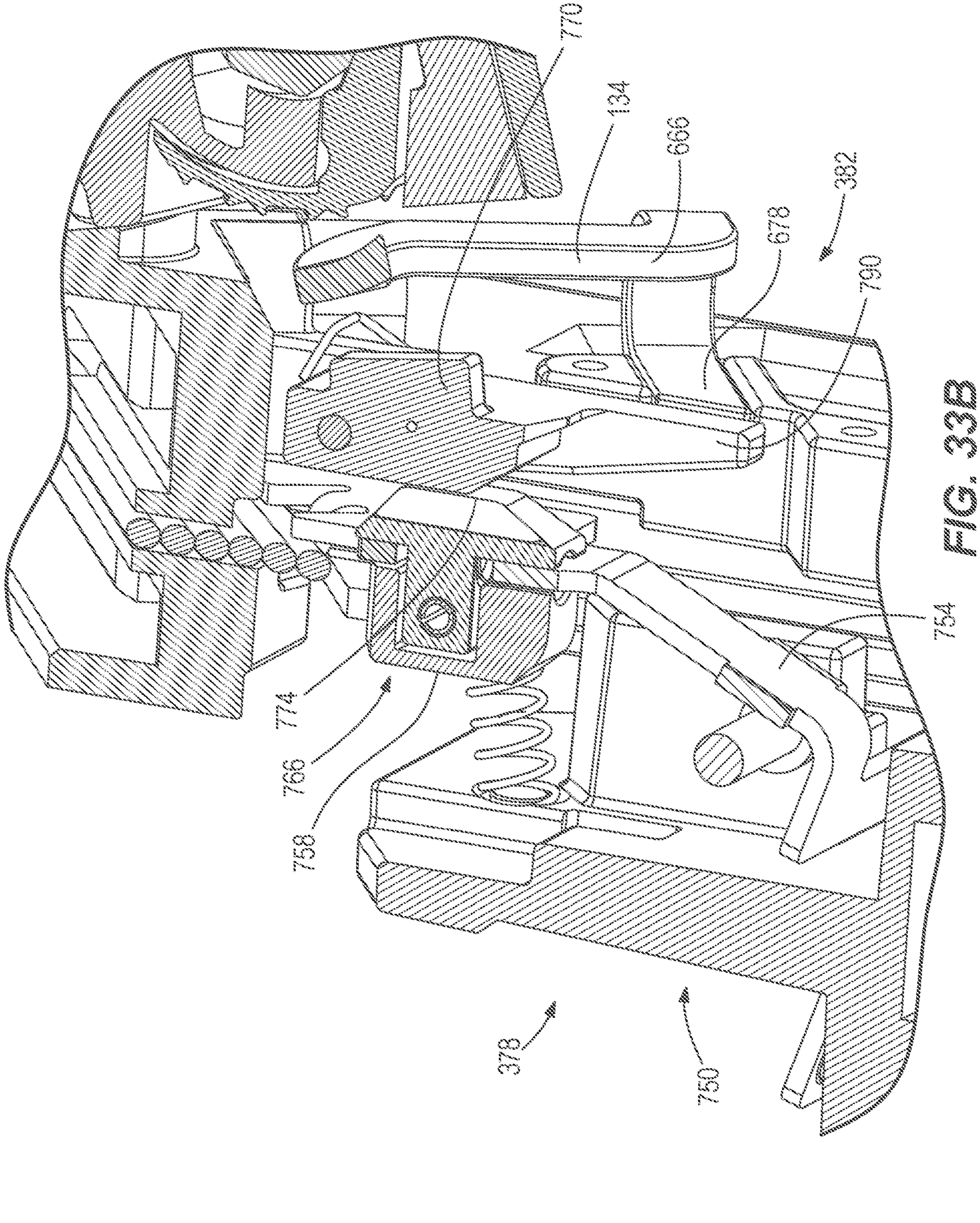
FIG. 33B is another cutaway perspective top view of the nosepiece and the magazine of FIG. 33A, illustrating the dry-fire lockout mechanism in a second position.

With continued reference to FIG. 25, the magazine 14 further includes a pusher assembly 750 at least a portion of which is positioned within the fastener channel 642 of the magazine 14. The pusher assembly 750 is slidably coupled to the magazine 14 and biases the collated fastener strip 12 toward the front end 630 of the magazine 14. In particular, the magazine 14 includes a spring (not shown) configured to bias the pusher assembly 750 toward the front end 630 of the magazine 14. As such, the pusher assembly 750 is configured to apply a constant biasing force on the fastener strip 12 toward the front end 630 of the magazine 14. As shown in FIGS. 33A-33B, the illustrated pusher assembly 750 includes a first portion 754 and a second portion 758 movably coupled to the first portion 754 by a second spring (not shown).

Figure 32:
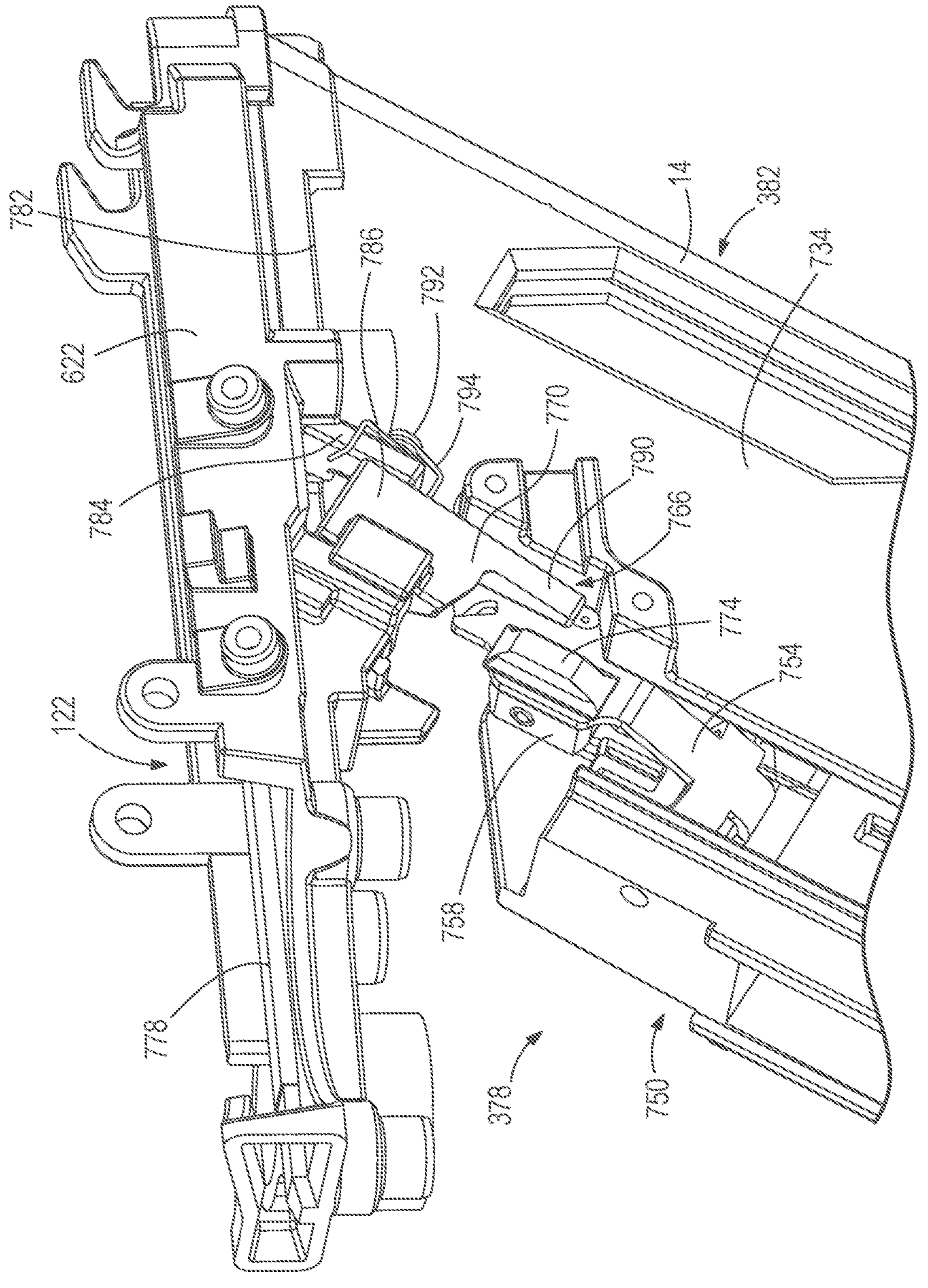
FIG. 32 is yet another cutaway perspective side view of the nosepiece and the magazine of FIG. 25, with the depth of drive adjustment mechanism of FIG. 30 removed, and further illustrating a dry-fire lockout mechanism.

With reference to FIGS. 32-33B, the powered fastener driver 10 further includes a dry-fire lockout assembly 766. The dry-fire lockout assembly 766 includes the end section 678 of the first portion 666 of the workpiece contact element 134, a blocking member 770, and a lockout member 774 engageable with the blocking member 770. The blocking member 770 is pivotably coupled to the nosepiece base 622 of the nosepiece 118 proximate the front end 630 of the magazine 14. More specifically, the nosepiece base 622 includes a first side 778 having the guiding surface 654 and configured to at least partially define the firing channel 122, and a second side 782 opposite the first side 778. The front end 630 of the magazine 14 is secured to the second side 782. The second side 782 further includes a support member 784 extending therefrom (FIG. 32). The illustrated support member 784 is integral with the nosepiece base 622. The support member 784 extends from the second side 782 of the nosepiece base 622 such that it is located proximate the front end 630 of the magazine 14 and on the motor side 382 of the driver 10.

The blocking member 770 includes a first end portion 786 and a second, opposite end portion 790. The first end portion 786 is pivotally coupled to the nosepiece base 622. In particular, the first end portion 786 is pivotally coupled to the support member 784 of the nosepiece base 622 by a pin 792 (FIG. 32). In the illustrated embodiment, the blocking member 770 is coupled to the nosepiece base 622 by a press fit pin connection. As such, the blocking member 770 is directly coupled to the nosepiece 118. The second end portion 790 of the blocking member 770 is positioned proximate an end 683 (FIG. 33A) of the groove 682 in the magazine 14 such that the second end portion 790 may selectively block the end 683 of the groove 682. The illustrated blocking member 770 is configured as a pivotable lever. Accordingly, the blocking member 770 is positioned proximate the front end 630 of the magazine 14, and on the motor side 382 of the driver 10. In addition, the blocking member 770 is located on the first side 734 of the magazine 14.

With continued reference to FIGS. 32-33B the blocking member 770 is movable (e.g., pivotable) between a first, non-blocking or bypass position (FIG. 33A), and a second, blocking position (FIG. 33B). A spring (e.g., torsional spring 794; FIG. 32) is configured to bias the blocking member 770 toward the bypass position. When the blocking member 770 is in the blocking position, the second end portion 770 of the blocking member 750 blocks the end 683 of the groove 682 where it interferes with retraction of the workpiece contact element 134, which is a prerequisite for initiating a fastener firing cycle. More specifically, the second end portion 790 extends into a path of the end section 678 of the workpiece contact element 134 in order to prevent movement of the workpiece contact element 134 out the page from the frame of reference of FIG. 33B. As such, the end section 678 may be referred to as an engagement portion of the workpiece contact element 134.

The lockout member 774 is movable with the second portion 758 of the pusher assembly 750. The illustrated lockout member 774 is a side projection of the second portion 758. The lockout member 774 is selectively engageable with the second end portion 790 of the blocking member 770 for moving the blocking member 770 from the bypass position toward the blocking position against the bias of the spring 794. More specifically, the lockout member 774 is configured to move the blocking member 770 toward the blocking position where the blocking member 770 is configured to block movement of the workpiece contact element 134 when a predetermined number of fasteners (e.g., 0, 1, 2, etc.) remain in the magazine 14. The predetermined number of fasteners remaining may be five or less. For example, in some embodiments, the predetermined number of fasteners may be 1, 2, 3, etc. In other embodiments, the predetermined number of fasteners may be zero. In the illustrated embodiment, the predetermined number of fasteners is five.

Figure 28:
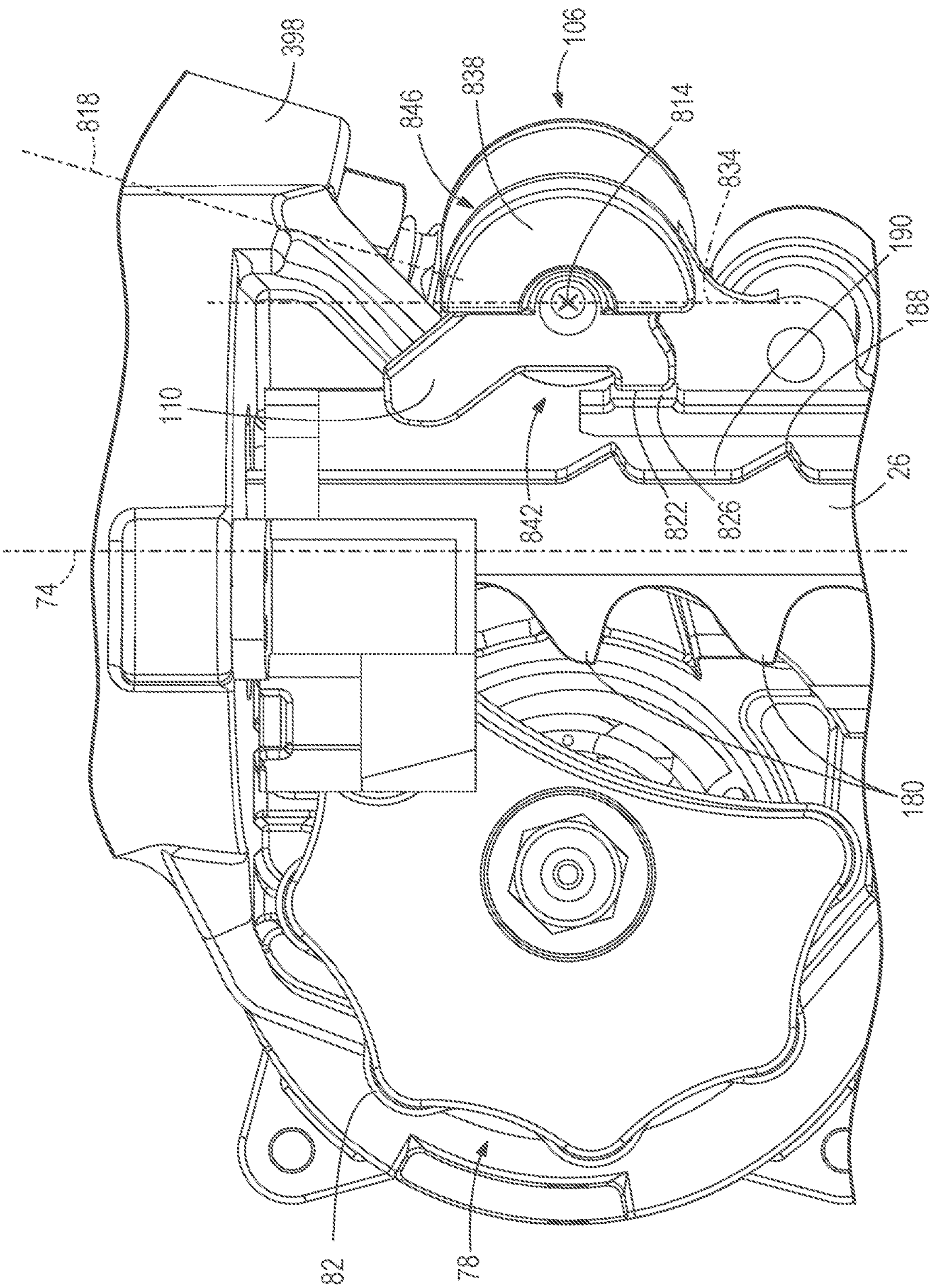
FIG. 28 is a partial front view of a portion of the powered fastener driver of FIG. 27, illustrating the latch assembly in a released position relative to the driver blade.

With reference to FIGS. 27-28, the driver 10 further includes the latch assembly 106 having the latch 110 and the solenoid 114. The latch 110 is movably supported by a support portion 808 of the nosepiece base 622. More specifically, the latch 110 is rotatable about a pivot axis 814 (FIG. 27) defined by a shaft (not shown) of the latch assembly 106. The pivot axis 814 is parallel to the rotational axis 454 of the lifter 82 (FIG. 27).

The latch assembly 106 is positioned proximate the second side 190 of the driver blade 26. The solenoid 114 is supported by the solenoid support portion 398 of the frame 386. The solenoid 114 defines a solenoid axis 818 that extends at an acute angle relative to the longitudinal axis 74

(FIG. 28). In particular, the solenoid support portion 398 of the frame 386 is located such that the solenoid 114 is positioned below (from the frame of reference of FIG. 27) at least a portion of the nosepiece 118, on the magazine side 378 of the driver 10. This mounting location of the solenoid 114 may reduce an overall size of the tool 10, thereby decreasing an overall weight of the tool 10. Furthermore, the latch 110 is configured to rotate about the pivot axis 814 such that a tip 822 of the latch 110 is configured to engage a stop surface 826 of the nosepiece 118 (FIG. 28) when the latch 110 is moved toward the driver blade 26.

The solenoid 114 includes a solenoid plunger 830 (FIG. 27) for moving the latch 110 out of engagement with the driver blade 26 when transitioning from the latched state to the released state. The plunger 830 includes a first end positioned within the solenoid 810 and a second end indirectly coupled to the latch 110 (i.e., via the shaft). Displacement of the plunger 830 pivots the latch 110 about the pivot axis 814 between the latched state and the released state. Energizing of the solenoid 114 displaces the plunger 830 in one direction along the solenoid axis 818, thereby pivoting the latch 110 in a first direction (e.g., counter-clockwise). When the solenoid 114 is de-energized, an internal spring bias within the solenoid 114 causes the plunger 830 to displace in the opposite direction along the solenoid axis 818, thereby pivoting the latch 110 in a second, opposite direction (e.g., clockwise).

The latch 110 is moveable between a latched position (coinciding with the latched state of the latch assembly 106) in which the latch 110 is engaged with one of the projections 188 on the driver blade 26, and a released position (coinciding with the released state of the latch assembly 106) in which the driver blade 26 is permitted to be driven by the biasing force of the compressed gas toward to the driven position. Furthermore, the stop surface 826, against which the latch 110 is engageable when the solenoid 114 is de-energized, limits the extent to which the latch 110 is rotatable in a clockwise direction from the frame of reference of FIG. 28 about the pivot axis 814.

With continued reference to FIGS. 27-28, the latch assembly 106 is weighted such that the latch 110 is biased (i.e., by inertial force) toward the released position. In particular, when the latch assembly 106 is in the released state, the latch 110 is divided by a latch axis 834 (FIG. 28) that extends parallel with the longitudinal axis 74 and perpendicular to the pivot axis 814. The latch axis 834 divides the latch 110 into a first side 842 and a second side 846. The first side 842 is positioned laterally closer to the longitudinal axis 74 than the second side 846 in a radial direction relative to the longitudinal axis 74. A projection 838 of the latch assembly 106 is located on the latch 110, and more specifically on the second side 846 of the latch axis 834 away from the longitudinal axis 74. The projection 838 provides additional mass on the second side 846 of the latch 110 such that a center of mass of the latch 110 is shifted or offset (i.e., to the right from the frame of reference of FIG. 28). This offset weight biases the latch 110 in a clockwise direction toward the released position. In particular, the latch 110 is in the released position when the driver blade 26 is driven from the TDC position to the BDC position along a direction which is coaxial with the longitudinal axis 74. A reaction or recoil force is applied to the fastener driver 10 in an equal and opposite direction as the direction the driver blade 26 is being driven. The bias of the latch 110 toward the released position due to the offset weight facilitates maintaining of the latch 110 away from driver blade 26 when the recoil force is applied to the driver 10. This may inhibit or prevent the latch 110 from rotating toward the latched position, such as by the recoil force, and momentarily engaging with the driver blade 26 when the driver blade 26 is being driven from the TDC position toward the BDC position.

Figure 38:
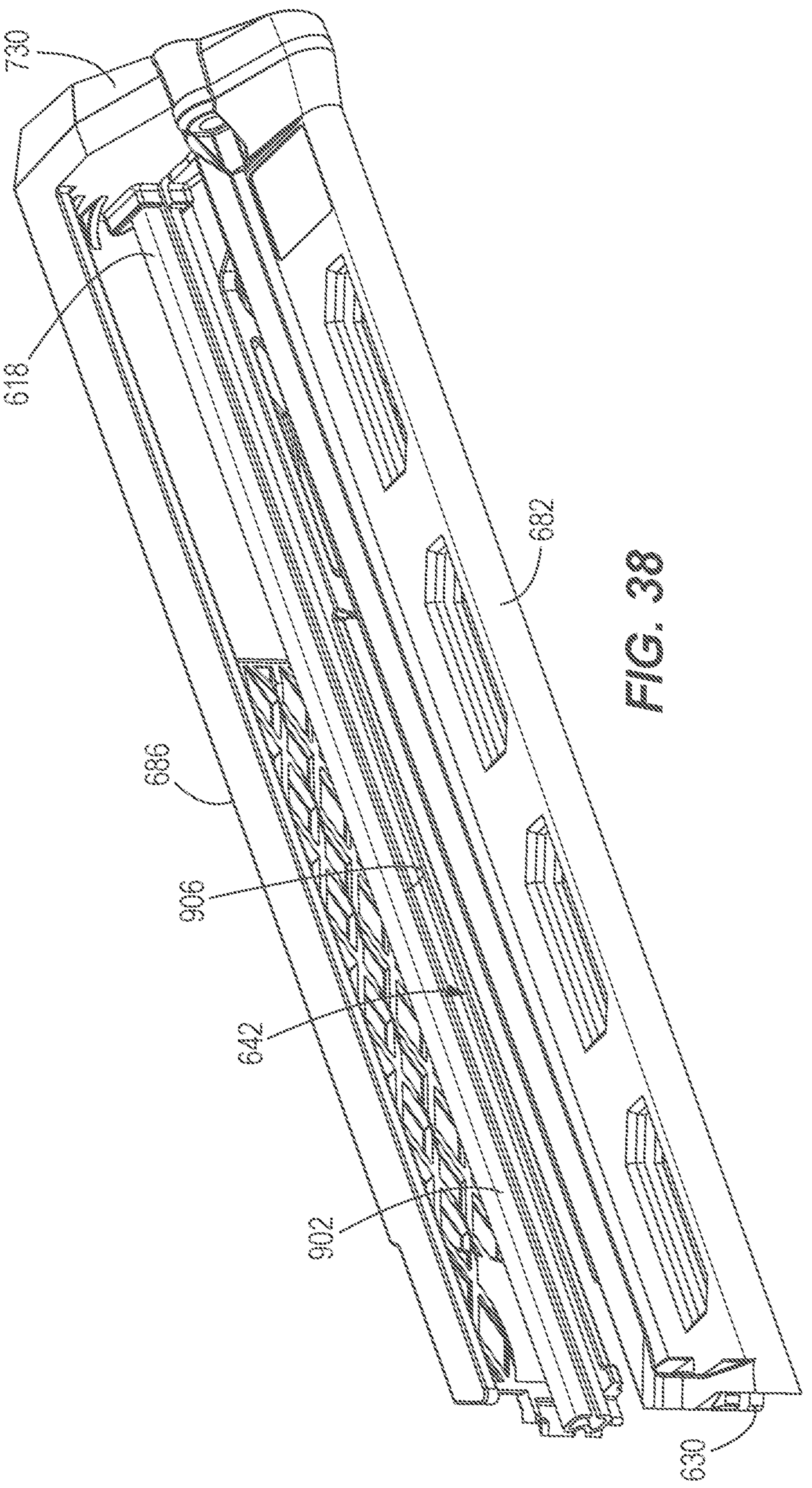
FIG. 38 is a bottom perspective view of the magazine of FIG. 37, illustrating a guide member movably supported by the second body portion.
Figure 39:
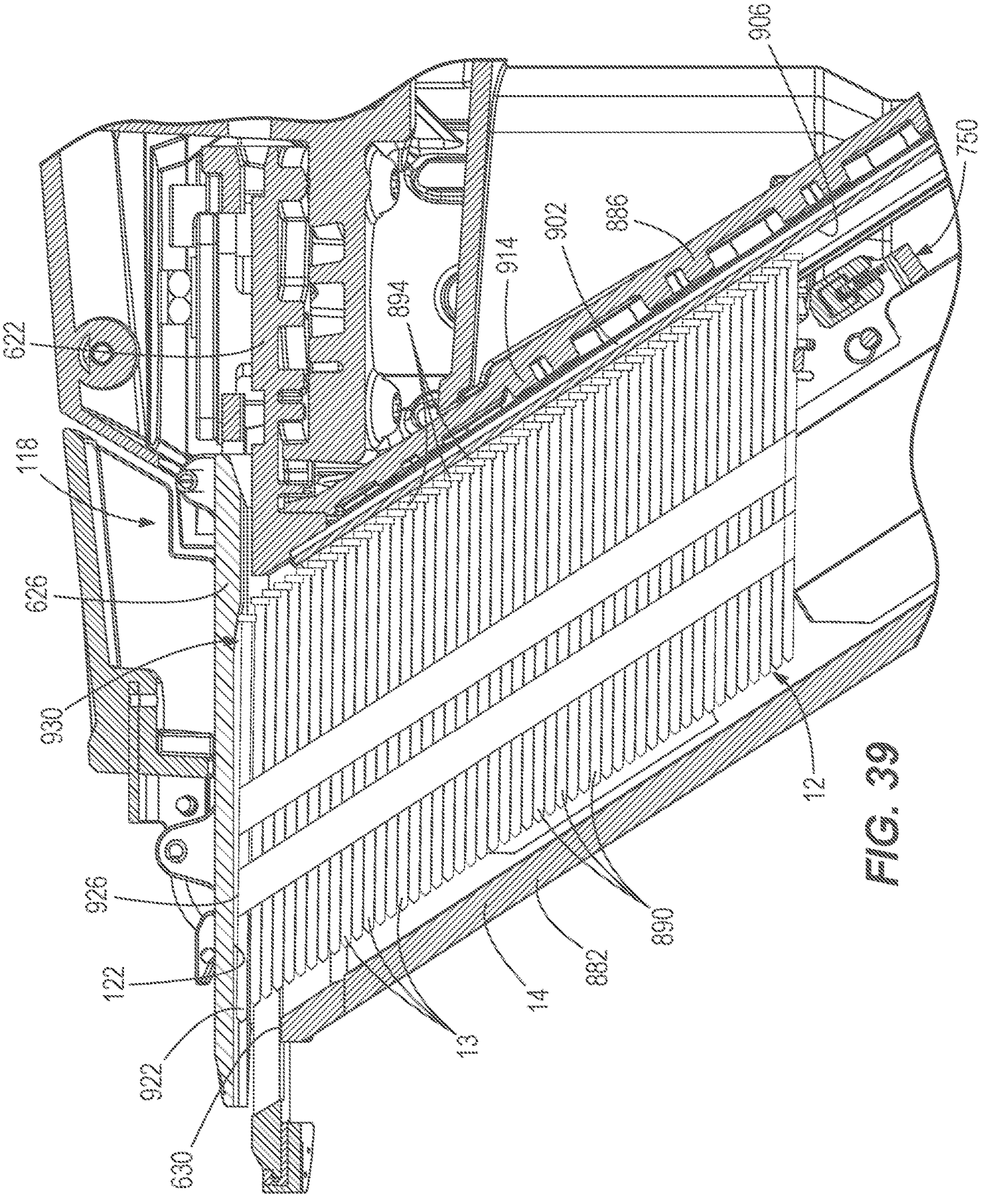
FIG. 39 is a cross-sectional view of the magazine of the powered fastener driver of FIG. 1A.

FIGS. 37-42 illustrate the magazine 14 or portions thereof. The magazine 14 includes a first body portion 882 and a second body portion 886 that cooperatively define the fastener channel 642 extending therethrough. The first body portion 882 is configured to receive a first portion 890 (e.g., shank) of each fastener 13 of the fastener strip 12 (FIG. 39). The second body portion 886 is configured to receive a second portion 894 (e.g., head) of each fastener 13 of the fastener strip 12.

Figure 40:
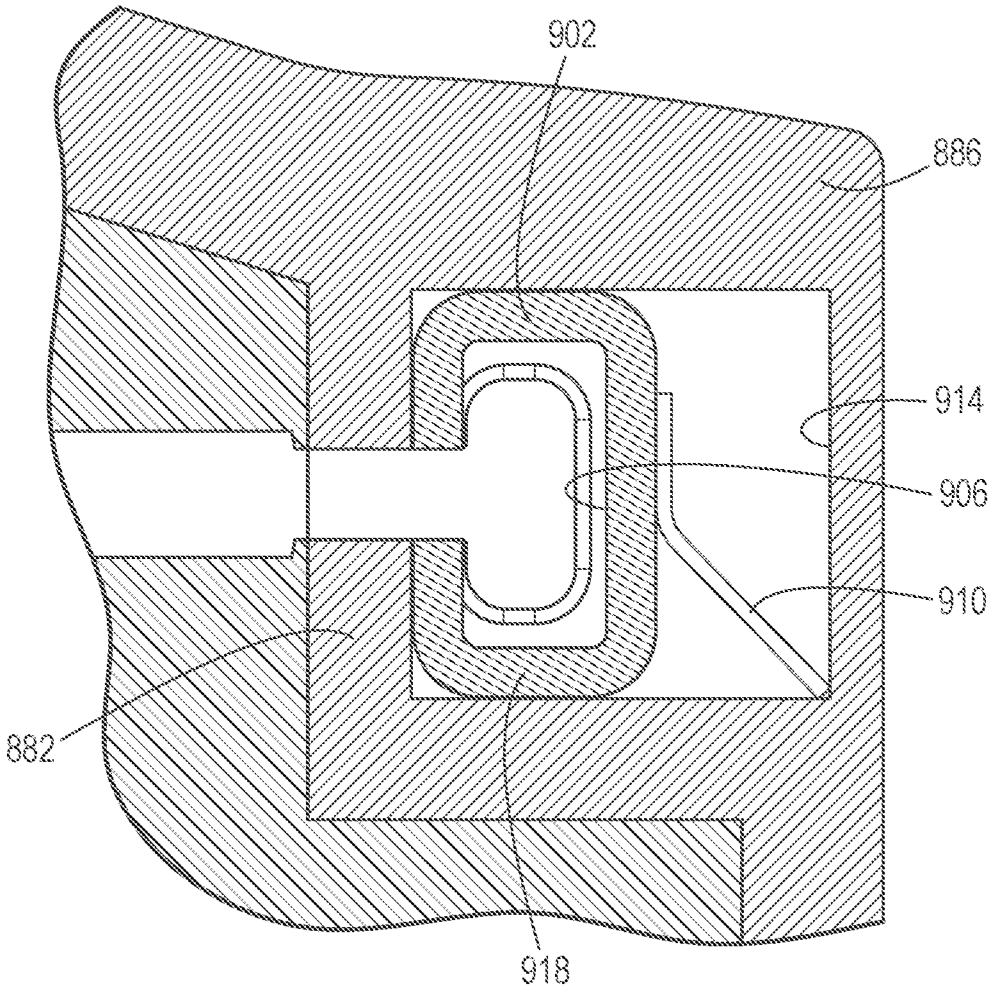
FIG. 40 is a front cross-sectional view of a portion of the magazine of FIG. 38.

With reference to FIGS. 38-40, the second body portion 886 of the magazine 14 includes a guide member 902 extending between the front end 630 and the rear end 730 of the magazine 14. The guide member 902 is movably coupled to the second body portion 886. The guide member 902 defines a slot 906 extending therethrough for receiving the second portions 894 of the fastener strip 12. The guide member 902 is configured to guide the movement of the fastener strip 12 within the magazine 14.

Figure 41:
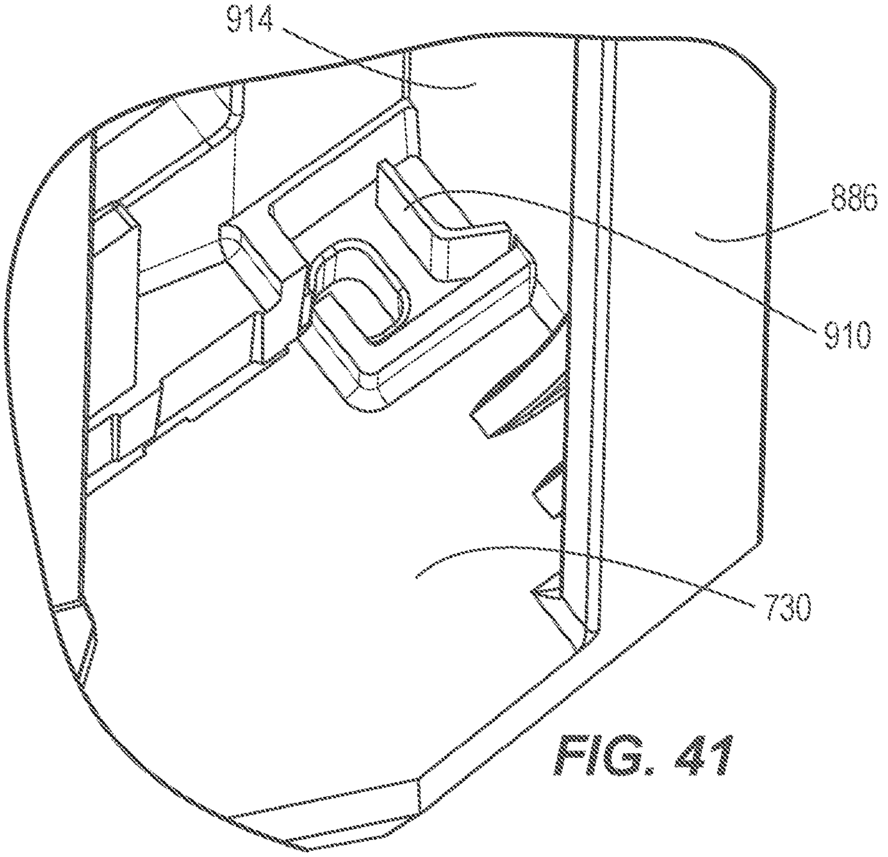
FIG. 41 is a rear view of an end portion of the magazine of FIG. 38 with the guide member of FIG. 38 removed.
Figure 42:
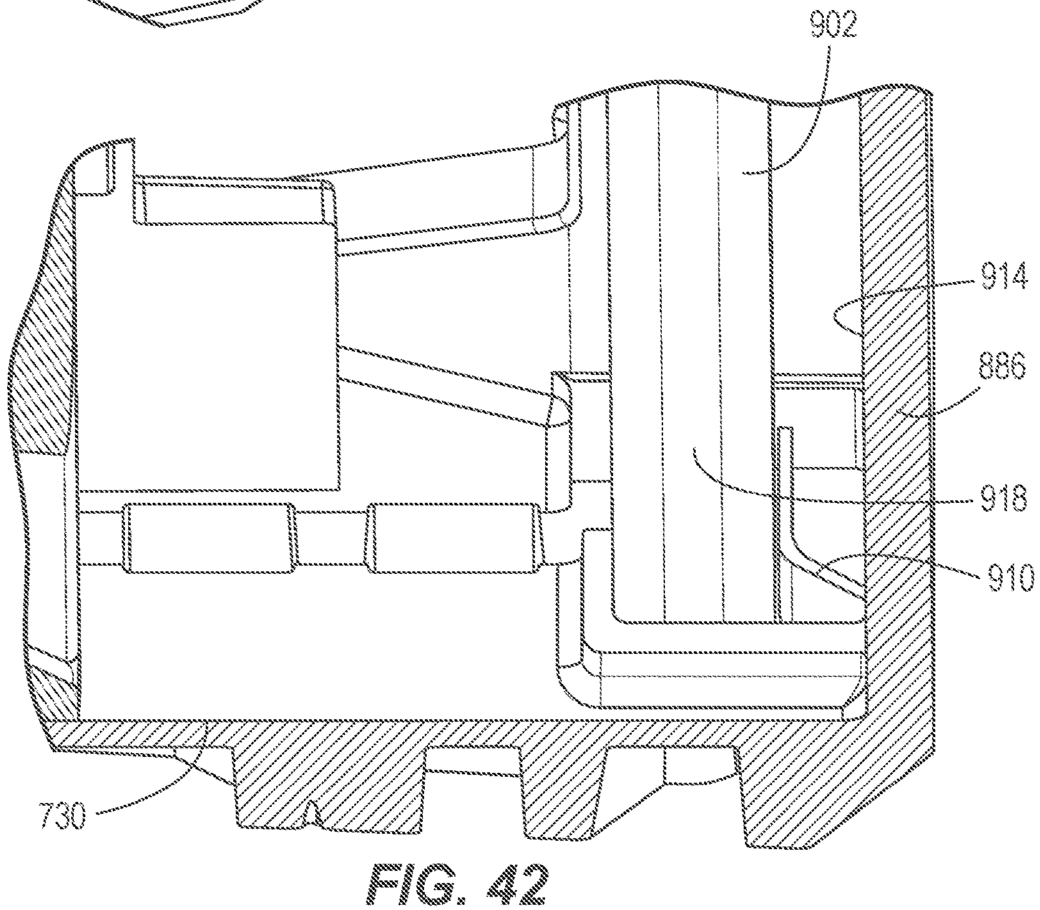
FIG. 42 is a side cross-sectional view of a portion of the magazine of FIG. 38.

With reference to FIGS. 41-42, the driver 10 further includes a biasing member 910 positioned between an end portion 918 of the guide member 902 and an internal wall 914 of the second body portion 886 of the magazine 14. The biasing member 910 is located proximate the rear end 730 of the magazine 14. The biasing member 910 is configured to bias the guide member 902 toward a first position (FIG. 40) in which the end portion 918 of the guide member 902 proximate the rear end 730 of the magazine 14 is positioned away from the internal wall 914 (e.g., to the left from the frame of reference of FIG. 42). The guide member 902 is selectively adjustable from the first position toward a second position against the bias of the biasing member 910 in which the end portion 918 of the guide member 902 is movable (e.g., pivotable) toward the internal wall 914 (e.g., toward the right from the frame of reference of FIG. 42).

For fasteners having a relatively shorter length, a substantial portion of the length of the subsequent fastener (e.g., half of the length) is received in the firing channel 122 at one time for being driven by the driver blade 26 into a workpiece. For fasteners 13 having a relatively longer length, a tip 922 of the first portion 890 of the subsequent fastener 13 may be received within the firing channel 122 first before the remaining portion of the first portion 890 and the respective second portion 894 (e.g., see FIG. 39). When the tip 922 of the first portion 890 contacts a surface 926 of the cover portion 626 (e.g., at point 1 in FIG. 39) before the remaining portion of the first portion 890 and the respective second portion 894 is received in the firing channel 122, the biasing force of the pusher assembly 750 causes the fastener strip 12 to begin to pivot at the point of engagement between the tip 922 and the surface 926 of the cover portion 626 (e.g., in a counterclockwise direction from the frame of reference of FIG. 39), thereby causing the fastener strip 12 to apply a reaction force to the guide member 902, against the bias of the biasing member 910.

When the fastener strip 12 engages at points 1, 2, and 3 in FIG. 39 (e.g., when the fastener strip 12 begins to bind within the magazine 14), the reaction force that the fastener strip 12 applies to the guide member 902 increases and overcomes a biasing force of the biasing member 910, thereby moving (e.g., pivoting) the guide member 902 from the first position toward the second position. In particular, the movement of the guide member 902 toward the second position creates additional distance or clearance within the magazine 14 to allow the fastener strip 12 to shift within the magazine about a pivot point 930 proximate the nosepiece 118. Accordingly, the movement of the guide member 902 from the first position toward the second position is configured to accommodate the fasteners 13 having the relatively longer length by selectively providing the additional clearance within the magazine 14. In addition, the movement of the guide member 902 from the first position toward the second position may allow the fasteners having a relatively longer length to be more substantially aligned with the firing channel 122 before being driven by the driver blade 26, thereby inhibiting misfiring. Accordingly, the guide member 902 is maintained in the first position by the biasing member 910, and selectively movable toward the second position based on the length of the fasteners 13 of the fastener strip 12.

Although the invention has been described in detail with reference to certain preferred embodiments, variations and modifications exist within the scope and spirit of one or more independent aspects of the invention as described.

Various features of the invention are set forth in the following claims.

What is claimed is:

1. A fastener driver comprising:

a magazine configured to receive fasteners;

a nosepiece including a fastener driving channel from which consecutive fasteners from the magazine are driven and a nail receiving aperture through which the fasteners pass from the magazine into the fastener driving channel to be fired, the fastener driving channel defining a firing axis, the nail receiving aperture being partially defined by a first protrusion extending from the nosepiece and a second protrusion extending from the nosepiece, the first protrusion and the second protrusion of the nosepiece positioned on opposite sides of the nail receiving aperture, each of the first protrusion and the second protrusion of the nosepiece having a length extending parallel to the firing axis and a height extending perpendicular to the firing axis; and a workpiece contact element movable relative to the nosepiece between an extended position and a retracted position, a portion of the workpiece contact element slidably positioned within the fastener driving channel, the portion of the workpiece contact element having an aperture extending therethrough in which the fasteners pass from the magazine through the aperture into the fastener driving channel of the nosepiece to be fired, and the portion of the workpiece contact element further including a first protrusion extending from the portion of the workpiece contact element and a second protrusion extending from the portion of the workpiece contact element, the first protrusion and the second protrusion of the workpiece contact element positioned on opposite sides of the aperture and at least partially defining the aperture, each of the first protrusion and the second protrusion of the workpiece contact element having a length extending parallel to the firing axis and a height extending perpendicular to the firing axis, wherein the nail receiving aperture is aligned with the aperture of the workpiece contact element, and wherein the fasteners pass from the magazine through the nail receiving aperture and the aperture and into the fastener driving channel of the nosepiece to be fired, and wherein the first protrusion and the second protrusion of the workpiece contact element are aligned with the first protrusion and the second protrusion of the nosepiece, respectively, to collectively define at least part of a guiding assembly configured to guide each of the fasteners along the portion of the workpiece contact element within the fastener driving channel as each of the fasteners is being fired into a workpiece.

2. The fastener driver of claim 1, further comprising a driver blade movable relative to the nosepiece within the fastener driving channel, wherein the driver blade includes a slot, and wherein the first protrusion and the second protrusion of the nosepiece is slidably receivable in the slot.

3. The fastener driver of claim 1, further comprising a driver blade movable relative to the nosepiece within the fastener driving channel, wherein the driver blade includes a slot, and wherein the first protrusion and the second protrusion of the workpiece contact element are slidably received in the slot.

4. The fastener driver of claim 1, wherein the nosepiece includes an elongated slot configured to slidably receive the portion of the workpiece contact element.

5. The fastener driver of claim 1, wherein the nosepiece includes a nosepiece base and a nosepiece cover movably coupled to the nosepiece base, and wherein the nosepiece base is fixedly coupled to a front end of the magazine.

6. The fastener driver of claim 5, wherein the nosepiece base includes an elongated slot configured to slidably receive the portion of the workpiece contact element, and wherein the nail receiving aperture extends through the elongated slot.

7. The fastener driver of claim 5, wherein the portion of the workpiece contact element is positioned between the nosepiece base and the nosepiece cover.

8. The fastener driver of claim 1, wherein the workpiece contact element includes a plurality of portions, wherein the plurality of portions include a first portion and a second portion movably coupled to the first portion by a depth of drive adjustment mechanism, and wherein the second portion has the portion of the workpiece contact element slidably positioned within the fastener driving channel.

9. The fastener driver of claim 1, further comprising an endcap coupled to the portion of the workpiece contact element slidably positioned within the fastener driving channel, wherein the endcap is configured to contact a workpiece for moving the workpiece contact element between the extended position and the retracted position.

10. The fastener driver of claim 1, wherein the nosepiece includes a nosepiece base and a nosepiece cover coupled to the nosepiece base, wherein the nosepiece cover includes an elongated groove in facing relationship with the portion of the workpiece contact element.

11. The fastener driver of claim 10, wherein the nosepiece base is fixedly coupled to a front end of the magazine.

12. The fastener driver of claim 10, wherein the nosepiece base includes an elongated slot configured to slidably receive the portion of the workpiece contact element.

13. The fastener driver of claim 12, wherein the nail receiving aperture extends through the elongated slot.

14. The fastener driver of claim 10, wherein the portion of the workpiece contact element is positioned between the nosepiece base and the nosepiece cover.

15. The fastener driver of claim 1, wherein the nosepiece includes a nosepiece base and a nosepiece cover coupled to the nosepiece base, wherein the nosepiece base includes the first protrusion and the second protrusion, wherein a fastener to be fired is first guided between the first protrusion and the second protrusion of the nosepiece base and an elongated groove of the nosepiece cover, and then is subsequently guided between the first protrusion and the second protrusion of the workpiece contact element and the elongated groove of the nosepiece cover.

16. The fastener driver of claim 1, wherein the first protrusion and the second protrusion of the workpiece contact element is closer to the first protrusion and the second protrusion of the nosepiece in the retracted position than in the extended position.

17. The fastener driver of claim 5, wherein the first protrusion and the second protrusion of the nosepiece extends from the nosepiece base toward the nosepiece cover.

18. The fastener driver of claim 10, wherein the first protrusion and the second protrusion of the nosepiece extends from the nosepiece base toward the nosepiece cover.

* * * * *